United States Patent

[11] 3,558,811

[72] Inventors Albert J. Montevecchio
East Rochester;
William D. Bartron; Thomas H. Galster,
Rochester, N.Y.
[21] Appl. No. 641,226
[22] Filed May 25, 1967
[45] Patented Jan. 26, 1971
[73] Assignee Xerox Corporation
Rochester, N.Y.
a corporation of New York

[54] GRAPHIC COMMUNICATION ELECTRICAL INTERFACE SYSTEM
27 Claims, 41 Drawing Figs.

[52] U.S. Cl. .......... 178/6, 178/69.5, 340/146.3, 340/172.5
[51] Int. Cl. .......... H04n 1/32, H04n 1/36, H04n 1/42
[50] Field of Search .......... 340/172.5, 146.3; 178/6, 6.8, 69.5F, 6.7

[56] References Cited
UNITED STATES PATENTS

| | | | |
|---|---|---|---|
| 3,075,178 | 1/1963 | James | 340/172.5 |
| 3,323,119 | 5/1967 | Barcomb | 178/6 |
| 3,325,787 | 6/1967 | Angell | 340/172.5 |
| 3,414,672 | 12/1968 | Townsend | 178/69.5F |
| 3,347,981 | 10/1967 | Kagan | 178/6.7 |

*Primary Examiner*—Richard Murray
*Assistant Examiner*—Howard W. Britton
*Attorneys*—Ronald Zibelli, Paul M. Enlow, James J. Ralabate and Franklyn C. Weiss

ABSTRACT: An interface adapter unit for converting facsimile graphic communication information signals directly applicable to a central processing unit or computer, and vice versa. In a Read mode, information obtained by the scanning of a document by a conventional facsimile graphic scanning system is converted to computer format language for application directly by a computer or the like. In a Write mode, information from a computer can be converted directly to a form applicable by a conventional facsimile graphic printing system.

INVENTORS
ALBERT J. MONTEVECCHIO
WILLIAM D. BARTRON
BY THOMAS H. GALSTER
Ronald Zibelli
Franklyn C. Weiss
ATTORNEYS INVENTORS
ALBERT J. MONTEVECCHIO
WILLIAM D. BARTRON
BY THOMAS H. GALSTER
Ronald Zibelli
Franklyn C. Weiss
ATTORNEYS

PATENTED JAN 26 1971 3,558,811

SHEET 03 OF 37

INVENTORS
ALBERT J. MONTEVECCHIO
WILLIAM D. BARTRON
THOMAS H. GALSTER
BY Ronald Zibelli
Franklyn C. Weiss
ATTORNEYS INVENTORS
ALBERT J. MONTEVECCHIO
WILLIAM D. BARTRON
BY THOMAS H. GALSTER
Ronald Zibelli
Franklyn C. Weiss
ATTORNEYS INVENTORS
ALBERT J. MONTEVECCHIO
WILLIAM D. BARTRON
BY THOMAS H. GALSTER
Ronald Zibelli
Franklyn C. Weiss
ATTORNEYS INVENTORS
ALBERT J. MONTEVECCHIO
WILLIAM D. BARTRON
THOMAS H. GALSTER
BY Ronald Zibelli
Franklyn C. Weiss
ATTORNEYS INVENTORS
ALBERT J. MONTEVECCHIO
WILLIAM D. BARTRON
THOMAS H. GALSTER
BY
Ronald Zibelli
Franklyn C. Weiss
ATTORNEYS INVENTORS
ALBERT J. MONTEVECCHIO
WILLIAM D. BARTRON
THOMAS H. GALSTER
BY *Ronald Zibelli*
*Franklyn C. Weiss*
ATTORNEYS INVENTORS
ALBERT J. MONTEVECCHIO
WILLIAM D. BARTRON
THOMAS H. GALSTER
BY Ronald Zibelli
Franklyn C. Weiss
ATTORNEYS

INVENTORS
ALBERT J. MONTEVECCHIO
WILLIAM D. BARTRON
THOMAS H. GALSTER

BY Ronald Zibelli
Franklyn C. Weiss
ATTORNEYS

INVENTORS
ALBERT J. MONTEVECCHIO
WILLIAM D. BARTRON
THOMAS H. GALSTER

BY Ronald Zibelli
Franklyn C. Weiss
ATTORNEYS

INVENTORS
ALBERT J. MONTEVECCHIO
WILLIAM D. BARTRON
THOMAS H. GALSTER
BY Ronald Zibelli
Franklyn C. Weiss
ATTORNEYS INVENTORS
ALBERT J. MONTEVECCHIO
WILLIAM D. BARTRON
THOMAS H. GALSTER
BY Ronald Zibelli
Franklyn C. Weiss
ATTORNEYS INVENTORS
ALBERT J. MONTEVECCHIO
WILLIAM D. BARTRON
THOMAS H. GALSTER
BY Ronald Zibelli
Franklyn C. Weiss
ATTORNEYS INVENTORS
ALBERT J. MONTEVECCHIO
WILLIAM D. BARTRON
BY THOMAS H. GALSTER
Ronald Zibelli
Franklyn C. Weiss
ATTORNEYS INVENTORS
ALBERT J. MONTEVECCHIO
WILLIAM D. BARTRON
THOMAS H. GALSTER
BY Ronald Zibelli
Franklyn C. Weiss
ATTORNEYS INVENTORS
ALBERT J. MONTEVECCHIO
WILLIAM D. BARTRON
BY THOMAS H. GALSTER
Ronald Zibelli
Franklyn C. Weiss
ATTORNEYS INVENTORS
ALBERT J. MONTEVECCHIO
WILLIAM D. BARTRON
BY THOMAS H. GALSTER
Ronald Zibelli
Franklyn C. Weiss
ATTORNEYS INVENTORS
ALBERT J. MONTEVECCHIO
WILLIAM D. BARTRON
THOMAS H. GALSTER
BY Ronald Zibelli
Franklyn C. Weiss
ATTORNEYS INVENTORS
ALBERT J. MONTEVECCHIO
WILLIAM D. BARTRON
THOMAS H. GALSTER
BY
Ronald Zibelli
Franklyn C. Weiss
ATTORNEYS INVENTORS
ALBERT J. MONTEVECCHIO
WILLIAM D. BARTRON
THOMAS H. GALSTER
BY Ronald Zibelli
Franklyn C. Weiss
ATTORNEYS INVENTORS
ALBERT J. MONTEVECCHIO
WILLIAM D. BARTRON
THOMAS H. GALSTER
BY Ronald Zibelli
Franklyn C. Weiss
ATTORNEYS

INVENTORS
ALBERT J. MONTEVECCHIO
WILLIAM D. BARTRON
THOMAS H. GALSTER

BY Ronald Zibelli
Franklyn C. Weiss
ATTORNEYS

INVENTORS
ALBERT J. MONTEVECCHIO
WILLIAM D. BARTRON
THOMAS H. GALSTER
BY Ronald Zibelli
Franklin C. Weiss
ATTORNEYS INVENTORS
ALBERT J. MONTEVECCHIO
WILLIAM D. BARTRON
THOMAS H. GALSTER
BY Ronald Zibelli
Franklyn C. Weiss
ATTORNEYS INVENTORS
ALBERT J. MONTEVECCHIO
WILLIAM D. BARTRON
THOMAS H. GALSTER
BY Ronald Zibelli
Franklyn C. Weiss
ATTORNEYS INVENTORS
ALBERT J. MONTEVECCHIO
WILLIAM D. BARTRON
THOMAS H. GALSTER
BY Ronald Zibelli
Franklyn C. Weiss
ATTORNEYS INVENTORS
ALBERT J. MONTEVECCHIO
WILLIAM D. BARTROM
THOMAS H. GALSTER
BY Ronald Zibelli
Franklyn C. Weiss
ATTORNEYS INVENTORS
ALBERT J. MONTEVECCHIO
WILLIAM D. BARTRON
BY THOMAS H. GALSTER
Ronald Zibelli
Franklyn C. Weiss
ATTORNEYS

INVENTORS
ALBERT J. MONTEVECCHIO
WILLIAM D. BARTRON
BY THOMAS H. GALSTER

Ronald Zibelli
Franklin C. Weiss
ATTORNEYS

INVENTORS
ALBERT J. MONTEVECCHIO
WILLIAM D. BARTRON
BY THOMAS H. GALSTER
Ronald Zibelli
Franklyn C. Weiss
ATTORNEYS INVENTORS
ALBERT J. MONTEVECCHIO
WILLIAM D. BARTRON
BY THOMAS H. GALSTER
Ronald Zibelli
Franklyn C. Weiss
ATTORNEYS

INVENTORS
ALBERT J. MONTEVECCHIO
WILLIAM D. BARTRON
BY THOMAS H. GALSTER

Ronald Zibelli
Franklyn C. Weiss
ATTORNEYS

INVENTORS
ALBERT J. MONTEVECCHIO
WILLIAM D. BARTRON
BY THOMAS H. GALSTER

Ronald Zibelli
Franklyn C. Weiss
ATTORNEYS

INVENTORS
ALBERT J. MONTEVECCHIO
WILLIAM D. BARTRON
BY THOMAS H. GALSTER
Ronald Zibelli
Franklyn C. Weiss
ATTORNEYS

INVENTORS
ALBERT J. MONTEVECCHIO
WILLIAM D. BARTRON
THOMAS H. GALSTER

BY Ronald Zibelli
Franklyn C. Weiss
ATTORNEYS

INVENTORS
ALBERT J. MONTEVECCHIO
WILLIAM D. BARTRON
THOMAS H. GALSTER
BY Ronald Zibelli
Franklyn C. Weiss
ATTORNEYS

GRAPHIC COMMUNICATION ELECTRICAL INTERFACE SYSTEM

BACKGROUND

In a normal facsimile system, a document to be transmitted is scanned at a transmitting station to convert information on the document into a series of electrical signals. These video signals, or carrier-modulated signals corresponding thereto, are then coupled to the input of a communication link interconnecting the transmitter with a receiver. At a receiving location, the video signals, in conjunction with suitable synchronizing signals, selectively control the actuation of appropriate marking means to generate a facsimile of the document transmitted.

In the field of computers, however, data processing equipment has grown in such complexity and speed that input and output equipment must be designed for quicker and more accurate information-handling systems. The prior art has endeavored to keep up with the increasing data-handling speed of the computers with such systems as card-punching machines, high-speed typewriters, magnetic disc arrays, and high-speed magnetic tape units. The inherent disadvantage of the aforementioned input-output devices is that these are only intermediate storage units between a computer and an output device wherein such information must be converted by such output device in order to be readily usable by a customer.

Oftentimes it is desired to convert the information on, for example, graphs, charts, maps drawings, grids, and sketches, into language that may be understood by a computer for operation by the software program. It can be seen that the conversion of information on a map or drawing, for example, is a long, drawn out process in that equations must first be derived, converted to information to be punched out on computer cards by a card-punching machine; these cards read into a tape or disc memory before the computer is able to understand the information format of the signals transmitted to the computer.

In addition, it is often desired to print out from a computer such graphs, charts, etc., but again the process is time consuming and expensive, in that the information must be read out on a tape or disc unit, for example, then such information converted to language that can be used by a typewriter or a graph-drawing machine. It becomes increasingly apparent, therefore, that such prior art techniques are not economically advantageous in today's quick-moving, high-speed computer-oriented society.

OBJECTS

It is, accordingly, an object of the present invention to provide an interface unit between a facsimile communication system and a computer for direct input and output of documents or the like.

It is another object of the present invention to optimize the information-handling capability between a facsimile communication system and an electronic computer.

It is another object of the present invention to provide direct hard copy readout from an electronic computer.

It is another object of the present invention to provide direct real time access to an electronic computer from a facsimile-scanning system.

It is another object of the present invention to provide direct input and output access between a computer and a facsimile communication system.

It is another object of the present invention to provide an online capability in the reading in and writing out from an electronic computer to a facsimile graphic scanning and printing system.

BRIEF SUMMARY OF THE INVENTION

In accomplishing the above and other desired aspects, applicants have invented novel apparatus for providing direct communication between a facsimile communication system and an electronic computer. An interface unit is coupled to the output of an electronic computer and the link to a facsimile communication system. Inasmuch as a computer will have specific input and output lines which must be signalled at certain times to enable the computer to perform its operations, together with certain signals which must be present from and to a facsimile communication system, the interface unit, which can be termed a computer adapter, not only provides these interface or "hand-shaking" signals, but converts the data information to be compatible by the unit being communicated with.

In the Read mode, that is, when a facsimile scanner is communicating with the computer, the information signals from a scanner are first presented to the computer adapter which performs certain operations on the signals before presentation to the computer. In this Read mode, the adapter must look like a printer to the scanner in order that the proper supervisory signals be communicated between the two units to insure proper operation. Logic circuitry, therefore, is provided for interfacing between the computer and the adapter in addition to interfacing between the adapter and the scanning unit.

In the Write mode, where the computer is communicating directly with a facsimile printer, the computer adapter must look like a facsimile scanning unit to the facsimile printer to provide similar supervisory control signals to insure the correct operation of the system. In addition to the interface logic circuitry between the computer and the adapter and the adapter and scanner, logic circuitry is supplied for providing interfacing between the adapter and the facsimile printer unit. Other logic circuitry is provided for time base and synchronization between the several units.

DESCRIPTION OF THE DRAWINGS

For a more complete understanding of applicants' invention, reference may be had to the following detailed description in conjunction with the drawings wherein.

DETAILED DESCRIPTION OF THE INVENTION

General

Figure 1A:
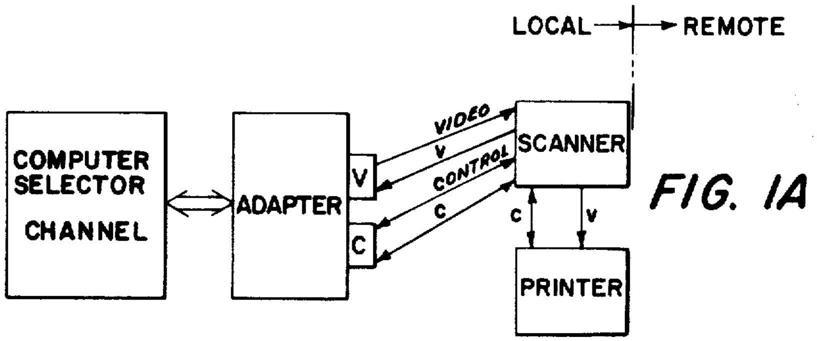
FIGS. 1A to 1D are block diagrams showing the system usage of an adapter with a scanner and printer.

In the field of facsimile communication technology, many facsimile machines are presently being marketed. One such unit is the Xerox Magnavox Telecopier which is a transceiver capable of transmitting or receiving a document when in the proper mode. The Telecopier unit is manufactured by the Magnavox Company and marketed by the Xerox Corporation in Rochester, N.Y. Transmission of a document by the Telecopier takes in the order of 6 minutes over an acoustically coupled telephone line. A similar telecopier unit at the other end of the line would be reached by direct distance telephone dialing and when placed in the receive mode would recreate a facsimile of the document transmitted.

Another facsimile system presently being marketed by the Xerox Corporation is known as the LDX Facsimile System which is capable of full duplex operation. The LDX System is a high-speed system capable of operation over microwave, radio, or large bandwidth telephone links such as with the Telpak A and Telpak C provisions of the common carrier telephone network in the United States. Because of the high speed in transmission and attendant sophistication of scanning and printing circuits, a separate scanner and printer is necessary to complete an LDX System. The scanner is provided with cathode ray tube-scanning while the printer is also provided with cathode ray printout utilizing xerographic principles of operation. For a fuller description of the LDX System, reference is made to U.S. Pat. Nos. 3,149,201 and 3,303,280, which are assigned to the same assignee as the present application.

Utilizing the Telpak C provision which has a bandwidth of approximately 240 kilocycles wide, 8.7 documents can be transmitted per minute. Utilizing the Telpak A apparatus of the large common carrier telephone network, the speed is substantially slower and is approximately 1.6 documents per minute. The scanning speed, document paper feed speed, and other parameters are changed accordingly, depending upon the bandwidth of the communication channel to be utilized with the LDX system.

The computer adapter, which is the subject of the present application, may be used with any of the aforementioned facsimile-communicating systems for interfacing to any of the known high-speed digital computers in the present art. One such computer is the IBM System 360 which is a high-speed digital computer utilizing transistor logic and magnetic core memory. Several models of the IBM System 360 are presently marketed depending upon customer requirements such as models 30, 40, 50, 65, 67, and 75. While the Xerox LDX Facsimile System is but one system known in the facsimile art and while in a similar manner the IBM System 360 is but one digital computer known in the computer art, the following discussion, for convenience, is related to these two systems. It is to be understood, however, that any of the known facsimile systems and digital computer systems may be utilized with a computer adapter as set forth herein without deviating from the principles of the present invention.

System Definitions

Utilizing the LDX Graphic Communication System in conjunction with the IBM System 360 computer, the following indicates the system definitions to more fully understand the description of the computer adapter, as will be hereinafter be more fully set forth. The LDX Scanner, for example, is the standard model 1A LDX Scanner, type A135 or C135. This indicates that the scanner scans 135 lines per inch and transmission is to be made at Telpak A or Telpak C speeds. The scanner serves as the facsimile transmitter and supplies graphic inputs to the system 360 via the computer adapter. The LDX Printer, as utilized herein, is the standard Model 1A LDX Printer, Type A135 or Type C135. The type definition is the same as set forth above for the LDX Scanner unit. The LDX printer serves as the facsimile receiver and receives graphic information outputs from the system 360 via the computer adapter. The computer unit as utilized herein is the standard IBM System 360 Computer wherein interface to the computer adapter is provided via the "selector" channel. The System 360 inputs or outputs graphic data for images generated internally and/or by the LDX-Adapter combination. As hereinbefore set forth, the communications facility may be composed of direct cabling, common carrier facilities, microwave etc., provided that the facilities are compatible with the LDX System requirements.

Figure 1B:
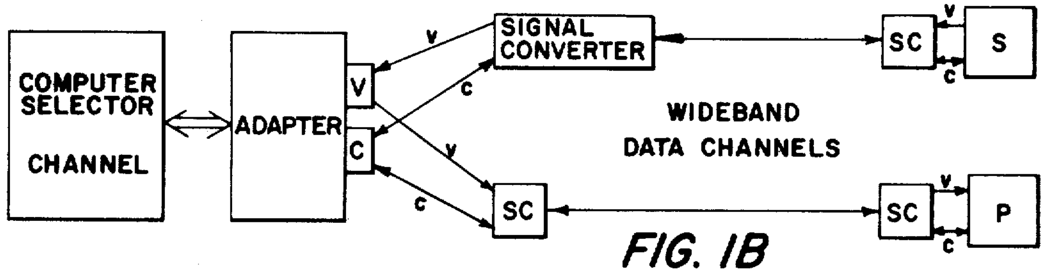
Figure 1C:
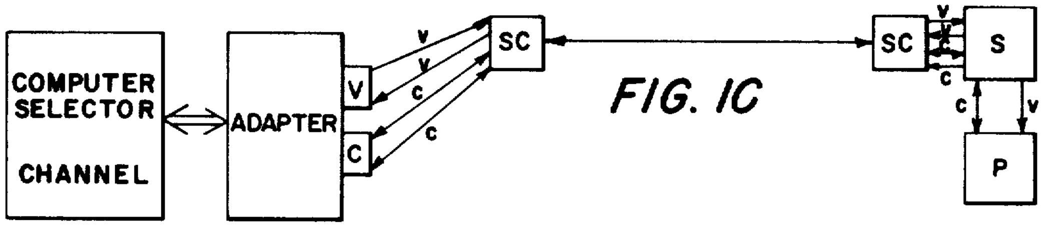
Figure 1D:
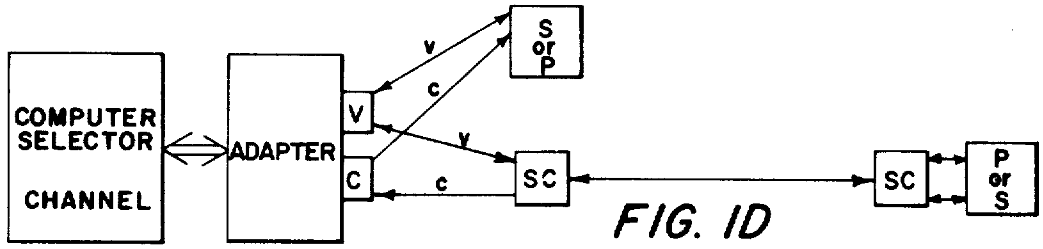

Referring now to FIGS. 1A, 1D, there can be seen the various configurations for the LDX Facsimile System, computer adapter, and the IBM System 360 Computer. As seen in FIG. 1A, the scanner and printer, together with the adapter, and the IBM System 360 computer may all be at a local site wherein cabling is provided by direct wire connections. FIG. 1B indicates that the scanner and printer units may be at remote locations and connected to the computer adapter by signal converters at the input and output ends of the wide band data channels. As hereinbefore set forth, such data channels may be the Telpak A or Telpak C lines provided by the common carriers, or may be a microwave installation or other wide band link. The signal converters, commonly known as data sets, provide signal interfacing between the scanner and printer units to the input of the wide band data channel and in addition provide interfacing between the adapter and the wide band data channels. FIG. 1C shows that a scanner and printing unit may be situated at a remote location and coupled to a wide band data channel to the adapter; however, scanner and printer provisions can only be made at the remote location as the scanner is the only unit connected to the wide band channel. FIG. 1D indicates that a scanner or printer may be positioned locally while a scanner or printed may also be connected to a wide band data channel at a remote location. In this configuration, if the local device is a scanner, then the remote device must be a printer; while, if the local device is a printer, the remote device must be a scanner. With the adapter providing interface between an LDX system and the computer, it can therefore be concluded that while the LDX equipment provides full duplex transmission, the adapter being a two-way device provides only half duplex communication as it can only pass information in one direction at any one time.

The transmit or Read operation of the system, in accordance with the principles of the present invention, is defined as the process of entering a source document into the system 360 from the LDX scanner via the adapter. In this mode, the adapter accepts and time-quantizes the scanner serial video information under control of necessary supervisory and synchronization signals, converts the information to bit parallel bytes and transfers the parallel data to the selector channel to the computer. The receive or Write operation is defined as the process of outputting an image from the System 360 computer to the LDX printer via the computer adapter. In this mode, the adapter accepts bit parallel bytes from the channel, converts such information to serial data, and outputs this data in video form to the printer, along with necessary synchronization, supervisory and conditioning signals.

Inasmuch as the adapter interfaces with standard LDX facsimile equipment, data sets, and the System 360 computer standard selection channel, it is appropriate to define the signals required at each interface of the adapter. While the interface information as hereinafter set forth is given in conjunction with the computer adapter functions, reference may be made to the IBM System 360, publication entitled I/O Interface - Channel to Control Unit, Original Equipment Manufactures Information, Form A22–6843–2 as distributed by the International Business Machines Company which generally sets forth the interface requirements necessary for communication with the System 360 computer. As set forth herein, however, the types of interface signals required are:

a. Data—signals consisting of video information indicating document content plus the synchronizing burst.
b. Supervisory Controls—signals governing the operations and sequences of the LDX equipment.
c. Conditioning Controls—signals used to control certain functions of the signal converters, i.e., data sets.

Table 1, which follows, sets forth the interface signals between the adapter and the LDX facsimile system. It may be noted that video information from the adapter to an LDX printer is transmitted solely on the Send Video line. Information from an LDX scanner to the adapter is transmitted solely on the Receive Video line. The other interface signals between the LDX system and the computer adapter are conditioning and supervisory lines to indicate certain steps which must be taken or status signals indicating the operative state of the particular unit.

be housed separately or may be physically and logically integral with the I/O device. In this specification the control unit is the computer adapter, while the input-output devices are the scanner and printer respectively.

Between the control units, i.e., computer adapter, and the System 360 selector channel are the interface lines which are necessary to perform the distinct function in specific time sequences. This interface provides an information format and a signal sequence necessary for the output operation of the computer to the adapter and vice versa. Inasmuch as several control units may be connected to the selector channel of the computer, each of the control units has its own priority by which it may communicate with the selector channel. Since the control units are controlled by the computer by the predetermined priorities, addressing of the specific control unit to which the computer desires to communicate must be made in parallel in order that the specific control unit addressed will recognize such address and begin communication with the channel. Therefore, selection of a control unit for communication with the channel is controlled by a signal passing serially to all the control units that permits, sequentially, each control unit to respond to the signals provided by the channel. A control unit remains logically connected on the interface until it transfers the information it needs or has, or until the channel signals it to disconnect. The rise and fall of all signals transmitted over the interface are controlled by interlocked responses. Interlocking removes the dependence of the interface on circuit speed, and makes it applicable to a wide variety of circuits and data rates. Further, interlocking

TABLE I

| Signal Name | Type | Signal Definition |
|---|---|---|
| Send Video | Data | Contains Adapter, generated data and scan synchronization bust for LDX Printer. |
| Receive Video | do | Contains LDX Scanner generated data and scan synchronization burst for adapter. |
| Non-Synchronous | Conditioning | Notifies Data Set that Adapter is on and requires non-synchronous operation. |
| Send Request | | Notifies Data Set that Adapter is on and capable of transmitting. |
| Signal Ground | | Self-explanatory. |
| Send Signal 1 | Supervisory | Notifies LDX Printer that Adapter is ready. |
| Send Signal 2 | do | Notifies LDX Printer that Adapter is transmitting data. |
| Send Signal 3 | do | Notifies LDX Printer to "Mark for Cut". |
| Receive Signal A | do | Notifies Adapter that Printer is ready. |
| Receive Signal B | do | Notifies Adapter that Printer is ready and drive is on. |
| Receive Signal 1 | do | Notifies Adapter that scanner is ready. |
| Receive Signal 2 | do | Notifies Adapter that Scanner is transmitting data. |
| Receive Signal 3 | do | Notifies Adapter to "Mark for Cut" (beginning and end of page). |
| Send Signal A | do | Notifies Scanner that Adapter is ready. |
| Send Signal B | do | Notifies Scanner that Adapter is ready and is on line with the computer. |

Figure 2:
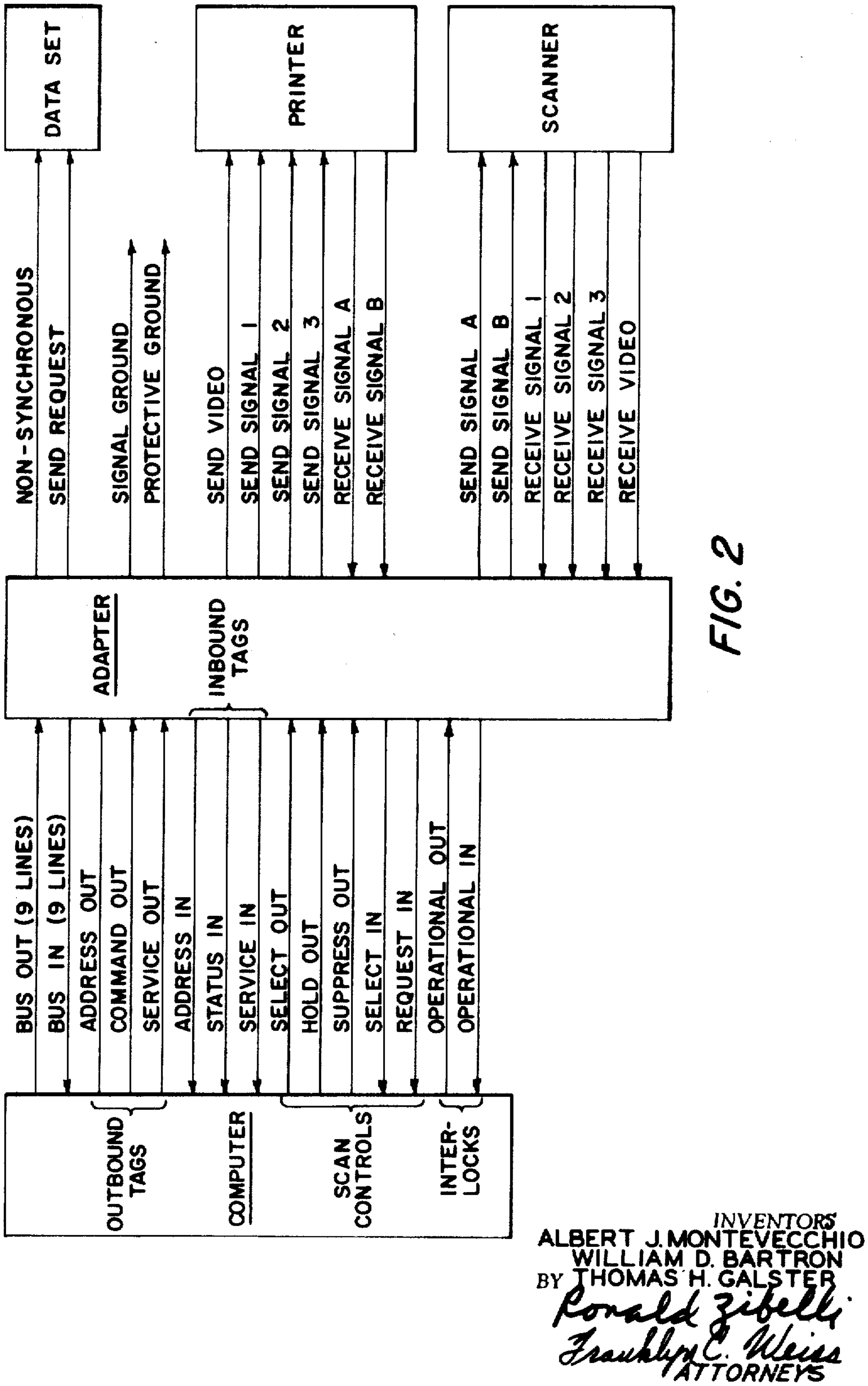
FIG. 2 shows the interface lines between the computer and the printer and scanner.

Referring now to FIG. 2, there is shown the overall system and the interface lines between the separate units of the system. Between the LDX system and the adapter are the interface lines as defined in table I. Between the adapter and the selector channel of the computer are the interface lines necessary for operation between the adapter and the computer. In order to more fully understand the interface lines between the adapter and the computer, the following definitions are set forth for the particular lines.

Reference may be had to the aforementioned IBM publication for the general definitions of the lines servicing the System 360 Selector Channel. The IBM System 360 operates between the computer to external control units by what is termed a selector channel. A control unit may be a separate input-output device by itself or may be the control unit to which several input-output devices are attached. For instance, a separate control unit may control a magnetic tape unit and a magnetic disc storage unit. As defined in the IBM publication set forth above, the control unit provides the logical capability necessary to operate and control an input-output device and adapts the characteristics of each I/O device to the standard form of control provided by the channel. A control unit may permits connecting control units of different circuit speeds to a single channel.

Referring now to FIG. 2, the bus out line from the channel comprises eight data lines plus one for parity. The bus out line is used to transmit addresses, commands, control orders, and data to the control units. The channel conditions an outbound tag line to identify the type of data transmitted on bus out lines. For example, when the address out tag and bus out lines are active concurrently, information on the bus out lines designates an address. The period during which the information on bus out is valid is controlled by the tag lines.

The bus in line, similar to the bus out line, comprises eight data lines plus one for parity. This line is used to transmit addresses, status, sense information, and data to the channel. The control unit conditions an inbound tag line to identify the type of information transmitted on bus in lines. For example, when the status in tags and bus in lines are active concurrently, bus in contain a status byte. Tag In lines control the period in which bus in lines contain valid information.

The address out line is a line from the channel to all attached control units. It provides two major functions: I/O device selection and disconnect. Address out initiates selection of an I/O device by causing all attached control units to attempt to decode the address on bus out lines; since each control unit address is different, only one unit can recognize the address as its own. The control unit which recognizes the address must respond by conditioning operational in when select out is conditioned to that control unit. The channel must hold address out active until it receives operational in, select in or status in. Select in indicates that no control unit decoded the address as when the specified control unit is off line. Status in indicates that the designated control unit is busy and cannot be interrupted to execute another operation. The channel responds to service in or status in reply by canceling address out.

To cause a control unit to disconnect from the interface, the channel brings address out up and drops select out at least 250 μsec. before the completion of any signal sequence, or if address out is up at least 250 μsec. while select out is up and subsequently select out drops while address out remains up. The presently connected control unit must then drop its operational in line, thus disconnecting from the interface.

The channel conditions the command out line to respond to a signal on an inbound tag line. During the initial selection sequence, the channel activates command out to reply to address in, indicating that a command byte is on bus in lines; the command byte specifies the I/O operation to be performed. Only at this point in the initial selection sequence does command out cause the selected control unit to decode the byte from the bus out lines. After the initial selection sequence, the command out response to address in means "proceed." A command out response to service in always means "stop." The command out reply to status in causes the selected control unit to "stack," i.e., hold, the status data. When command out is raised to indicate proceed, stop or stack, bus out must have a byte of all zeros, but need not necessarily have correct parity. The command bytes on the interface are defined as follows:

The Read command initiates execution of data transfer from the control unit to the channel. A Read command with all modifiers set to zero is a basic Read command that is also used as an initial program loading read. The Read command will be used for transmitting from a scanner to the channel. The Read Backward command initiates an operation in the same manner as the Read command, except that the data bytes are transferred to main storage by the channel in the reverse order to that of Read. This command is considered as an invalid command to the adapter.

The sequence of signals over the I/O interface to perform a Write operation is the same as for Read. In the case of Write, however, the data is sent from the channel to the printer.

The control operation proceeds similarly as Write, except that the command modifier bits received by the control unit are decoded to determine which of several possible functions is to be performed. A control command with all 0 modifier bits performs no operation at the I/O device, except to satisfy any previously indicated chain operations. This variation of the control command is called a no operation control and is used as such with the adapter. When the modifier bit number 5 is marked, the command will be recognized at the adapter as the end of page. This signals the adapter that the channel has completed transmission of the current document.

The test I/O command allows the address control unit to send pending status information to the channel. If no status is pending, a 0 status byte is set. If status information is available, all pending status bits for the selected I/O device are transmitted to the channel.

The sense command initiates a sense operation on all I/O devices. The basic sense command does not change the mode or status of the control unit, or initiate any operation other than to sense the indicators. To reiterate, the commands are Test I/O, sense, Read Backward, Write, Read, Control (No Op).

The sense byte format is as follows:

| Bit | Designation |
|---|---|
| 0 | Command Reject; invalid command, decoded by adapter. |
| 1 | Intervention Required; request for manual intervention. |
| 2 | Bus Out check; adapter detects parity error. |
| 3 | Equipment Check; adapter detects equipment malfunction. |
| 4 | Data Check; not used by the adapter. |
| 5 | Overrun; adapter detects timing overruns. |
| 6 | Abnormal Command Sequence; adoption of commands, e.g. read, write, read. |
| 7 | Not used. |

To return now to the definitions of the interface lines, the service out line is a line from the channel to all attached control units and is used to signal the selected I/O device in recognition of a signal from the service in or status in line. A signal in the service out line indicates to the selected I/O device that the channel has accepted the information on bus in or has provided on bus out the the data requested by service in. A service out response to status in while suppress out is up indicates to the control unit that the operation is being chained and that this status is accepted by the channel. Command-chaining means that another command for the I/O device in operation will immediately follow the presentation of device end, providing no unusual conditions were encountered during execution of the current operation.

The address in line is a line from all attached control units to the channel and is used to signal to the channel when the address of the currently selected I/O device has been placed on bus in. The channel responds to address in by means of command out. Address in must stay up until the rise of command out. Address in must fall in order that command out may fall.

The status in line is the line from all attached control units to the channel and is used to signal the channel when the selected I/O device has placed status information on bus in. The status byte has a fixed format and contains bits describing the current status at the control unit. The status byte has the following format:

| Bit Position | Designation |
|---|---|
| P | Parity |
| 0 | Attention |
| 1 | Status Modifier |
| 2 | Control Unit End |
| 3 | Busy |
| 4 | Channel End |
| 5 | Device End |
| 6 | Unit Check |
| 7 | Unit Exception |

The attention bit in the status byte is generated when some asynchronous condition occurs in the input-output device. The adapter uses the attention bit to flag the computer that a scanner wants to input date to the channel. The adapter does not use the status modifier nor the control unit end bits.

The busy bit is a status indication to the channel that the control unit cannot execute a command because a previously initiated operation is being executed or because status conditions exist.

The channel end bit in the status byte is caused by the completion of the portion of an I/O operation involving transfer of data or control information between the I/O device and the channel. For operations such as writing, some I/O devices generate the channel end condition when the block end has been written. The adapter generates channel end at the end of each input record and at the end of each output record.

The device end bit is caused by the completion of an I/O operation at the I/O device whereby manually changing the device from the not ready to the ready state. The device end condition normally indicates that the I/O device has completed the current operation. The adapter uses the device end bit with the channel end bit since each record, i.e., input or output, is considered as an input-output operation in itself.

The unit check bit indicates that the I/O device or control unit has detected an unusual condition that is detailed by the information available to a sense command. For example, unit check may indicate that a programming or an equipment error has been detected. The unit check bit provides a summary indication of the conditions identified by sense data. The adapter uses unit check to indicate to the channel that some error condition exists, whether it be in the adapter, scanner, printer, communications link or the channel itself.

The unit exception bit is caused when the I/O device detects a condition which usually does not occur. Unit exception has only one meaning for any particular command and type of I/O device; therefore, a sense operation is not required as a response to the acceptance of a unit exception condition. The adapter uses the unit exception bit to indicate the end of a document to the channel. It is given with device end and channel end bits.

Returning now to the definitions of the interface lines between the adapter and the computer, the service in line is a line from all attached control units to the channel and is used to signal to the channel when the selected I/O device wants to transmit or receive a byte of information. The nature of the information associated with service in depends upon the operation of the I/O device. The channel must respond to service in with service out, command out or in the disconnect sequence by address out.

The select out line goes from the channel to the highest priority control unit and from that control unit to the control unit next lower in priority. This propagation of select out continues on down to the control unit of the lowest priority and from there returns to the channel in the form of the select in line. The select out and select in lines provide a loop for scanning the attached control units. If a control unit does not require selection, it must propagate the signal to the next control unit. Once a control unit propagates the select out to the next lowest priority unit it cannot get the channel's attention until the next rise of the select out signal.

The hold out line is a line to all attached control units and is used to enable the select out line. Select out can be acted upon by control units only when hold out is up.

The suppress out line runs to all attached control units and can be used by itself or with outbound tag lines. This signal can suppress data, suppress status, indicate command chaining, and for selective reset. Operations whose rate of data transfer can be adjusted without overrunning are subject to suppression of data by suppress out. Completely buffered I/O devices and start/stop devices fall into this category. The adapter cannot have its data suppressed without creating an overrun condition. The adapter can, however, have its data suppressed without creating an overrun condition if the channel drops suppress out in time for the adapter to resume normal signal sequencing without getting out of sync with the adapter's time base generator.

The select in line runs from the lowest priority control unit to the channel. The select in is the propagation of select out back to the channel from the last control unit on the line.

A control unit conditions the request in line to indicate that it will initiate a signal sequence when select out polls that unit again. Request in can be signalled by more than one control unit at a time. The adapter uses the request in line to signal the channel that a scanner wants to input data to the channel.

All lines from the channel to control units, except the suppress out line, are invalid when the operational out line is not conditioned. If the channel drops operational out while a control unit is executing an I/O operation, the operation must be reset.

Operational in is a line from all attached control units to the channel and is used to signal the channel that a control unit has been selected. It must stay up for the duration of this selection. The selected I/O device is identified to the channel by the address byte transmitted over bus in.

Overall System

Figure 3A:
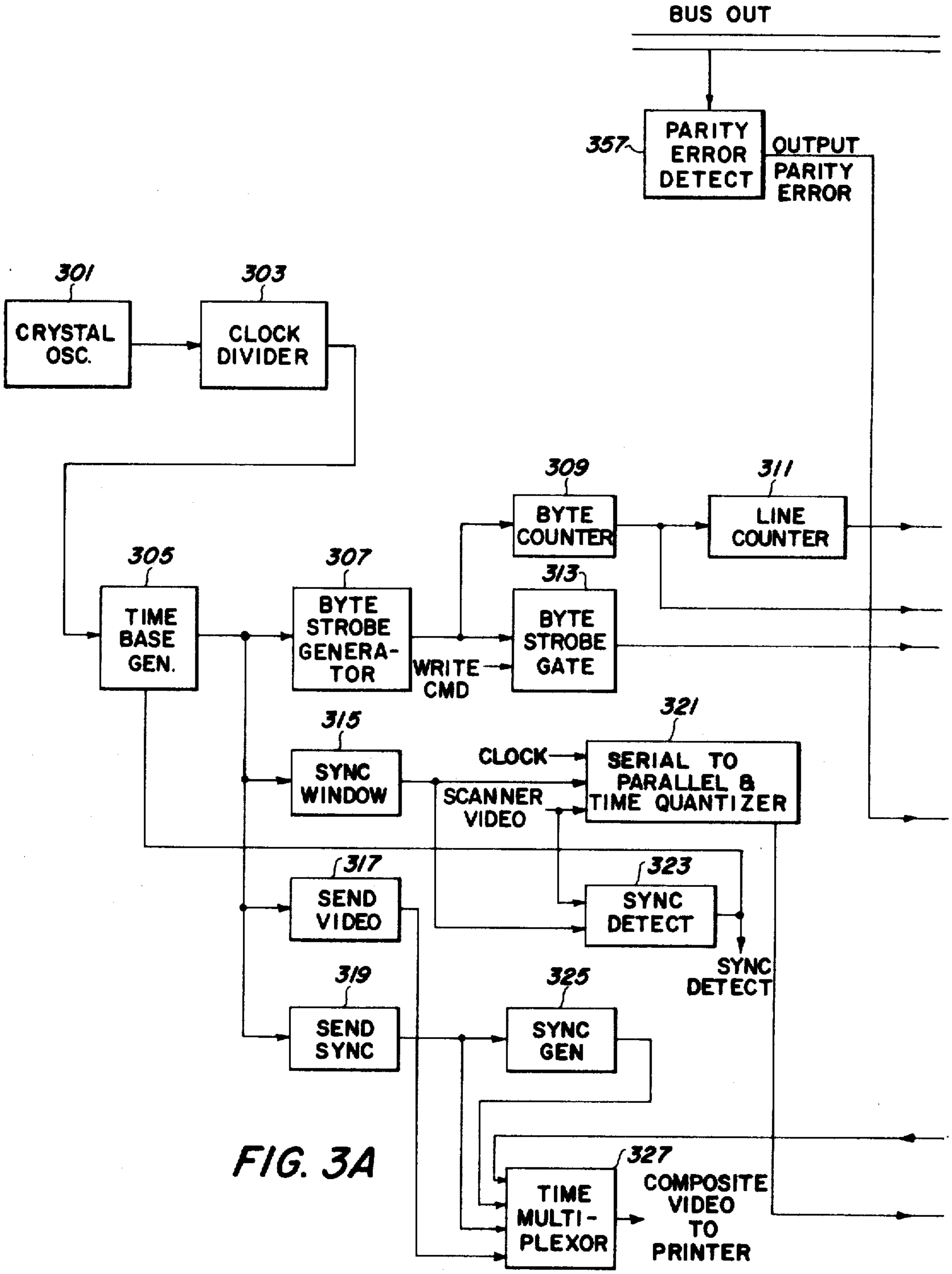
FIGS. 3A to 3C comprise a block diagram of the logic components within the adapter.
Figure 3B:
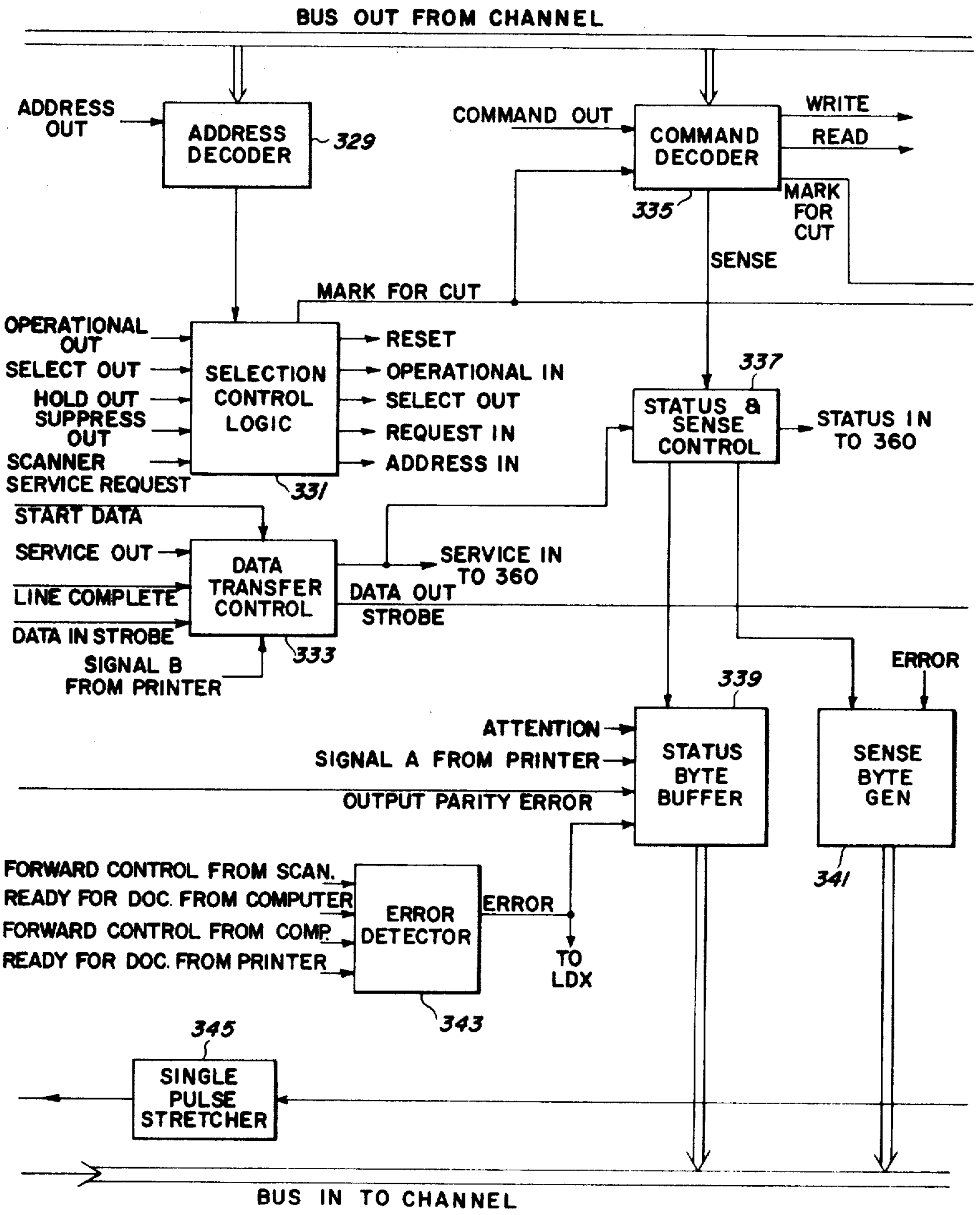

Referring now to FIG. 3, there is shown a block diagram of the internal circuitry of the computer adapter. To reiterate, the adapter is provided as an interface between the LDX system and the System 360 computer in order to provide direct read in or read out of the information on a document to provide a hard copy under the control of the computer. Such an interface is necessary in that the LDX system generates video as serial data while the computer generates and must receive information in parallel form. In addition, the LDX system is an asynchronous system while the computer is a synchronous system, which leads to the provision of time quantizing of the video in the adapter when an LDX scanner is communicating with the computer.

The crystal oscillator 301 is the oscillator used for all basic timing in the adapter. The frequency of the oscillator is 604.8 kc. within a 0.01 percent error. The clock divider 303 is used to count down the basic clock frequency set forth above as 604.8 kc. for quantizing and control timing for both Telpak A and Telpak C speeds. The time base generator 305 is the master timing source for all adapter operations. There is no synchronization of the LDX equipment to the adapter time base generator or vice versa. The adapter accepts the sync burst from the scanner in an asynchronous manner. The adapter sync detect signal can occur at any time with respect to the adapter clock phase. The only attempt to get in step with the scanner transmission is the resetting of the adapter time base generator with the sync detect signal. This does not correct for the clock phase error which can occur, however. The error due to the phasing difference of the adapter and scanner clocks can be as much as plus or minus one bit time, i.e., quantizing bit time.

The byte strobe generator 307 functions to control the generation of the service in request to the channel. This indicates to the channel that bus in has data for input in a Read operation with the adapter ready for data on the bus out lines in a Write operation. The byte strobe gate 313 is part of the byte strobe generator function. Logically it is used to generate the service in request with the byte strobe generator 307. The byte counter 309 keeps a running account of input and output bytes transferred between the adapter and channel, and signals the adapter control logic when a complete line has been transferred, which for the system is defined as 128 bytes of 8 bits per byte.

The function of the line counter 311 is to keep account of the number of scan lines transferred from the start of the mark for cut signal to the start of "good" video transmission. The video sent during this time is considered to be "garbage" video and on a Read operation is not sent to the channel. In a Write operation, the adapter will send all white data as the "-garbage" video. This time delay is required because of the inherent operation of the LDX equipment.

The function of the sync detector 323 is to decode the 18.9 kc. sync burst from the scanner and start the adapter-timing sequences. The sync burst from the scanner is a stream of eight 18.9 kc. pulses. The sync detector triggers on the sixth sync pulse received and starts the time base generator from zero.

The function of the sync window circuitry 315 is to gate the sync detector on or off. The sync window will normally be open allowing the detector to look at everything on the data line. Once the sync burst has been detected, the sync window closes so that no false sync indications will be detected during video time. The sync window will open again when the time base generator signals it. This will be during the guard time which follows video transmission.

The serial to parallel input register 321 serves a dual purpose; (1) it takes the serial data stream and converts it to eight bit parallel bytes for input to the channel, and (2) it time quantizes the scanner's asynchronous data output. The data quantizing is actually a side effect of merely clocking the asynchronous data into the input register. The quantizing rate for the system is 3.31 $\mu$sec. for operation at C135 speed and 19.02 $\mu$sec. for A135 speed. This turns out to be two clock periods at 11.5 clock periods respectively. The output of the register goes directly to the channel bus in lines.

The forward control generator 349 functions only during a Write mode. The main portion of the forward control generator is to generate Signals 1, 2 and 3 (the forward controls) for input to the LDX printer. When the adapter is idle, i.e., it is neither in a Read nor Write mode, the forward control generator sends Signal 1 to the printer and if the printer is ready receives Signal A. When the mark for cut signal is decoded by the command decoder during a Write operation, forward control generator 349 sends Signal 3, mark for cut, to the printer for approximately 250 msec. Following the mark for cut signal the forward control generator sends signal 2, run footage meter, to the printer or Signal 1, adapter ready, depending upon whether the mark for cut signal is the leading edge cut or the trailing edge cut respectively.

The reverse control generator 351 functions only during a Read mode. The main purpose of the reverse control generator is to generate signals A and B for response to the LDX scanner. In the idle mode, the adapter sends signal A to the scanner if signal 1 is being received by the adapter. In a Write mode, signal A is dropped to the scanner so that the adapter cannot be interrupted by the scanner while transmitting to the printer from the channel. If the adapter is not in a Write mode and sync bursts are detected from the scanner, the adapter immediately goes through a hand-shaking procedure with the channel and when the channel signals it is ready to accept data the reverse control generator 351 sends Signal B to the scanner indicating that the adapter is ready and online with the channel.

The channel interrupt generator 355 causes a channel interrupt in response to a scanner service request. When the adapter detects sync while in idle condition, the channel interrupt generator originates a control unit initiated selection sequence by giving an attention status to the channel. This tells the channel that a scanner wants to input data.

Send sync 319 generates the send sync signal only during a Write operation. The purpose of the send sync circuit 319 is to signal the sync generator when to generate the sync burst for transmission to the printer. The send sync circuit is simply a decoder which runs directly off of the time base generator 305.

The function of the sync generator 325 is to generate an 18.9 kc. sync burst on command from the send sync circuit. The sync generator will generate the 18.9 kc. signal as long as the send sync signal is up. The send sync circuit will allow eight complete 18.9 kc. cycles to be generated for each cycle of the time burst generator during Write operations.

The send video circuit 317 is a time base generator decoder which controls the transmission of data to the printer during a Write operation. It gates the data from the channel into the time multiplex or circuit which goes directly to the printer.

The parallel to serial output register 347 accepts eight bit parallel bytes from the channel bus out lines and serializes the data for input to the printer. The shift clock will be 3.31 $\mu$sec. for C135 speed and 19.02 $\mu$sec. for A135 speed, the same as used for inputting data from a scanner.

The single pulse stretcher 345 takes the serial output of the output register 347 and extends any single pulses (3.31 or 19.02 $\mu$sec.) to 4.3 or 20 $\mu$sec. depending on the operating LDX system speed. This is required because the input quantizing rates are higher than the communications equipment can handle. For example, a 3.31 $\mu$sec. single pulse would be stretched to 4.3 $\mu$sec. so that the communications link would properly pass it. Two successive pulses of 3.31 $\mu$sec. would not be stretched but passed as a 6.62 $\mu$sec. pulse. Only the single pulses are affected by the single pulse stretcher 345.

The function of the multiplexor 327 is to combine the sync bursts and video into a composite video signal for direct input to a printer. The send sync and send video circuits control the time multiplexor for proper sync burst and video multiplexing. The output of the time multiplexor 327 is very similar to a standard LDX model 1A scan line format.

The function of the error detector 343 is to signal the channel and/or the LDX equipment of any fault detected by the adapter. The adapter will signal a fault to the LDX equipment by dropping either forward or reverse controls depending upon whether a Read or Write operation is underway. The adapter signals the channel of a fault by use of the unit check bit in the status byte and also by use of the sense byte.

The selection control logic 331 controls the interlocking signal sequence and the selection signal sequence between the adapter and the channel. The selection control logic 331 acts as the main control function for all communications between the adapter and channel.

The data transfer control 333 controls the generation of the service in request to the channel and also generates the data out strobe for setting the data on the bus out lines into the output register 347. The data out strobe is a direct result of the service out line from the channel which indicates that data is on the bus out lines.

The function of the address decoder 329 is to decode all channel output addresses and signal the adapter control logic when a printer or scanner address has been decoded. The address decoder 329 monitors the bus out lines and samples the lines on the rise of address out. The address decoder can be preset to decode any two addresses from 0 to 255. One address would be for a printer and the other address would be for a scanner.

The purpose of the command decoder 335 is to decode all commands sent to the adapter from the channel. The command decoder monitors the bus out lines and samples the lines on the rise of command out. The command decoder will recognize the five basic commands as hereinbefore set forth: Test I/O, Sense, Write, Read, and No Op control. The mark for cut and end of page commands will be multiplexed in with the write and no op control commands respectively. The command decoder outputs initiate all adapter signal sequences.

The status byte buffer 339 sets the proper status bits for input to the channel. The status byte generator gives the present status conditions of the adapter to the channel. The output of the status byte generator goes to the bus in lines and is strobed into the channel on the rise of status in.

The sense byte generator 341 gives additional information on a unit check status. The sense byte generator functions on command only. When the command has been decoded, the sense byte generator initiates a sense input sequence. The sense byte is used to describe all fault conditions. The sense byte is transmitted to the channel as a data byte by raising service in.

The function of the status and sense control 337 is to control the timing and generation of the status and sense bytes. The function of the address encoder 353 is to place the scanner or printer address on the bus in lines for input to the channel. The address encoder must be able to encode any address which has been preset for the scanner and printer.

The parity error detector 357 functions to check all output bytes for odd parity. If a parity error is detected, the detector will signal the status byte generator 339 to set the unit check bit and the sense byte generator 341 to set the bus out check bit. The function of the odd parity generator 359 is to generate an odd parity bit for all input bytes on the bus in lines.

Operation

The discussion that follows is a detailed description of the input operation from an LDX scanner to the interface computer adapter to the system 360 computer. Following this discussion will be a detailed description of an output operation from the System 360 computer to the adapter to an LDX printer. During this discussion certain components will be discussed as internal to the LDX scanner and printer units and such apparatus forms no part of the present invention. For disclosure and discussion of these internal components reference again is made to U.S. Pat. Nos. 3,149,201 and 3,303,280 which are drawn to the overall LDX circuitry.

Operation, therefore, commences with the LDX scanner in a ready condition. After power turn on, the LDX scanner filament warmup timer will time out. If the sweep generation circuitry and minus 65 v. power supply are operable, i.e., in a nonfault condition, the scanner generates a signal 1 which shall be passed to its appropriate interface line. When this signal is detected at the adapter and a signal A is returned from the interface, the scanner will go to its "ready" state. This condition indicates that the scanner is on line to a printer, i.e. or simulated printer as the adapter, and no fault conditions exist in the system.

To scan and transmit a document to the interface, the "-transmit" button on the scanner is depressed. This action causes a sync burst to be multiplexed into the output video stream, once per scan line. The receipt and detection of the burst along with other interface condition checks shall cause a signal B to be returned to the scanner. The detection of this signal in a nonfault condition turns on the cathode ray tube beam and video is generated as a document is scanned. This in turn will energize the main paper drive and the document will be drawn into the scanning area of the LDX scanner.

As the document is drawn into the scanning area it passes over the paper control switch which shall generate signal 3, mark for cut, for approximately 250 msec. and then signal 2, run footage meter. Signal 1 is dropped for the duration of both signals 2 and 3. Both synchronizing bursts and two-level video information are transferred to the interface.

As the document passes over and releases the paper control switch, signal 3 is generated again and the scanner reverts to sending signal !. See FIG. 2 for the application of the interface signals. Simultaneously a clearing timer is actuated. The timer causes the synchronizing burst to continue for the duration of the time out. This causes signal B to be returned from the interface and by methods previously described keep the main drive operating. When the time out period expires, the generation of the synchronizing burst ceases, causing the interface to revert from sending signal B and return to sending signal A. The scanner drive motor turns off and the system is now in a ready condition.

The input mode originates when a document is inserted into the scanner and the transmit button is depressed. Prior to this the scanner is sending signal 1 to the adapter, if the adapter is on line and is ready, it sends signal A to the scanner. The transmit button causes sync bursts to be sent to the adapter, and when the adapter recognizes sync it knows the scanner wants to send data and initiates a request in signal to the channel. The next time the channel polls the adapter with select out, the adapter brings up its operational in line to let the channel know an I/O device has been selected. The adapter also stops the propagation of select out to the next control unit.

After the adapter captures the channel with operational in, it must let the channel know which control unit is on the line. The adapter does this by placing the scanner address on bus in and raising the address in tag line to the channel. When the channel recognizes the address, it will bring up command out which in this case merely means to proceed with the signal sequence. The command byte will be zero and does not need decoding by the adapter. Upon receiving the command out signal, the adapter places attention, and device end status on the bus in lines and then brings up the status in line. This transfers the scanner request for attention to the channel and ends the current I/O sequence. When the channel accepts the status byte, it responds with service out to the adapter. The adapter has now completed its initiated selection sequence and must wait for the channel to come back and select it before any more communication is carried on between the adapter and the channel.

After the completion of the adapter-initiated selection sequence, the channel must have the proper program loaded from its internal storage to operate with the scanner input. The channel will then select the adapter by placing the scanner address on bus out and bringing up address out to all control units. The adapter will recognize the address and bring up operational in to let the channel know a control unit is on the line. The adapter must now place the scanner address on bus in and bring up address in to verify to the channel that the right control unit is on the line. The channel will respond, if it verifies the address, by placing a Read command on bus out and bringing up command out. The adapter will place a zero status byte on bus in and bring up status in to let the channel know that no outstanding status condition exists at the adapter and everything is in proper condition to continue the signal sequence. The channel will bring up service out to indicate acceptance of the status byte.

The channel is now prepared to accept data from the scanner, the handshaking procedure has been completed and the channel is waiting for the adapter to continue the Read sequence. The adapter now sends signal B to the scanner to indicate the adapter is ready and the channel is on line and waiting. Signal B starts the document-feeding at the scanner and video to be transmitted. No action is taken at the adapter until signal 3, mark for cut, is received. At that time sync bursts are counted at the adapter until the number of scan lines corresponding to the distance between the mark for cut switch and the actual document-scanning position is reached. This is approximately 540 scan lines and corresponds to the "garbage" video as was hereinabove set forth.

After counting the required number of scan lines, the adapter treats the very next scan line as the first line of the document to be inputted to the channel. The adapter recognizes sync, resets its time base generator and starts counting clock pulses (3.3 $\mu$sec. for Telpak C speed and 18.6 $\mu$sec. for Telpak A speed). When the guard time count has elapsed, the next clock period will represent the first "good" video bit. The first eight "good" video bits are time quantized and shifted into the input serial to parallel register. The adapter now brings up service in to the channel signifying that data is on the bus in line. The channel must come back with service out within one clock time to indicate acceptance of the data. Eight more video bits are shifted into the input register and service in is again raised by the adapter. The channel responds again with service out indicating that it has accepted the data. The signal sequence continues until 128 eight bit bytes have been inputted to the channel. On the 129th byte, the adapter brings up service in as usual but now does not expect a service out response by the channel because the channel word count should now be zero and the channel should respond to service in with a command out signal indicating it is stopping the current operation.

When command out has been received, the adapter replies with a channel end, device end status byte to acknowledge the end of the current operation. The channel responds with service out to show acceptance of the status byte. The first scan line comprising 1024 bits has now been transferred to the channel. The adapter must now wait until the channel starts the next signal sequence by bringing up the scanner address again. The adapter and channel go through the same handshaking signal sequence to be completed before the detection of the sync burst of the next scan line. The channel will have approximately 800 $\mu$sec. from the end of one operation until sync is detected in the adapter for the start of the next operation. The handshaking sequence must be completed at this time so that data transfer can occur immediately or else an Overrun condition could occur, causing a unit check status.

In normal operation, the handshaking sequence will take place and the adapter will be waiting to detect sync before it starts the service in and service out sequences for data input to the channel. The handshaking sequence is repeated for every scan line of data, this continuing until the adapter receives the second mark for cut signal, whereupon at that time the adapter again counts approximately 540 scan lines and then ends the overall operation. When the adapter reaches the 540 count after the mark for cut signal, it sets the unit exception bit along with the device end and channel end bits in the last status byte. The channel will recognize the unit exception signal as the end of the document and does not continue the signal sequence. The scanner will not be addressed again by the channel until the scanner initiates another Read operation with request in. The total document has now been transferred to the channel. The scanner times out and stops sending sync bursts, with the adapter then dropping signal B and reverting to the ready mode.

The following detailed description is the output operation from a computer through the adapter to the LDX printer unit. After power turn-on, the filament warm up timer will time out and power will be applied to the xerographic fuser therein. When the fuser comes up to operating temperature, and the CRT sweep generation circuitry, 65 power supply, and process interlocks are operable, the printer will be conditionally ready, i.e., needing only a forward supervisory signal to go to its ready state. This is accomplished when the interface adapter supplies signal 1. The printer then returns signal A to the interface indicating that no fault conditions exists in the system.

To cause the print out of video information the interface supplies a synchronizing burst, once per scan line to the printer. The printer detects this burst and uses this information to cause phase and frequency locking to the scan period supplied from the interface. When the scanner in sync circuitry is satisfied, i.e. approximately six scans detected in phase with its internal sweep generation, power is applied to bring the fuser into the correct position. When this is accomplished signal B signifying printer ready and drive on, is sent to the interface and signal A is dropped. The interface can now reliably send video information to the printer.

The video information from the interface is used to control the cathode ray tube beam and cause actual printing via the xerographic drum as seen in above-mentioned U.S. Pat. No. 3,149,201. The interface supplies the following forward controls to accompany the printing process: signal 3, 250 msec. long, to cause a cut at the top or leading end of the output document, signal 2 to indicate the length of the document and operate the footage meter, and signal 3 again to cause a cut at the trailing edge of the output document, at this time the interface shall revert to supplying signal 1 to the printer.

The synchronizing burst shall be sent as long as video information is transferred to the printer to insure proper scan synchronization for printout. The disappearance of the synchronizing burst shall cause the printer to stop sending signal B and revert to signal A. At this time the printer clearing timer will activate. This keeps the drive motor operating and the fusing process operable until the clearing timer times out.

In the channel Write mode, the adapter to channel handshaking procedure is the same as for the Read mode. The channel initiates the operation by bringing up the printer address. The adapter responds with the same signal sequences as it did for the Read mode.

In the ready state, the adapter sends signal 1 to the printer and receives signal A indicating printer ready. The adapter is free to pursue any channel initiated signal sequence when signal A is present. When the adapter recognizes printer address, it immediately sends sync bursts to the printer. The printer will send back signal B to the adapter indicating printer ready and motors on. The printer is now ready to receive data from the adapter. As soon as the adapter completes the initial handshaking with the channel, it decodes the command byte, which should be a Write command, to see if the channel also wants to mark for cut or not. If a mark for cut is decoded, the adapter will immediately send signal 3 to the printer and start the 540 scan line time out before "good" video is sent to the printer. If no mark for cut is indicated, signal 3 will not be sent to the printer but the 540 scan line delay will still be used. This delay is utilized in that an LDX printer has its cutter placed away from the writing scanning station. Thus the delay is utilized to allow the last bit of video being imprinted on the paper from the supply roll to pass the paper cutting switch before the initiation of the Write operation again. If this delay was not initiated into the system, the paper cut switch would cut the paper in the middle of good printed information in addition to separating the video representative of one document onto two separate sheets.

After the 540 scan line time out, the adapter starts taking information from the channel by the service in and service out routine and time multiplexing the data in the right time slot between sync bursts. The adapter takes the 8 bit byte from the channel and serializes it for input to the printer. After transmission of the last bit, the adapter requests another byte of data with service in. This continues for 128 bytes. Since the output record length does not have to be 128 bytes as the input record length must be, this may or may not be the end of the input record. The adapter tests the channel by giving the 129th service in and if command out is received the channel word count of zero on the output record is completed. The adapter must then present a channel end and device end status byte to the channel to acknowledge the end of the current operation. The channel will respond with service out to show acceptance of the status byte.

If the channel responds to the 129th service in request with service out, the channel word count is not zero and the output record has not been completed. The adapter must now stall the channel by not strobing the 129th byte into the adapter until the printer has retraced and is ready to accept the start of the next scan line. The adapter does this by not giving any more service in requests until the time base generator indicates the printer should be ready. At that time the adapter strobes the information on the bus out lines into the output register without giving a service in request. The data from the 129th service in will still be on bus out and the adapter can strobe it into the input register at its convenience. The adapter, with time base generator timing control, shifts the 129th byte to the printer and the normal service in and service out routine continues until 128 more bytes have been taken. The adapter must then test again for the end of record. This control sequence continues until the adapter decodes the end of page command from the channel, thus indicating the channel has completed transmission of the current document. When end of page is recognized, the adapter also decodes for the mark for cut command. If mark for cut is present, the adapter will immediately send signal 3 to the printer and stop sending sync bursts. The printer will drop signal B and start its clearing timer to keep the printer drive motor on until the document clears the machine. If no mark for cut is decoded by the adapter, signal 3 is not sent but the sync bursts are stopped as before. The printer does not cut but it does activate its clearing timer for running the document out of the machine.

The adapter responds to the end of page command with a channel end and device end status byte. The channel replies with service out when it accepts the status byte. This ends the Write operation to the printer.

Circuit Components

Figure 4A:
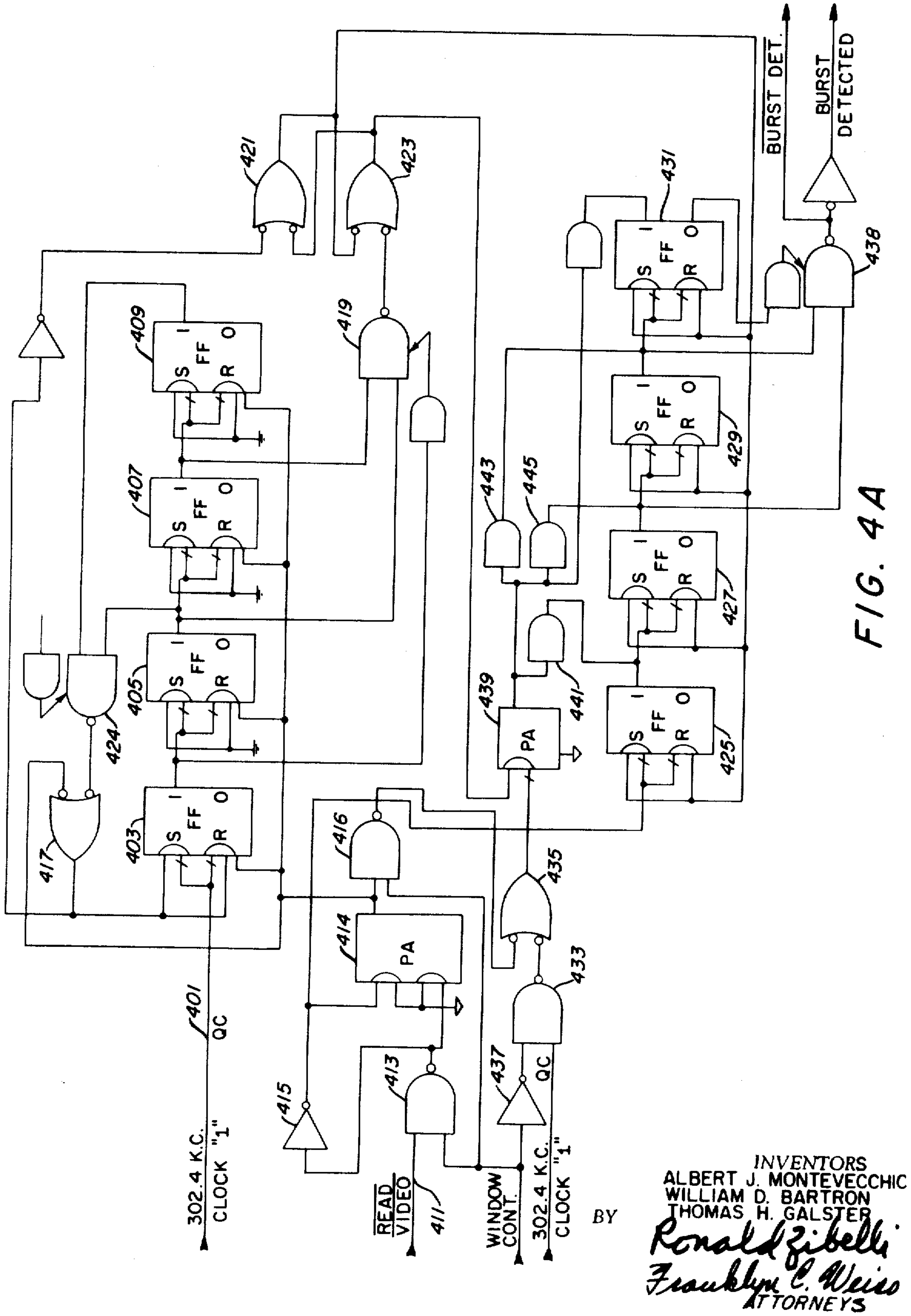
FIGS. 4A and 4B is the logic circuitry for the sync burst detector.
Figure 4B:
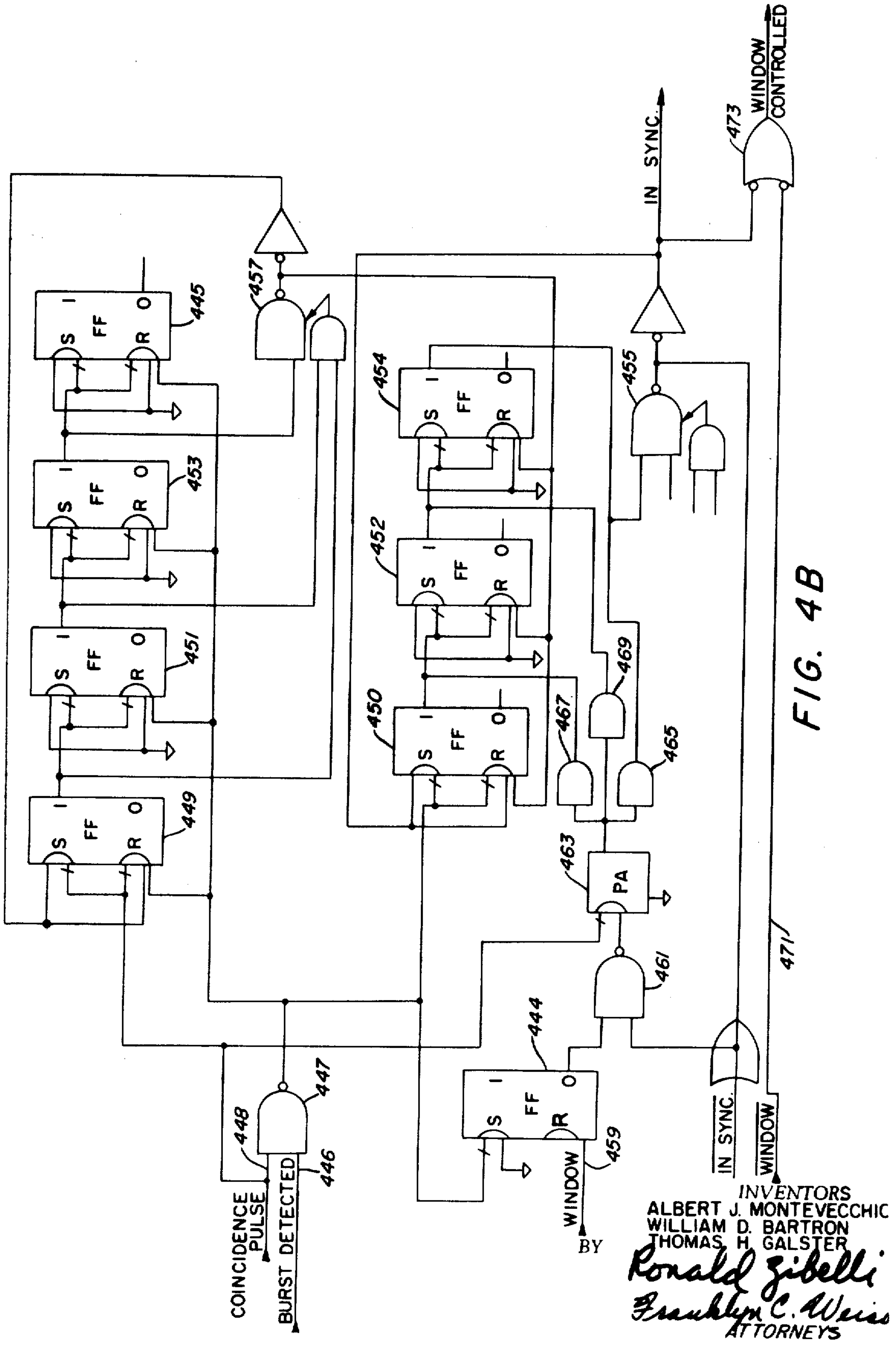

Referring now to FIGS. 4A and 4B, there is shown the sync burst detector 323 which was described in conjunction with FIG. 3A. As was hereinbefore set forth, the sync detector's function is to decode the 18.9 kc. Sync Burst from the scanner and start the adapter timing sequences. On line 401 is the quantizing clock rates from the time base generator, which for Telpak A speed is 52.6 kc. and for Telpak C speed is 302.4 kc. This clock signal is entered into flip-flop 403, which is the first flip-flop of a counter comprising flip-flops 403, 405, 407, and 409. The sync bursts are received on line 411 on the not Read video line, which is generated at the reverse control generator shown in FIG. 5A. When the window signal is received, which is open when the sync bursts should be received, the NAND gate 413 is enabled and the signals are passed to the upper counter through pulse amplifier 414 via inverter 415.

Inasmuch as these circuits in the computer adapter utilize negative logic, the leading edge of the signal enables the negative OR gate 417 while the lagging edge resets the flip-flops 403, 405, 407, and 409. The sync burst signals are passed through the gate 417 to the inputs of flip-flop 403. The clock signal on line 401 is the other input to flip-flop 403, thus the upper counter will begin counting the higher rate clock as the flip-flop is enabled by the longer sync bursts. When the counter has counted seven clock signals, the first 18.9 kc. pulse in the sync burst of eight such pulses has been detected. NAND gate 419 decodes the seven count and sets the latch comprising gates 421 and 423. This enters the count of one into the lower counter comprising flip-flops 425, 427, 429, and 431, indicating that the first pulse in the sync burst has been detected. If the upper counter counts up to 10 without detecting the first sync pulse in the burst, the latch is reset through inverter 420 by the action of NAND gate 424 decoding the count of 10. If the output of gate 424 is not at the count of 10, a logic one level appears at the input to gate 417 thereby resetting the flip-flop 403. As the lagging edge of the first pulse in the sync burst arrives at the upper counter, via gates 413 and 415, the upper counter is reset to begin the counting sequence again for the detection of the second 18.9 kc. pulse in the sync burst.

The 302.4 kc. clock from the time base generator is also presented to gates 433 and 435 in the coincidence of the window controlled signal through inverter 437 and gate 416. It is this pulse which counts the lower counter when enabled by the count of one from the gate 423. As the sync pulses in the sync burst are detected at the upper counter, the lower counter is monitoring the number of pulses detected. While eight 18.9 kc. pulses in the sync burst are transmitted, the detection of six consecutive sync pulses in the burst are enough to give an indication that the signal being decoded is a true sync burst signal. Thus, NAND gate 437 monitors the count in the lower counter and when a count of six is reached, the burst detected signal is given. If, however, the signals detected in the sync burst detector in this FIG. 4A is not a true sync burst signal, then pulse amplifier 439 through disc gates 441, 443, and 445 resets the lower counter to zero to enable it to begin counting the sync pulses at the next opportunity.

Referring now to FIG. 4B, the second part of the sync burst detector is shown. Now that a true indication of a sync burst being transmitted has been detected at the adapter, four such sync bursts must be detected in order to place the adapter in true synchronism with the LDX scanner. In other words, the circuitry in FIG. 4A detected the true presence of a transmitted sync burst. The circuitry in FIG. 4B, however, detects the condition of four consecutive true sync burst signals in order for synchronism to take place. On line 446 is the burst detected signal generated in conjunction with FIG. 4A above. This signal is applied to NAND gate 447, as in a coincidence pulse on line 448. This coincidence pulse is from the time base generator and is present when the time base generator from other enabling signals determines that synchronism should occur within this predetermined time period. Thus, if burst detected is a false signal, the lack of a coincidence pulse from the time base generator will cease the sync detection. Inasmuch as the sync burst is transmitted at the end of each scanned line on a document, one coincidence pulse will appear on line 448 for each line and therefore each sync burst.

The presence of the coincidence pulse begins the counting in the upper counter comprising flip-flops 449, 451, 453, and 445. This upper counter counts the noncoincidence of the coincidence pulses and the burst detector pulses. In other words, whenever there is not a burst detected signal on line 446 the upper counter begins to count this situation. Whenever there is, however, a true burst detected signal on line 446 together with a true condition of the coincidence pulse on line 448, the output from NAND gate 447 will be in the logic 0 state, thus resetting all the stages in the upper counter. This same reset signal appears as an input to flip-flop 448 which enables the lower counter. Thus, the lower counter comprising flip-flops 449, 451, and 453 begins to count the coincidence of the coincidence pulses and the burst detected pulses appearing on lines 448 and 446. When the lower counter has detected four coincidences of the coincidence pulses and the burst detector pulses at NAND gate 455, an in sync signal is generated, thus enabling the adapter for subsequent functions. When the upper counter has decoded at NAND gate 457 a count of seven noncoincidences 446 the coincidence pulses and the burst detector pulses, the lower counter is reset and the sync detection process must begin again.

Another process for disabling the lower counter is the loss of the window signal appearing on line 459. The loss of the window, in which the sync detection process must take place, resets flip-flop 448 and through NAND gate 461 enables the pulse amplifier 463 through gates 465, 467, and 469, to reset the lower counter, thus inhibiting the generation of an in sync signal. When an in sync signal is generated in coincidence with the not window pulse on line 471, a window controlled signal is generated through NOR gate 473 for application to the circuitry in FIG. 4A.

Figure 5A:
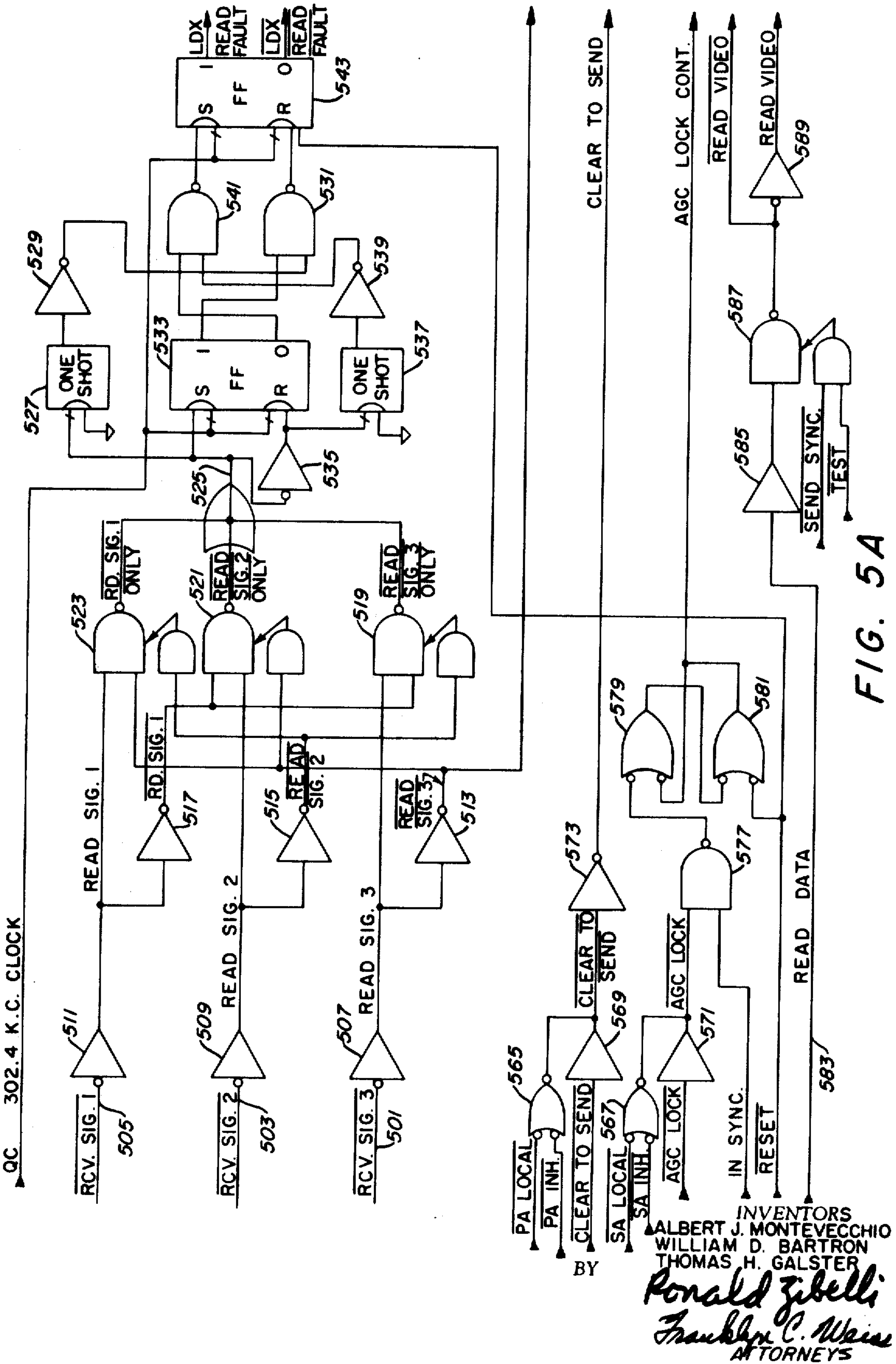
FIGS. 5A and 5B is the logic circuitry for the reverse control generator.

Referring now to FIG. 5A and B, there is shown the reverse control generator 351 which is utilized only during a Read mode. As was hereinbefore set forth, the main purpose of the reverse control generator is to generate signals A and B for response to the LDX scanner. At the left of FIG. 5A signals 1, 2, and 3, as hereinbefore defined, are received on lines 501, 503, and 505. These signals are applied to supervisory terminals 507, 509 and 511, the output thereof being the true Read signals 1, 2, and 3. These signals are applied to inverters 513, 515, and 517, in addition to NAND gates 519, 521, and 523, acting in an exclusive OR function. At the output, line 525 will have only one of the signals 1, 2, and 3. The output on line 525 is then applied to one shot 527 to generate a 1 msec. pulse which is inverted b inverter 529 for application to NAND gate 531. The signal on line 525 is also applied to the set side of flip-flop 533 and through inverter 535 to the reset side of the flip-flop. From the output of inverter 535 is a lead to a one shot 537 which generates a 100 msec. pulse which is inverted by inverter 539 for application to NAND gate 541. The outputs from NAND gates 531 and 541 are coupled to the reset and set sides respectively of flip-flop 543. The trigger inputs to flip-flop 533 and 543 is the 302.4 kc. clock from the time base generator. The action of the above circuitry is to allow certainty of a receipt of only one of signals 1, 2, and 3 for the particular length of time determined by the one shots 527 and 537. The output signals therefore, from flip-flop 43 are a Read fault or a not Read fault condition.

Figure 5B:
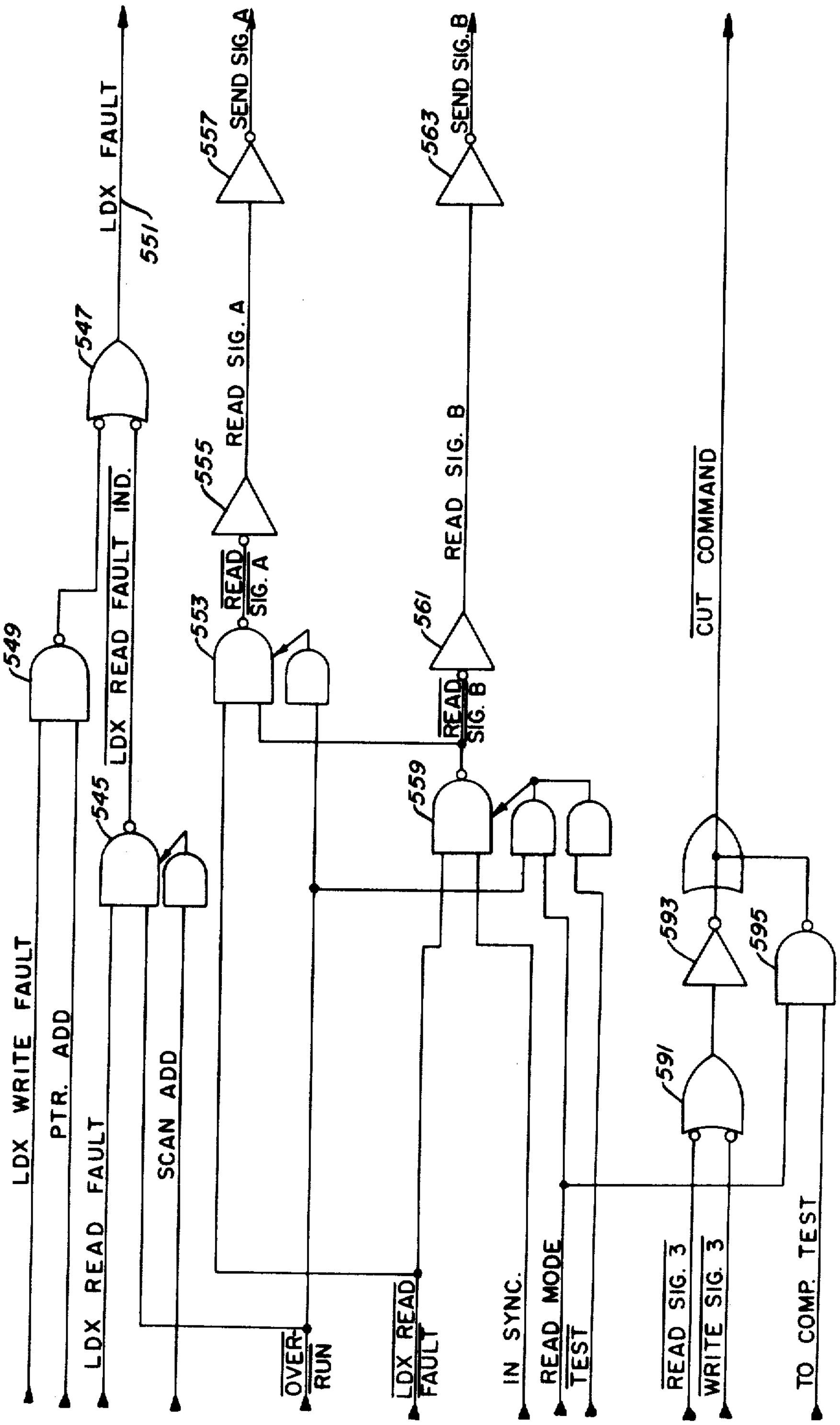

Referring now to FIG. 5B, the LDX Read fault signal is entered into one side of NAND gate 545 and the not overrun condition and the scanner is being addressed. The output of gate 545 will be a not Read fault indication, which through gate 547, being enabled through gate 549 indicating that the printer is not being addressed and a Write fault condition, the LDX fault signal appears on line 551. The reason for the scan address signal into gate 545 is that unless the scanner has been actually addressed by the computer, there would be no need to indicate a fault to the rest of the system.

Still referring to FIG. 5B, the not overrun signal together with the not LDX Read fault signal and a third input to gate 553 generates the Read signal A through inverter 555, and circuitry 557 to the scanner unit. The not LDX Read fault is one input to gate 559 and the other inputs are the in sync signal, the Read mode signal, and a not test signal. Thus, a signal will be generated at the output of NAND gate 559, indicating not Read signal B, if there is no LDX fault, this system is in synchronization, the Read mode is present and the system is not in test. The output of gate 559 is the other input to gate 553 and after being inverted by inverter 561, it is transmitted by driver 563 to the scanner as a not send signal B. Thus, if the mode is switched to a Write mode, the change in signal level on the input Read line would inhibit gate 559, thereby inhibiting the transmission of signal A in that the adapter cannot be interrupted by the scanner while transmitting to the printer from the channel. The transmission of signal B back to the scanner indicates that the adapter has gone through the handshaking procedure with the channel and is now indicating that the adapter is ready and on line with the channel.

Referring back to FIG. 5A, signals generated by the printer address circuits, i.e., not printer address local and not printer address inhibit, enable gate 565 and with the not clear to send signal from the data set through data terminal 569 generates the not clear to send signal which is inverted by inverter 573 to generate the clear to send signal. From the scanner address circuitry, i.e., not scanner address local and not scanner address inhibit, through gate 567 together with the not AGC lock signal from the data sent to data terminal 571, generates the not AGC lock signal for application to NAND gate 577. The other input to gate 577 is the in sync signal and the coincidence of these two signals generates a signal to enable the latch circuit comprising gates 579 and 581. This generates the ACG lock control signal. The clear to send signal and the AGC lock control signal is used by the sense logic as will be hereinafter more fully described. The not reset input line enables gate 581 and does not reset flip-flop 543, the fault indicator. Thus, in a reset condition the latch circuit of gates 579 and 581 would be disabled while flip-flop 543 would be reset. The data indication on line 583 and passing through data terminal 585 is applied to NAND gate 587. The other inputs to the NAND gate 587 indicate a not send sync condition and a not test state. That is, when sync is being transmitted or in a test condition, the input data is inhibited from being transmitted to the rest of the circuitry. The output from gate 587 is the not Read video and after inversion through inverter 589 is the Read video signal for application by subsequent circuitry.

Referring again to FIG. 5B, NOR gate 591 has as its input not Read signal 3 and not Write signal 3. Since only one of these signals can exist at one time, the output from gate 591 and inverted by inverter 593 is transmitted as a not cut command. This is an indication that a paper cut command should not be transmitted while a Read or Write function is in progress. In a similar manner the to computer test input to gate 595 also generates the not cut command indicating that a cut command should not be transmitted in a computer test.

Figure 3C:
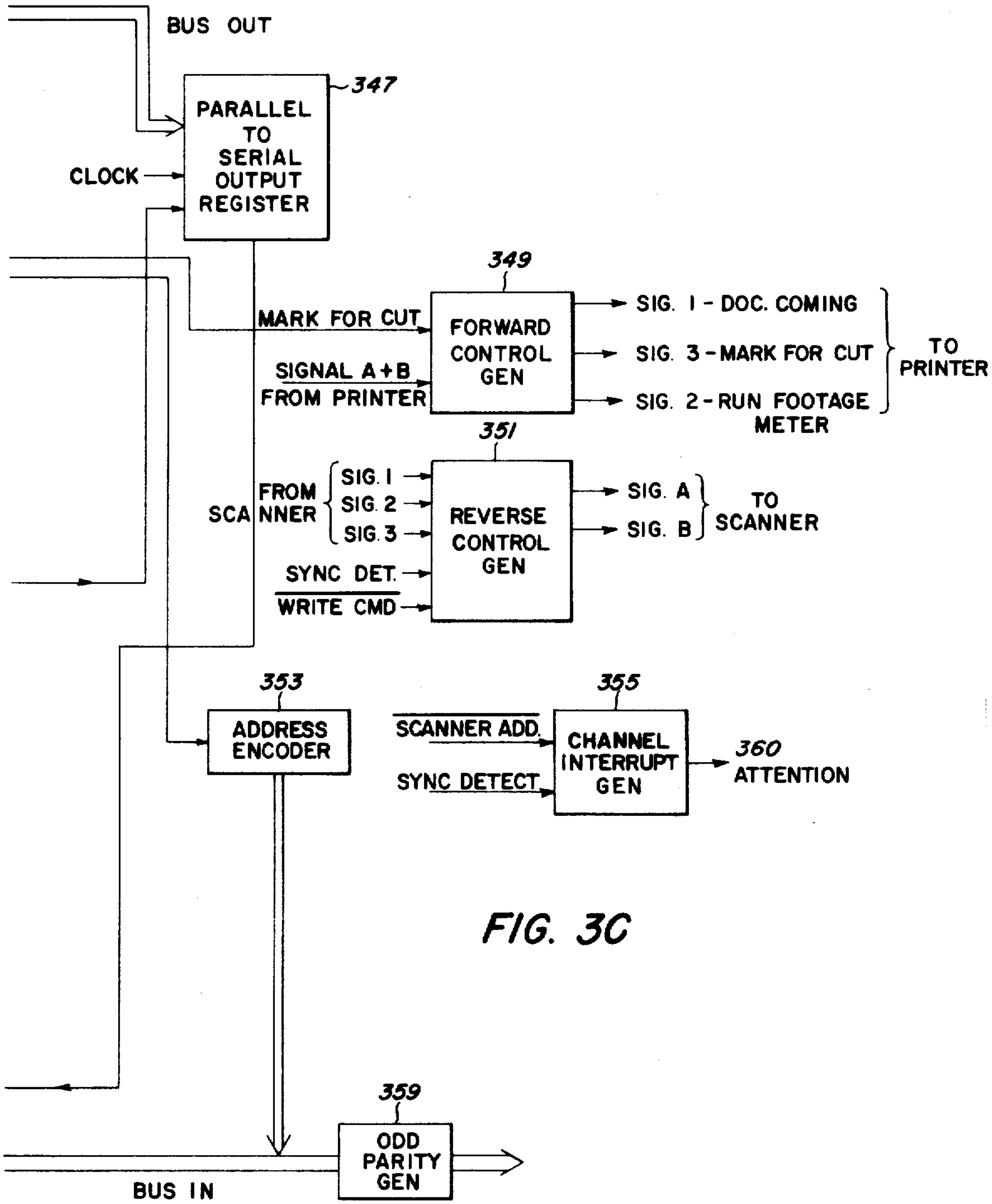
Figure 6:
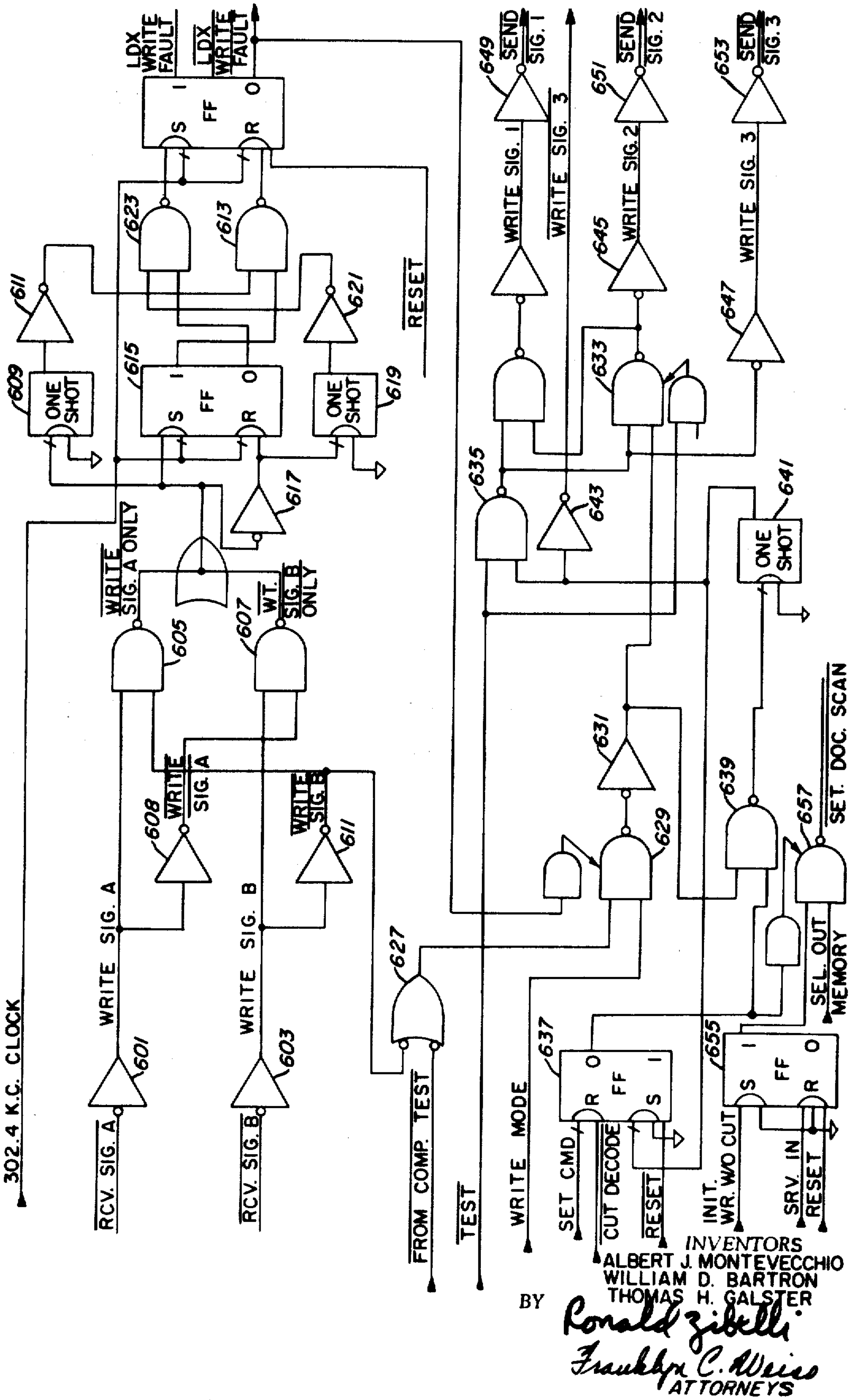
FIG. 6 is the logic circuitry for the forward control generator.

Referring now to FIG. 6, there is shown the forward control generator 349 which is utilized only during a Write mode. As shown in FIG. 3C, the main function of the forward control generator is to generate the signals 1, 2 and 3 for input to the LDX printer. In a manner similar to that described in conjunction with FIG. 5A, not signals A and B are received and coupled to terminals 601 and 603, respectively, which invert the signals to true Write signals A and B. These signals are coupled to NAND gates 605 and 607 and inverted by inverters 609 and 611 to generate the other inputs to the NAND gates 605 and 607. These four components function as an exclusive OR gate, the output therefrom being signal A only or signal B only. This signal is then applied to a one shot 609 of 1 msec. duration and inverted by inverter 611 for application to NAND gate 613. The output from the exclusive OR function is also coupled to the set side of flip-flop 615 and by inverter 617 applied to the reset side of the flip-flop. The output from inverter 617 is coupled to the input of one shot 619 which generates a signal of 100 msec. duration, which after inversion by inverter 621 is applied to the input to NAND gate 623. This circuit is utilized to allow a signal A only or signal B only to be forwarded to flip-flop 625 of a certain duration. The output from the set and reset sides of the flip-flop 625 is a LDX Write and not LDX Write fault internal signals respectively.

The inputs to NOR gate 627 are the outputs from inverter 611, not Write signal B, and not from computer test. The output from NOR gate 627 is a simulated signal B for the internal workings of this circuit. The signal B is one input to NAND gate 629, the second input being a Write mode signal and the third signal being the not Write LDX fault. The output signal from NAND gate 629 is inverted by inverter 631 for application to NAND gate 633. One other input to NAND gate 633 is the not test input which also is coupled to the input of NAND gate 635. When flip-flop 637 at the reset side receives the not cut decode signal and a set command signal, the output signal from the reset side enables NAND gate 639. This NAND gate already being enabled by the output of gate 631 triggers one shot 641, which generates a signal of 250 msec. duration. The output therefrom through inverter 643 is the not Write signal 3 signal. The output from one shot 641 is also returned to flip-flop 637 as an automatic reset signal after the duration of the 250 msec. signal. The output from the one shot 641 is also coupled to the input of NAND gate 635 which in conjunction with the not test signal enables the NAND gate 633 to generate the Write signal Z through inverter 645, the output from NAND gate 635 through inverter 647 generates the Write signal 3. Thus, the not send signal 1 is transmitted by driver 649, the not send signal 2 is transmitted by driver 651, and the not send signal 3 is transmitted by driver 653, these signals being transmitted to the LDX printer as the forward control generation. Thus, when the adapter is in idle (in neither a Read nor Write mode), the forward control generator in FIG. 6 sends signal 1 to the printer, and if the printer is ready receives signal A. The Write signal 3 (mark for cut) is transmitted to the printer through inverter 643 for 250 msec. by one shot 641. Following this signal, the forward control generator sends the signal 2 (run footage meter) to the printer or signal 1 (adapter ready) depending upon whether the mark for cut signal is the leading edge cut or the trailing edge cut respectively. The not set document scan signal is generated by NAND gate 657 which is coupled to the outputs of inverter 631 and flip-flop 655, together with the select out memory signal. Flip-flop 655 is set by the initial write without cut signal. It is reset by the not service in signal.

Figure 7:
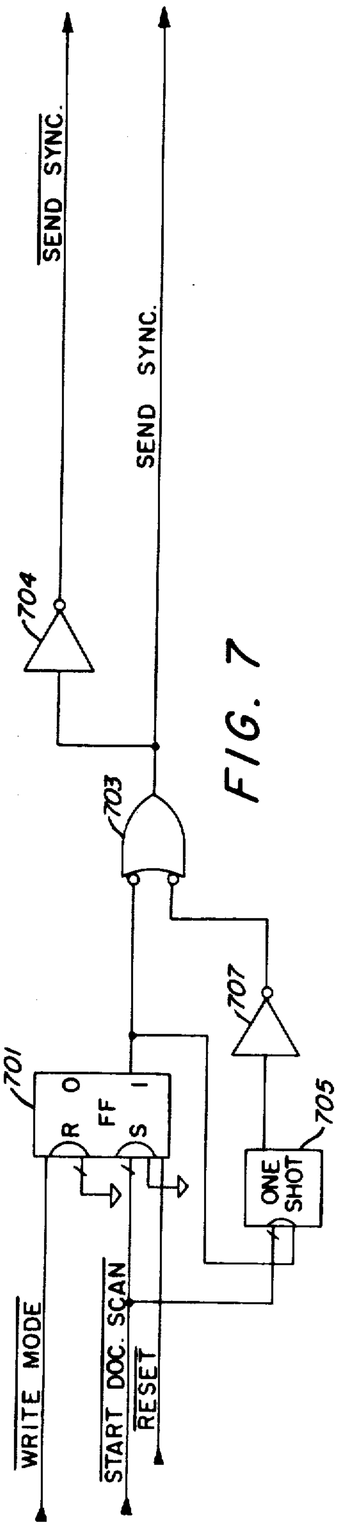
FIG. 7 is the logic circuitry for the send sync circuitry.

Referring now to FIG. 7, there is shown the circuitry for the send sync circuitry 319 in FIG. 3A. Flip-flop receives at the set input the start document scan signal from the time base generator. When the signal is received by flip-flop 701, it is set and the true signal appears on the set output of the flip-flop. This signal is forwarded to a NOR gate 703 and also to a one shot 705 of 2.35 seconds in duration and through inverter 707 back to the other input of NOR gate 703. Thus, when the start document scan signal is received at the flip-flop, a signal of 2.35 seconds appears at the output of the NOR gate 703. This signal represents send sync and the inverse through inverter 705 represents the not send sync signal. The true send sync signal is forwarded to the sync generator 325 to signal the generator when to generate the sync burst for transmission to the printer in the Write mode. At the beginning of the Write mode the flip-flop 701 would have been reset and when a reset signal occurs the flip-flop is set.

Figure 8:
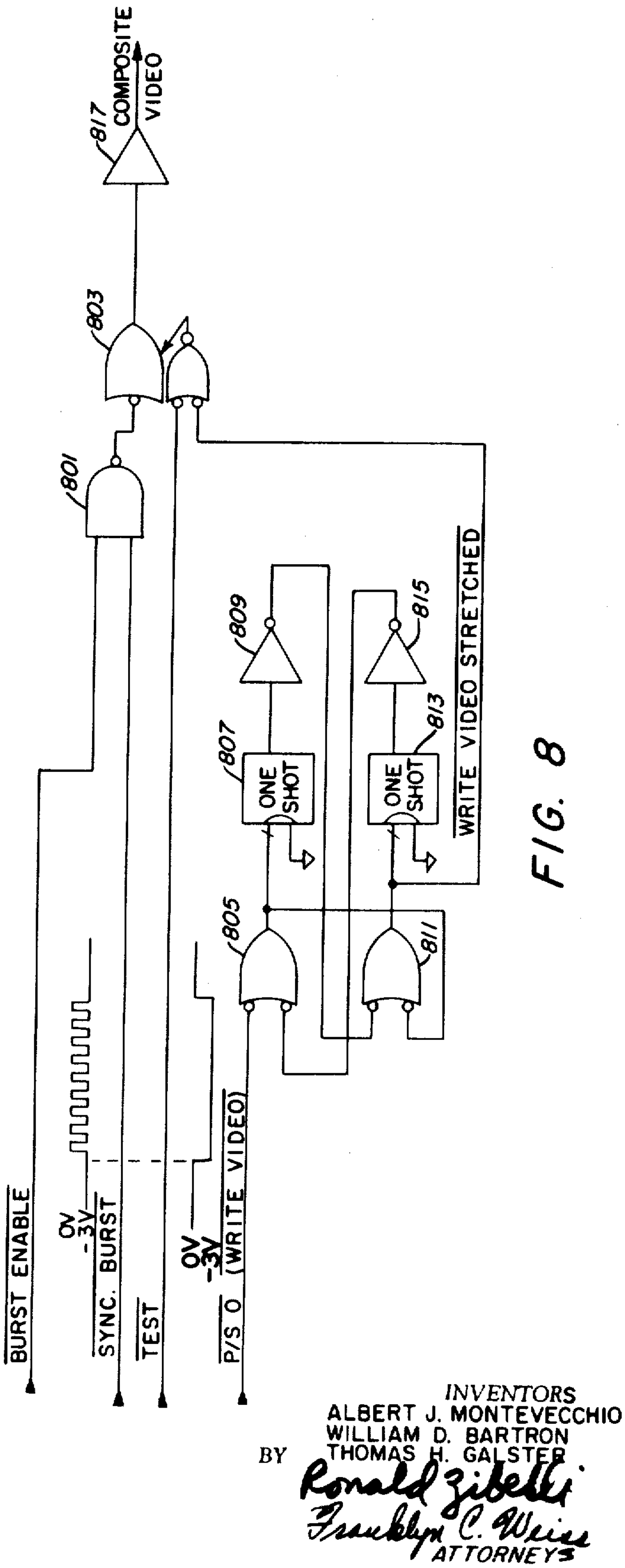
FIG. 8 is the logic circuitry for the video multiplexer circuitry.

Referring now to FIG. 8, there is shown the video multiplexor circuit 327 in FIG. 3A. As hereinbefore set forth, the function of the time multiplexor is to combine the sync bursts and the video information into a composite video signal for direct output to a LDX printer. Thus, NAND gate 801 is enabled by the burst enable signal and the presentation of the sync burst on the other line operates the NAND gate and transfers the sync burst signal to NOR gate 803. The video information is presented to NOR gate 805 for application to one shot 807 and inverted by inverter 809 for presentation back to the input of another NOR gate 811. The other input to NOR gate 811 is the output from NOR gate 805 which presents a pulse to one shot 813, the output of which is inverted by inverter 815 and presented to the other input to NOR gate 805. The action of the one shots 807 and 813 act to stretch the video signals to the desired length as to be compatible with the transmission link to the LDX printer. Thus, the video information is presented to another input to NOR gate 803 and when the system is not in test the video information is transferred by driver 817 to the LDX printer. Thus it can be seen, that the sync burst signals and the video information are multiplexed together to provide a single information pulse train for application to the printer receiving circuitry.

The action of the pulse stretcher is to extend any single pulses (either 3.31 or 19.02 μsec.) to 4.3 or 20 μsec. depending on Telepak A or Telepak C system speed. This is required as was hereinbefore set forth, because the input quantizing rates are higher than the communications equipment can handle.

Figure 9:
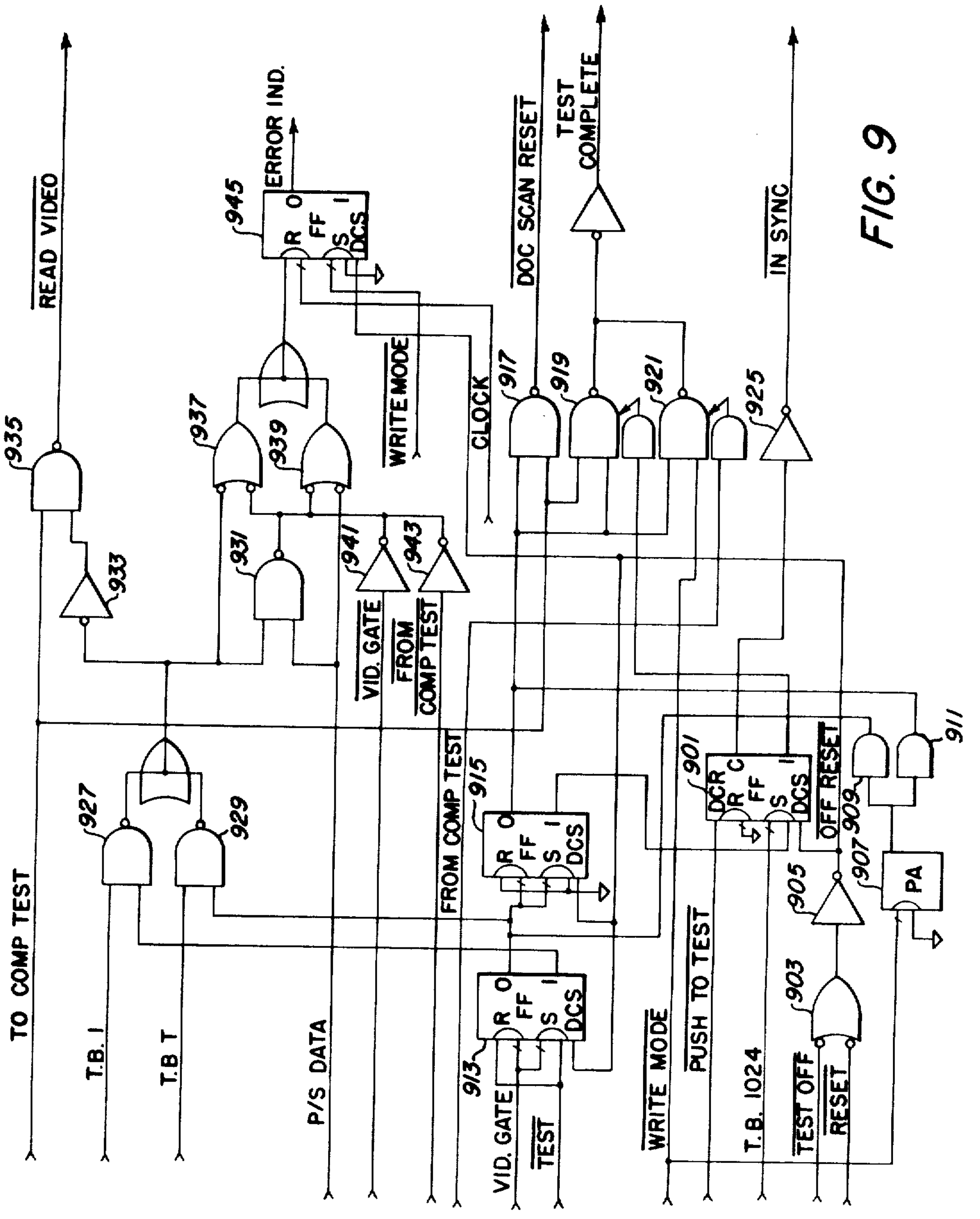
FIGS. 9 and 10 are the logic circuitry for the testing circuitry.
Figure 10:
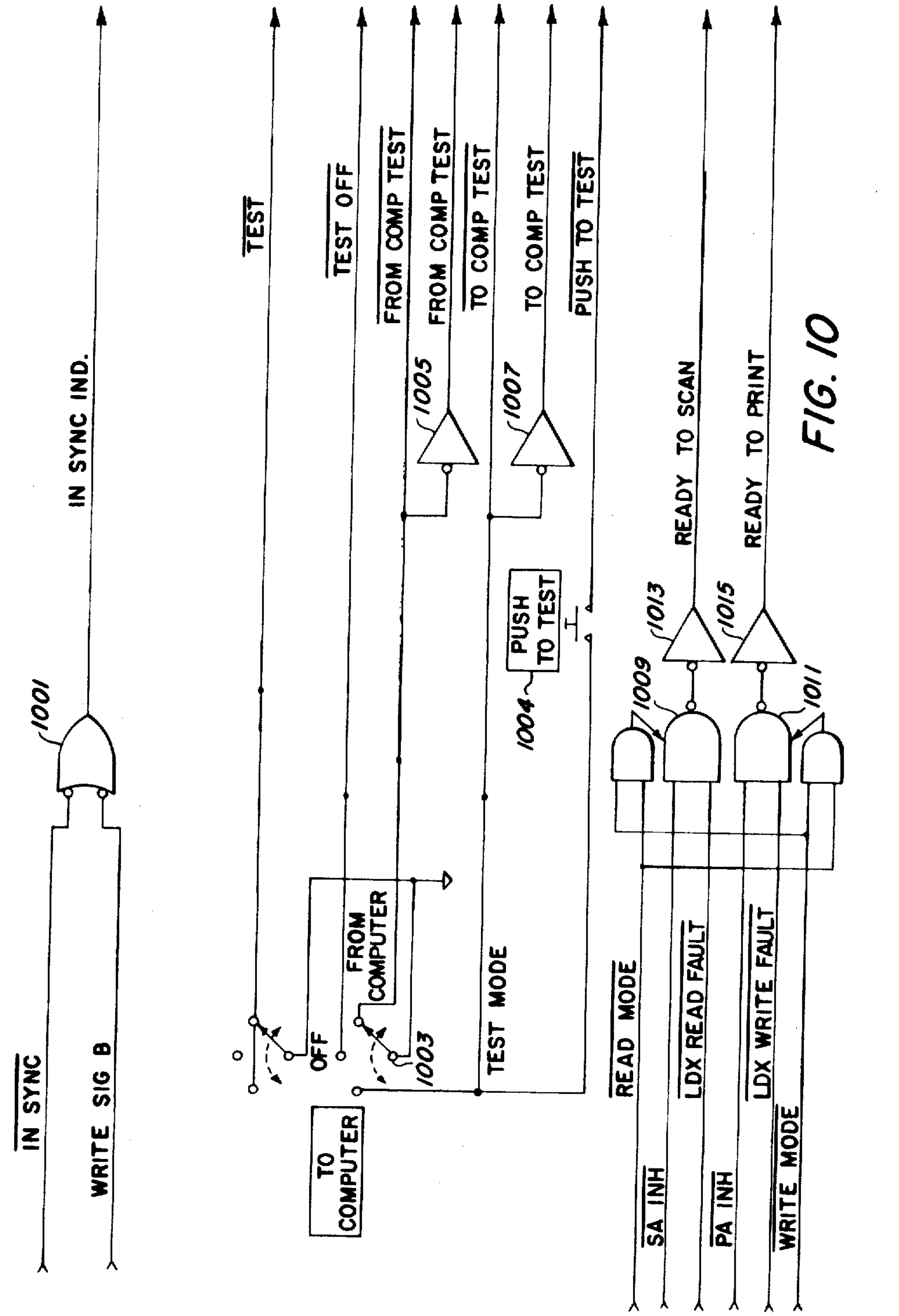

Referring now to FIGS. 9 and 10, there is shown the circuitry necessary for testing the operability of the adapter in a test mode. It can be seen in FIG. 10, the test mode switch 1003 has to computer, From computer, and Off positions. The push to test switch 1004 initiates the testing sequence in the operation of the circuitry in FIG. 9. That is, flip-flop 901 receives this signal in a reset mode. The various functions are generated as if the particular unit was receiving or transmitting information from the adapter from or to the computer.

Depending upon the position of the test mode switch 1003, the various signals are generated. If the switch is in the "off" position the not test off signal is generated. At the to computer switch position, the not to computer test and through inverter 1007 the to computer test signals are generated. In this switch position the switch 1004 generates the not push to test signal. When switch 1003 is in the from computer position, the not from computer test and through inverter 1005 the from computer test signals are generated. In either the to computer or from computer positions, the not test signal is also generated.

In the test mode, the not in sync signal and the not Write signal B signal to NOR gate 1001 will generate the in sync indication signal. Similarly, the not Read mode, not scanner address inhibit and not LDX Read fault signals to NAND gate 1009 through inverter 1013 generates the ready to scan signal. The not printer address inhibit, the not LDX Write fault, and not Write mode signals to NAND gate 1011 through inverter 1015 generates the ready to print signal.

The test signals generated in FIG. 10 are coupled to FIG. 9 in conjunction with other signals from the time base generator. When in a test mode, the video gate signal energizes flip-flop 913 to enable the inputs to NAND gates 927 and 929. The enabling signals to these NAND gates are the time base 1 and the not time base 1 which is applied to inverter 933 to NAND gate 935. In conjunction with the to computer test signal, the NAND gate 935 generates the not Read video signal.

When testing the system from the computer, the parallel to serial data input line, the not video to inverter 941 and the not video computer test to inverter 943 must be received at NOR gates 937 and 939 in conjunction with the output of NAND gate 931 or an error indication signal will be generated by flip-flop 945, which is enabled by the clock signal. The not Write mode signal to the other input to the flip-flop will cancel the error indication signal. As hereinbefore stated, the video gate signal enables the flip-flop 913. The state of the output either sets or resets flip-flop 915 which enables the input to NAND gates 917, 919, and 921. The to computer test input to NAND gate 917 generates the not document scan reset signal. The other input to NAND gate 919 is from the set output of flip-flop 901 which is energized by the time base 1024 signal. Thus the test complete signal through inverter 923 is generated by the not Write mode signal through pulse amplifier 907 and gates 909 and 911 to the input to flip-flop 915 and the inputs to NAND gates 917, 919, and 921. NAND gate 921 also generates the test complete signal in conjunction with the not Write mode signal and the from computer test signal. The testing phase is reset with the receipt of the not reset and not test off signals to NOR gate 903 which through inverter 905 is applied to the DC set terminals of the various flip-flops within the test circuit.

Figure 11:
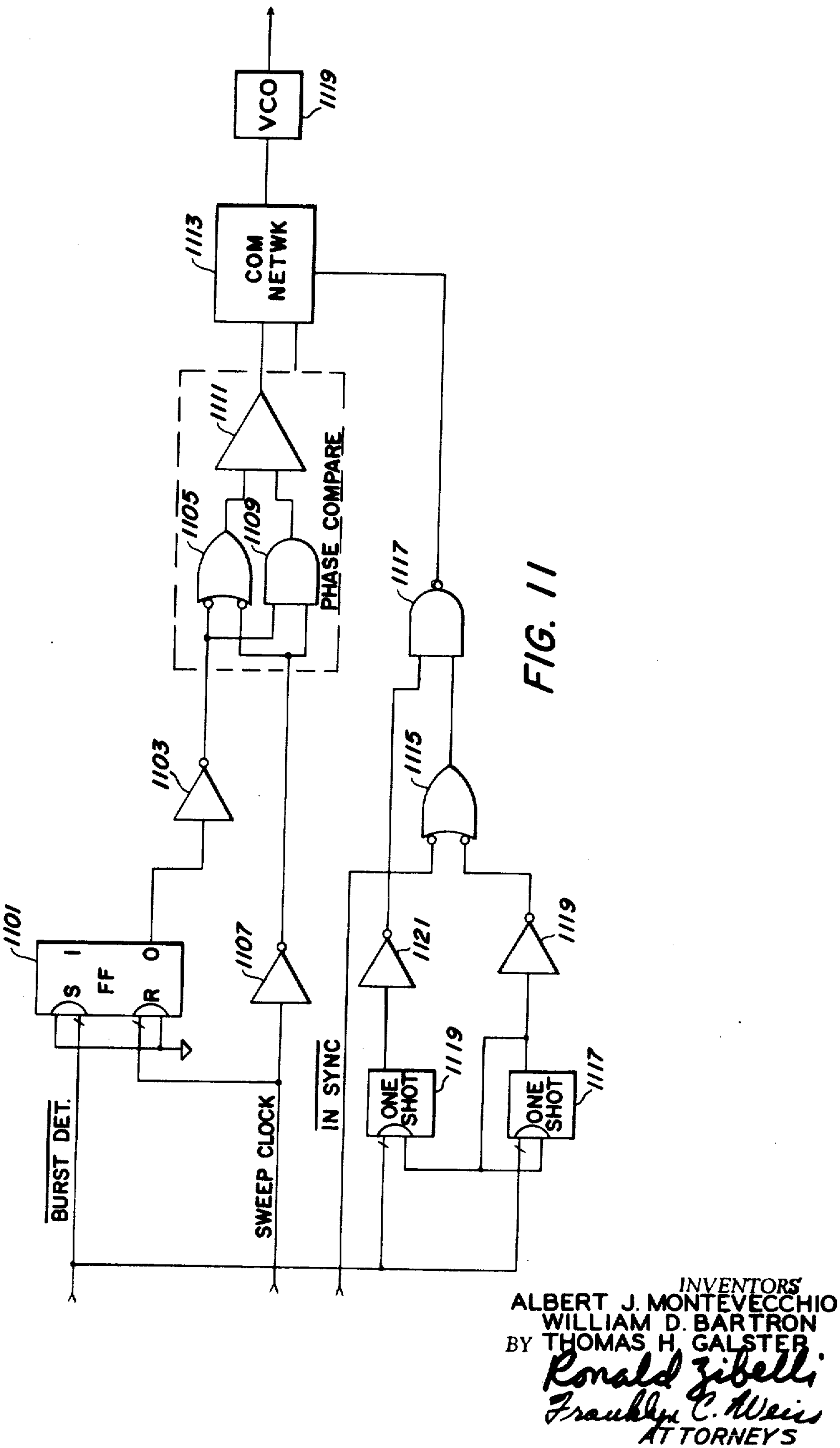
FIG. 11 is the logic circuitry for the automatic frequency control loop circuitry.

Referring now to FIG. 11, there is shown the automatic frequency control loop circuitry which is utilized in the Read mode for synchronization purposes when operating from an LDX scanner to the computer. That is, the adapter must recognize and maintain synchronization in conjunction with the scanner synchronization circuits in order to provide the computer with proper information at the right time sequences.

Thus, the not burst detect signal from the sync burst detector 323 in FIG. 3A is received by flip-flop 1101 at its set terminal. The reset input receives the sweep clock from the time base generator, which imitates CRT sweep clock in the LDX scanner. Thus, the flip-flop 1101, inasmuch as the burst detect pulse is a much narrower pulse than the sweep clock, will generate a signal at the reset output at the rise times of the burst clock. This signal is inverted by inverter 1103 for presentation to NOR gate 1105 in the phase comparison circuit. The sweep clock itself is inverted by inverter 1107 for presentation to the other input to gate 1105 and to an input to AND gate 1109. The outputs from gate 1105 and 1109 are amplified at amplifier 1111 and transferred to compensation network 1113, which could be an operational amplifier. In the meantime, however, a not in sync signal has been received at NOR gate 1115. The other input to the NOR gate 1115 is a signal from one shot 1117 which is inverted by inverter 1119. The output of NOR gate 1115 is transferred to NAND gate 1117 which has as its other input the output of one shot 1119, which is inverted by inverter 1121. The output from NAND gate 1117 is thus a pulse of necessary duration for operation by compensation network 1113. Out of the compensation network 1113, this signal is transferred to voltage controlled oscillator 1119, which is an astable multivibrator with voltage control. The output therefrom is the error signal which is transferred back to the time base generator as an indication of the difference between the error of the time base generation signals and the received burst detected signals.

In effect, therefore, the adapter time base will start the synchronization procedure in conjunction with the scanner synchronization. That is, if the scanner signals tend to vary, the adapter's control loop circuitry will detect such change and maintain the adapter synchronization as a slave to the scanner synchronization signals.

Time Base Generation

Figure 12:
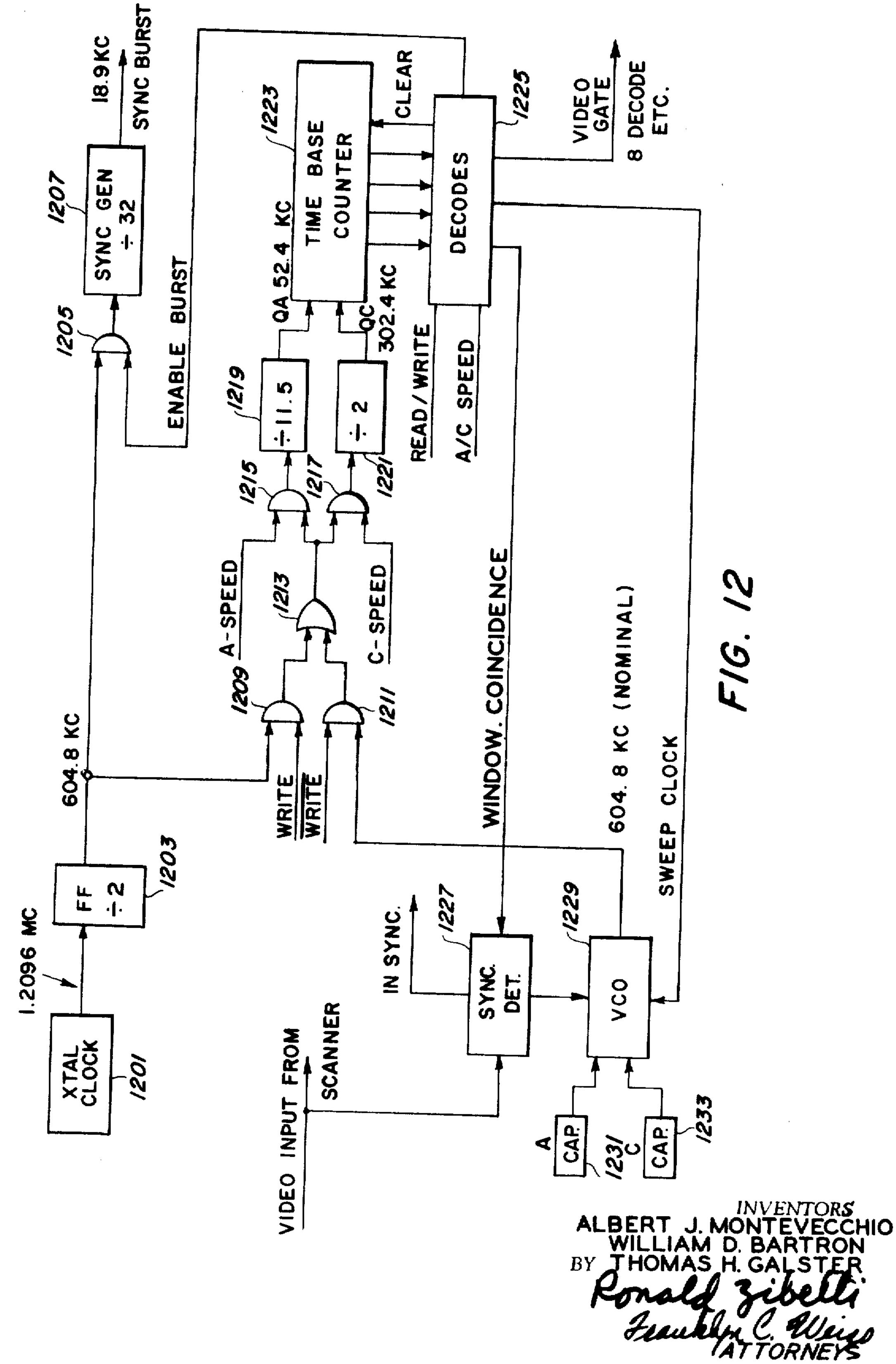
FIG. 12 is a block diagram of the time base generation circuits.

Referring now to FIG. 12, there is shown the block diagram for the time base generation circuits shown more generally in FIG. 3A. Crystal clock 1201, generates a fixed 1.2096 mc. signal which is at 64 times the frequency of the sync burst. This signal is then applied to flip-flop 1203 which in this case operates as a divide by two network to generate the 604.8 kc. signal for application to the inputs of gates 1205 to 1209. When the system is in the Write mode as determined by decoder 1225, to be hereinafter more fully described, gate 1205 is enabled and the 604.8 kc. signal is applied to the sync generator 1207. In operation, the sync generator is a divide by 32 network which generates the 18.9 kc. sync burst to the LDX printer in the Write mode. In the Read mode, that is, when a scanner is communicating with the computer through the adapter, the scanner itself generates the 18.9 kc. sync burst signal. When in the Write mode, that is, the computer communicating through the adapter to an LDX printer, the sync burst signal must be inserted in the video waveform in order that the LDX printer determine the end of a scan line of information, together with the necessary synchronization of the printer to the adapter.

As the crystal clock 1201 is utilized only in the Write mode, the gate 1209 is enabled by a signal indicating the Write situation. The subsequent circuitry sees, therefore, only the clock signal from the crystal clock 1201. In the Read mode the LDX scanner is providing sync bursts to the adapter and it is the adapter that is slaved to the sync generation by the scanner. In this instance, therefore, the Read mode or not Write signal enables gate 1211 for switching the time base generation circuitry to the Read mode. Thus the voltage controlled oscillator 1229 supplies the necessary clock signals in response to the sync detected signal from sync detector 1227. The input to the sync detector 1227 is the video input line from the scanner which includes the sync burst signals, as hereinbefore described in conjunction with FIG. 4.

As the adapter must work with a LDX scanner and printer unit, at either the Telpak A or Telpak C speeds, external capacitor values 1231, and 1233, provide switched component values to allow the voltage controlled oscillator 1229 to generate the proper signal for either of the two speeds utilized. The output, therefore, from the VCO 1229 is a 604.8 kc. signal which can vary somewhat according to the detected sync bursts from the LDX scanner. This signal is applied to the other input to gate 1211 which had been enabled in the Read mode. The output from gate 1211 is passed through OR gate 1213 to the inputs of AND gates 1215 and 1217. Depending upon the system speed, whether Telpak A or Telpak C, the specific AND gate, 1215 or 1217, will be enabled to allow the generation of proper signals in the proper time sequence. If the Telpak A speed is being utilized, divide by 11.5 network 1219 will be utilized to generate signal $Q_4$ which is a 52.4 kc. signal of 19.01 μsec. duration. If, on the other hand, the Telpak C speed is being utilized, a divide by 2 network 1221 would be utilized to generate signal $Q_6$ which is a 302.4 kc. signal of 3.306 μsec. duration. The proper signal, depending upon whether one or the other of Telpak A or Telpak C speeds are being utilized, are forwarded to the time base counter 1223, which is a series of 11 flip-flops utilized to generate the various time base signals for operation by the rest of the adapter circuitry.

As shown functionally in FIG. 12, the outputs from the 11 flip-flops in counting chain 1223 are coupled to the decode network 1225 which decodes the necessary time base signals for specific operation at predetermined time sequences. Depending upon whether in the Read or Write mode and whether in Telpak A or Telpak C speed, the decode network 1225 generates, among other signals, the window and coincidence signals for application to the sync detector circuit 1227 as hereinbefore discussed in conjunction with FIG. 6. Another signal from the decode network 1225 is the sweep clock signal which at Telpak A speed is 42 sweeps per second and at Telpak C speed is 210 sweeps per second for application to the voltage control led oscillator 1229. A third signal line from the decode network 1225 includes the video gate signal, the eight decode signal for counting the eight bits in a byte in which the adapter utilizes the signals. In addition, at the proper time period, the decode network 1225 generates the burst enable signal in the Write mode for enabling the gate 1205 to allow the sync generator 1207 to generate the sync burst signals of 18.9 kc. to the LDX printer. Other functions of the time base generator will become more apparent in the discussion below of the various circuits utilized therein.

Figure 13:
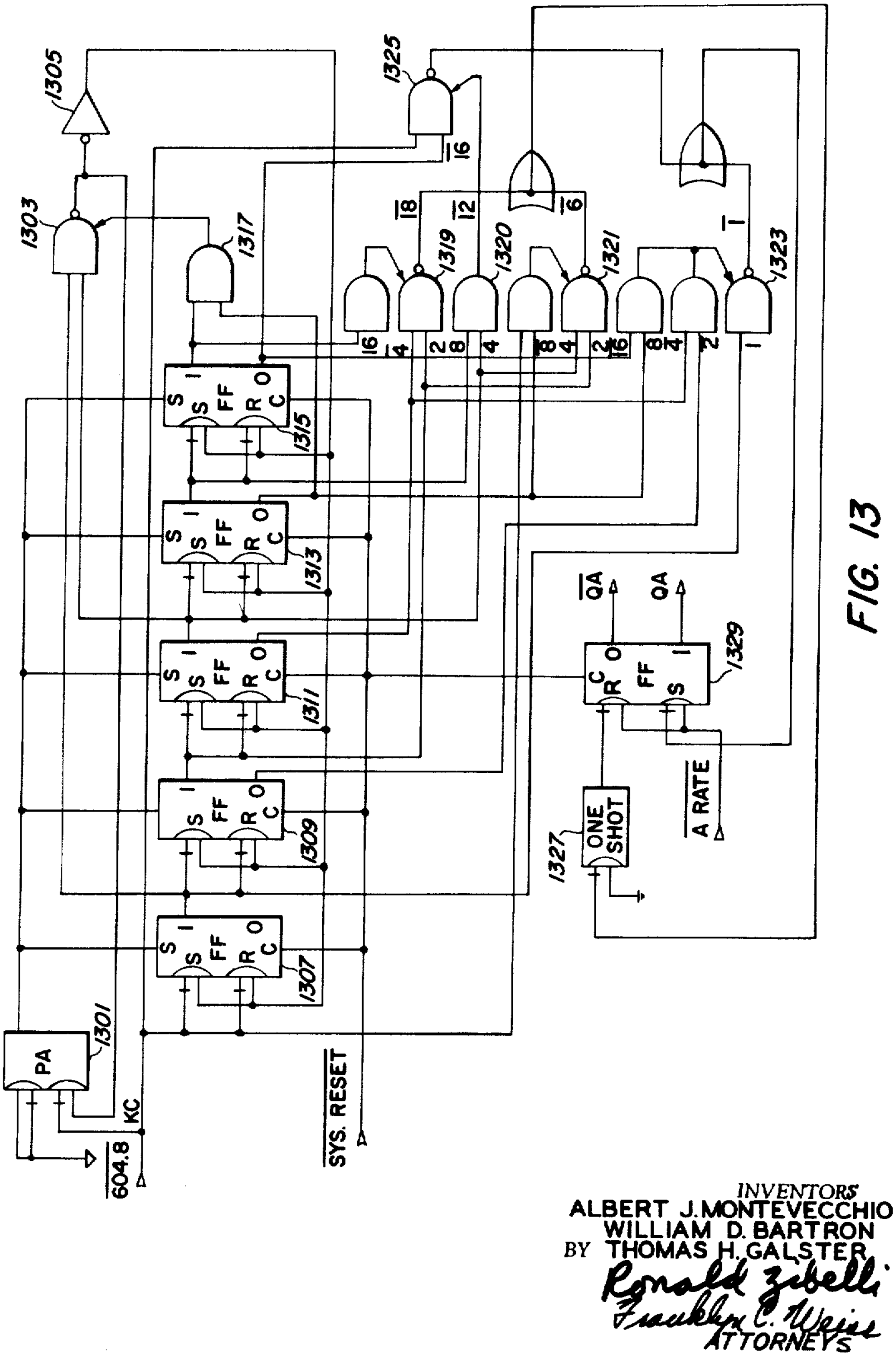
FIG. 13 is the logic circuitry of one of the quantizing circuits.

Referring now to FIG. 13, there is shown the divide by 11.5 circuit 1219 as seen in FIG. 12. In FIG. 13, the 604.8 kc. signal from the crystal clock 1201 or the voltage-controlled oscillator 1229, depending upon the speed of the communicating link, is entered into the circuit shown herein and applied to the input of pulse amplifier 1301, the input to flip-flop 1307, one input to NAND gate 1321 and one input to NAND gate 1325. This input clock begins the counting of a counter comprising flip-flops 1307, 1309, 1311, 1313, and 1315. AND gate 1317 and AND gate 1303 monitor the several stages of the counter for providing a signal to the pulse amplifier 1301 in addition to providing a signal inverted by inverter 1305 for applying reset signals to the several stages of the counter flip-flops 1307 through 1315. NAND gates 1319, 1321, and 1323 monitor specific counts from the counter and provide outputs to be applied to one shot 1327 and flip-flop 1329. NAND gate 1325 monitors the input 604.8 kc. clock signal, the not 16 output from flip-flop 1315 and the not 12 signal from AND gate 1320. Thus, whenever NAND gate 1325 sees its specific input enabling signals, a signal appears at the input to flip-flop 1329 to generate the divide by 11.5 quantizing signal.

NAND gate 1319 monitors the 16 output, not 4 output and the 2 output from the counter. The output therefrom in effect, therefore, is a not 18 count signal which is used to drive the input of one shot 1327. The output from the one shot is used to reset the flip-flop 1329. In a similar manner, NAND gate 1321 monitors the 604.8 kc. signal, the not 8 output, 4 output and the 2 output from the counter. The output therefrom being a not 6 count signal is also utilized with the not 18 count output signal to energize the input of one shot 1327. NAND gate 1323 monitors the not 16, not 8, not 4, not 2 and the 1 output from the counter. The output, therefore, from NAND gate 1323 is the not 1 signal which is used as the enabling reset pulse for flip-flop 1329. The overall effect of the various signals being monitored from the counter is utilized to generate at the flip-flop 1329, the divide by 11.5 or 52.4 kc. signal at the output from the flip-flop. As can be seen from the input to the set side of the flip-flop 1329, the flip-flop is energized only at the institution of a Telpak A rate signal.

Figure 14:
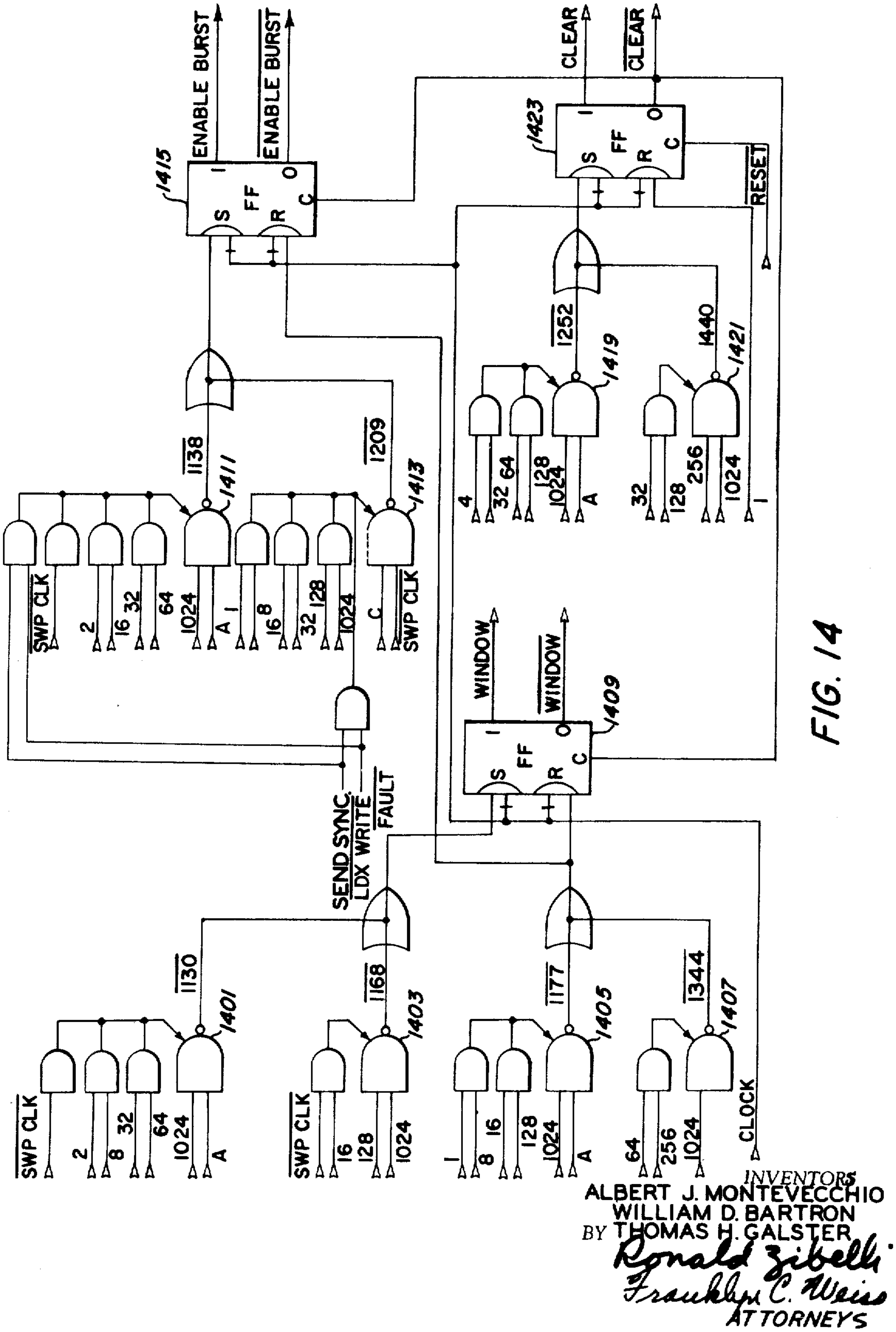
FIG. 14 is the logic circuitry for the burst, window, and clear decode circuitry.

In FIG. 14 is shown the decoding functions for the burst enable, window, and clear signals. The inputs to the various gates in this figure are the counts from the time base counter, as more fully shown and described hereinafter in conjunction with FIG. 16. The generation of the window signal, which is used by the sync burst detector at the time that synchronization signals ought to appear, is described in conjunction with flip-flop 1409. Thus, NAND gate 1401 in conjunction with the specific timing signals from the time base counter and an enabling pulse from the sweep clock generator for the Telpak A speed generates an enabling signal for flip-flop 1409 at the count of 1130. This 1130 count is presented to the set input to flip-flop 1409. As the flip-flop is enabled by the clock to the other set input to the flip-flop, at the count of 1130 the flip-flop is set to give the window signal output. To close or inhibit the window signal after a predetermined time period the NAND gate 1405 decodes from the time base counter the count of 1177. At this count, a pulse appears at the reset input to the flip-flop 1409 which has been enabled by the same clock signal as the set side of the flip-flop. The window pulse is thus generated between the counts of 1130 and 1177. For the Telpak C speed, the NAND gate 1403 decodes a count of 1168 which is presented to the set side of the flip-flop 1409. At the count of 1344 which is decoded by NAND gate 1407, the flip-flop is reset, thereby shutting the window signal.

The generation of the burst enable signal is shown in conjunction with flip-flop 1415. Thus, with Telpak A speed, the NAND gate 1411 decodes a count of 1138 and for Telpak C speed, NAND gate 1413 decodes a count of 1209, which is presented to the set side of the flip-flop 1415 in conjunction with send sync and not LDX Write fault signals. The sync burst enable signal continues to the count of 1177 for Telpak speed which was decoded by NAND gate 1405, as was hereinabove set forth, which resets the flip-flop 1415 to disable the burst enable signal to the sync generator 1207 as seen in FIG. 12.

The clear signal to be returned to the time base counter 1223 in FIG. 12, and hereinafter more fully described, is shown in conjunction with flip-flop 1423 in FIG. 14. For the Telpak A speed, the NAND gate 419 decodes a count of 1252 and presents this signal to the set input of flip-flop 1423. For the Telpak C speed the NAND gate 1421 generates a signal upon decoding a count of 1440 which is also presented to the set side of the flip-flop 1423. At these counts, therefore, depending upon the particular operational speed of the adapter, the clear signal is generated at the set output of flip-flop 1423. This clear signal is seen in FIG. 12 returning to the counter 1223 from the decoder 1225. A clear signal is also generated at the DC reset side of flip-flop 1423 upon a system reset signal.

Figure 15:
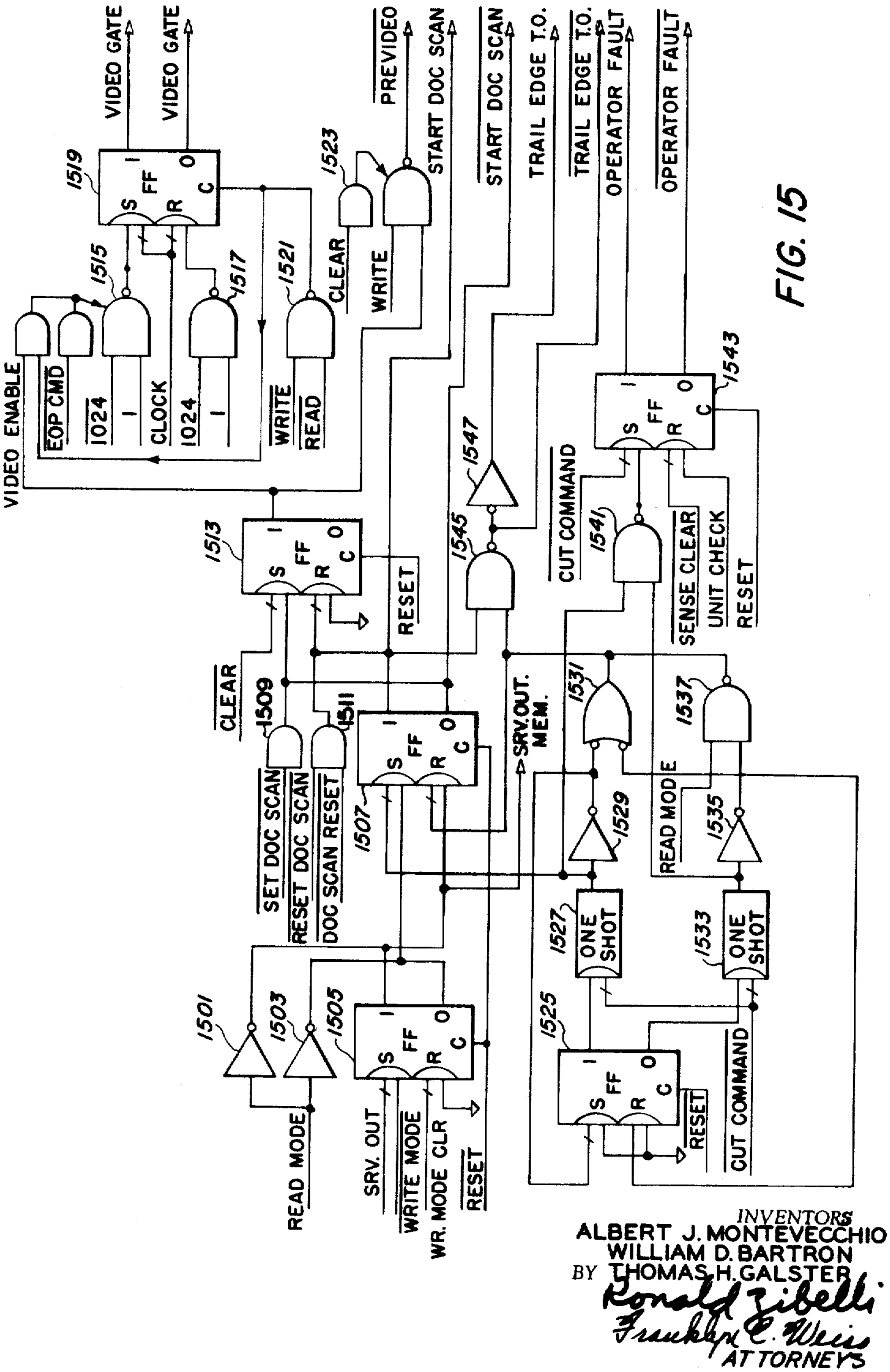
FIG. 15 is the logic circuitry for the video, prevideo, and document-scanning circuitry.

The video gate, prevideo, start document scan, trail edge timeout, operator fault and service out memory signals are decoded as shown in FIG. 15. The Read mode signal is presented to inverters 1501 and 1503 for application to flip-flop 1507. A service out signal and not Write mode signal sets flip-flop 1505. The outputs from the flip-flop are coupled to flip-flop 1507 as are the signals from inverters 1501 and 1503. When flip-flop 1525 is set the output signal is presented to one shots 1527 and 1533. With a not cut command signal and depending upon the polarity of the signal output from flip-flop 1525, the one shots 1527 and 1533 generate signals which are applied to NAND gate 1541 and inverters 1529 and 1535. The output from one shot 1527 is the other set input to flip-flop 1507. The outputs from flip-flop 1507 are the start document scan signals. NAND gate 1537 in conjunction with the signal from inverter 1535 and a Read mode signal generates the reset pulse to flip-flop 1507 and the enabling pulse to NAND gate 1545. The other input to NAND gate 1545 is either the set output from flip-flop 1507 or the output of gate 1511. The output from NAND gate 1545 and inverter 1547 are the trail edge timeout signals.

The input to gate 1509 is the not set document scan signal which in conjunction with the not clear signal sets flip-flop 1513. The reset pulse to this flip-flop is the not reset document scan signal and the not document scan reset signal to gate 1511. The trail edge timeout signal is 13.2 seconds for Telpak A speed and 2.64 seconds for Telpak C speed. It will be recalled that the LDX paper cutters are placed away from the scanning station and the time lag from the time the paper is under the scanning station until the paper reaches the cutting station must be provided for or else the paper will be cut in the wrong position, thereby separating discreet messages. The output from flip-flop 1513 is presented to the input of NAND gate 1523. In conjunction with the clear and Write signals, the not prevideo signal is generated.

The video gate signal is utilized to gate the video at times when it should appear. Since a line of information is to contain 1024 bits of information, the video gate must appear between the first and 1024th bit of information, when it must be closed. Thus, when there is a Read or Write operation, through NAND gate 1521, with the video enable signal from flip-flop 1513, when no end of page command exists, when the count from the time base counter is not at 1024 but is at the count of 1, NAND gate 1515 will be enabled, thereby setting flip-flops 1519 and generating the video gate signal. When NAND gate 1517 decodes a count of 1025, the complete line of information has been scanned and the video gate is reset by flip-flop 1527. In effect, therefore, the video gate lasts from a count of 1 to a count of 1024, the entire scan line of information.

The operator fault signals are generated in conjunction with flip-flop 1543. The outputs of one shots 1527 and 1533 are presented to NAND gate 1541. This signal, in conjunction with the not cut command signal, sets flip-flop 1543 and generates the operator fault signal. A not sense clear signal and unit check signal reset flip-flop 1543 and generates the not operator fault signal.

Figure 16:
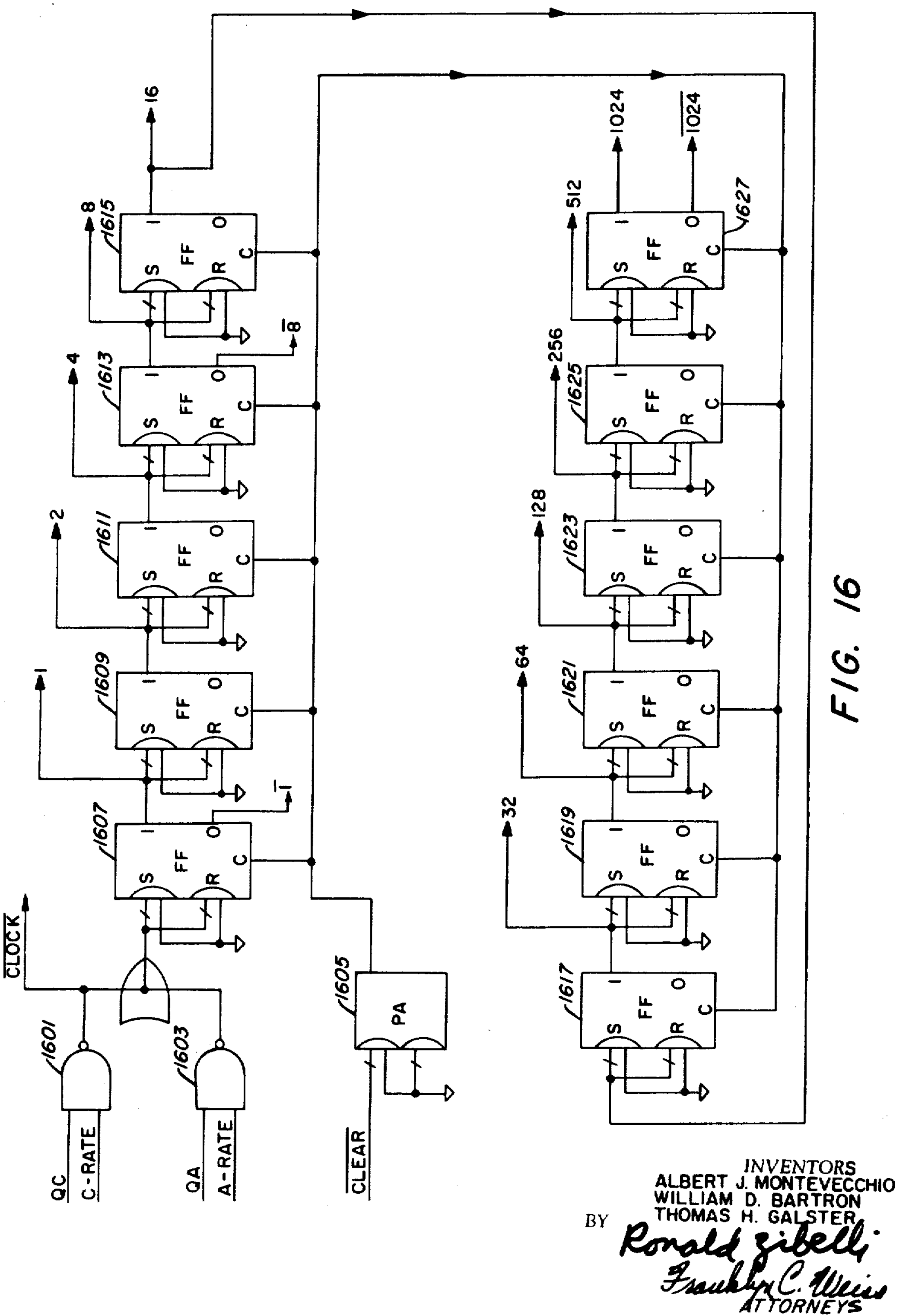
FIG. 16 is the logic circuitry for the time base counter.

The time base counter from which all the other time base circuits have taken their count signals is shown in FIG. 16. NAND gate 1601 and 1603 respectively denote the switching of the adapter into the Telpak C or Telpak A rates. The other inputs to the NAND gates $Q_C$ and $Q_A$ are the clock rates generated by the divider networks 1219 and 1221 in FIG. 12. The outputs from the NAND gates are the clock signals for the particular speed in which the adapter is operating. The 11 flip-flop circuits which follow comprise a counter which count from 1 to 1024. The outputs from the separate flip-flops are the count signals at that particular stage of the counter. Thus, flip-flops 1607 and 1627 generate the counts of 1, 2, 4, 8, 16, 32, 64, 128, 256, 512, and 1024, respectively. When a clear signal is received from decoder network 1225 in FIG. 12, pulse amplifier 1605 generates a clearing signal to reset the time base counter shown in FIG. 16 back to a zero count.

Figure 17:
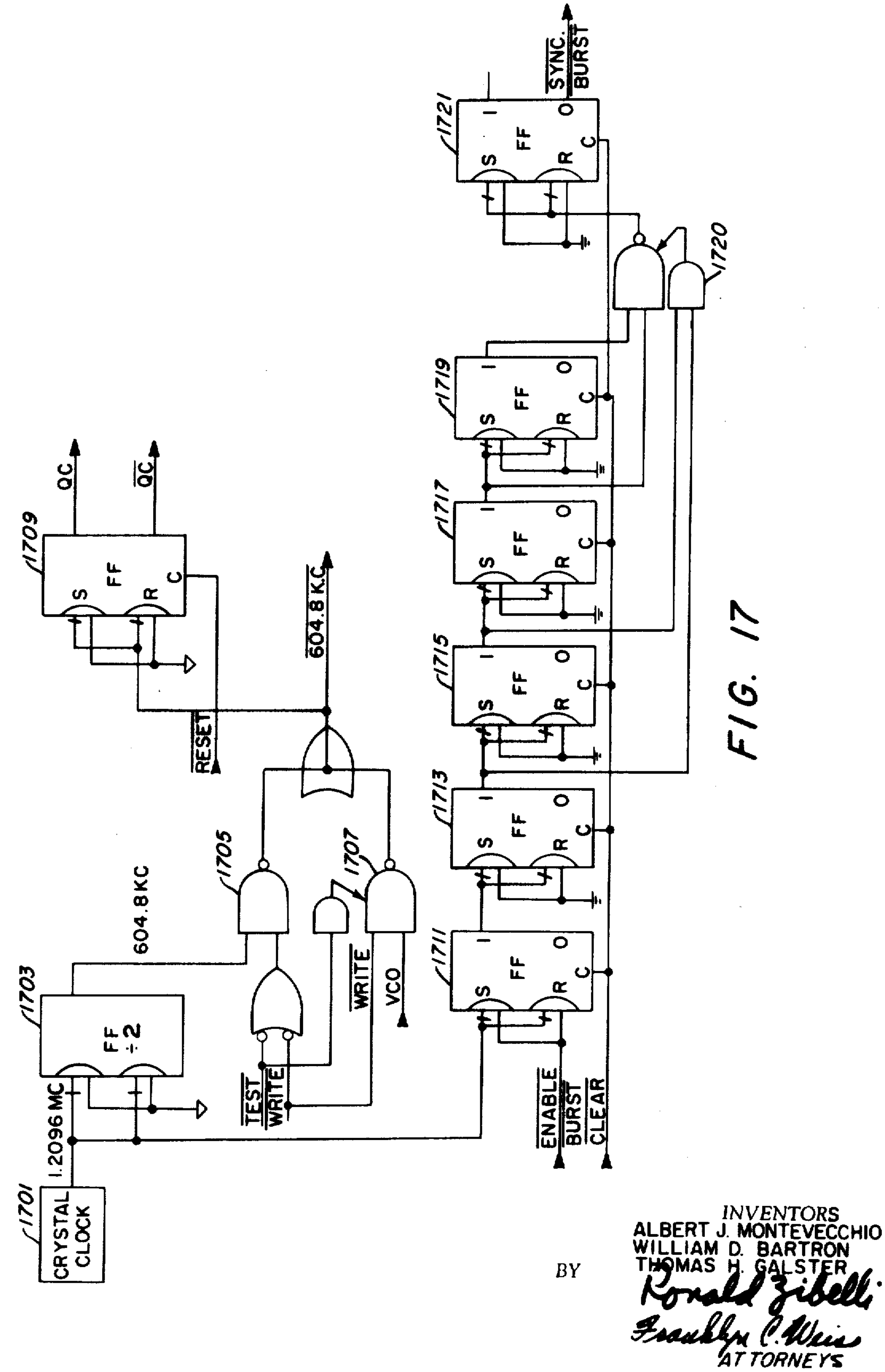
FIG. 17 is the logic circuitry for the clock, quantizing, and sync burst generator circuitry.

Referring now to FIG. 17, the sync burst signal and the divide by 2 network for the Telpak C quantizing rate is shown. Crystal clock 701 generates the 1.2096 mc. signals for application to flip-flop 1703 and flip-flop 1711. The crystal clock 1701 and the flip-flop 1703 are the crystal clock 1201 and flip-flop 1203 as seen in conjunction with FIG. 12. Flip-flop 1703, upon setting and resetting of itself, divides the 1.2096 mc. signal into a 604.8 kc. signal for application to NAND gate 1705. When not a Write and not test signals, NAND gate 1705 is enabled thereby presenting the 604.8 kc. signal to the flip-flop 1709 in FIG. 17. This flip-flop 1709 is the divide by 2 network 1221 as seen in FIG. 12. When in a Read mode and not test mode NAND gate 1707 is enabled and the clock signal from the voltage control oscillator 1229 in FIG. 12 is gated through the NAND gate 1707 for application to flip-flop 1709. The output from flip-flop 1709 is utilized by the time base counter 1223 in FIG. 12.

A counter comprising flip-flops 1711, 1713, 1715, 1717, and 1719 begins to count the 1.2096 mc. signal from the crystal clock. When the NAND gate 1720 decodes a count of 32 in the counter, the output thereof sets flip-flop 1721. The sync burst signal is taken from the reset side of flip-flop 1721. At any other count but 32, flip-flop 1721 is disabled to inhibit the generation of the sync burst signal. A clear signal as seen in conjunction with FIG. 12 from decoder 1225 would reset the counter upon the generation of the clear signal.

Figure 18:
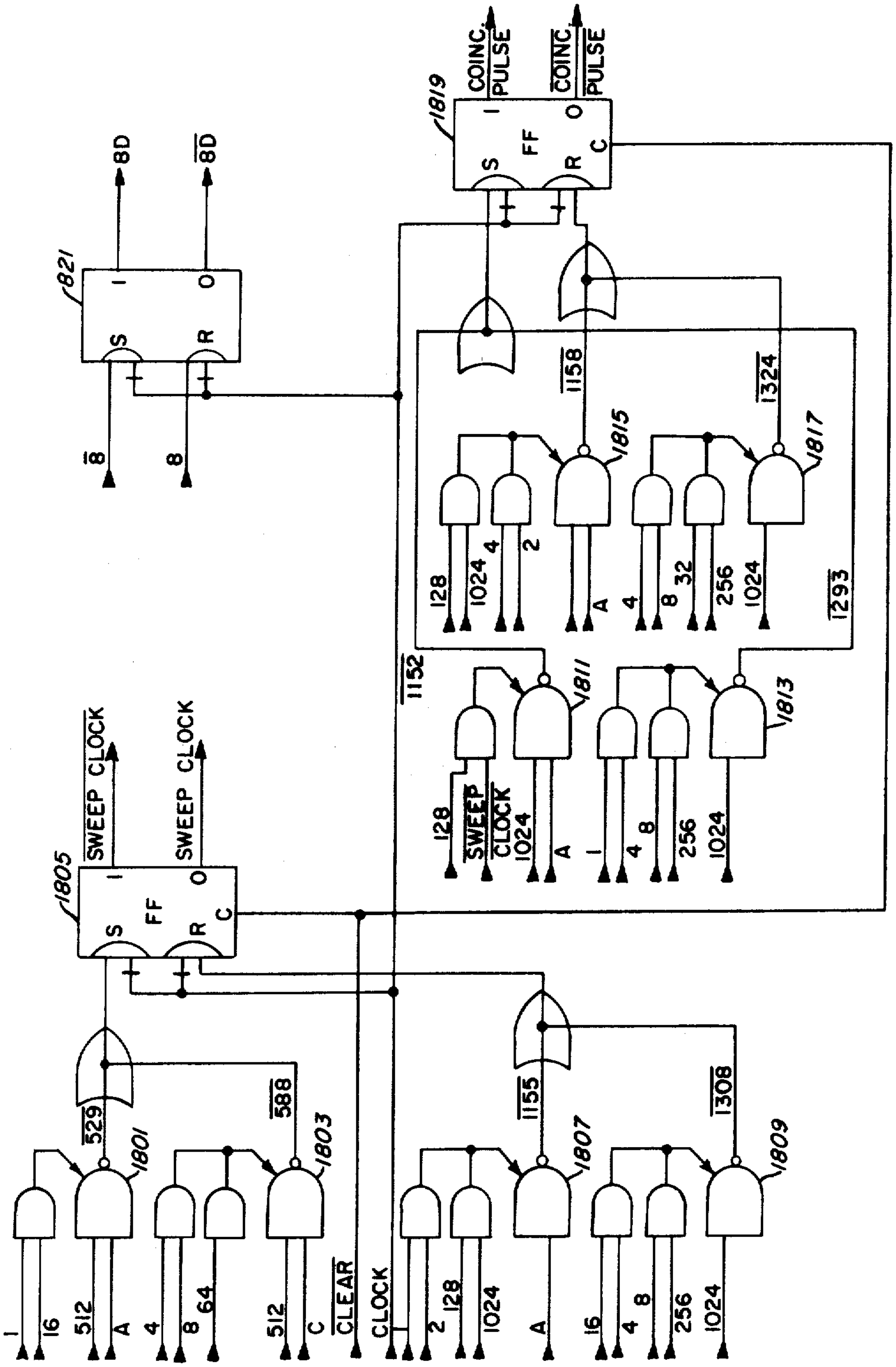
FIG. 18 is the logic circuitry for the sweep clock and coincidence signal generators.

In FIG. 18, the sweep clock which is 42 sweeps per second for Telpak A speed and 210 sweeps per second for Telpak C speed is generated as in the Coincident signal for use by the sync detector 1227 in FIG. 12. For Telpak A speed, NAND gate 1801 decodes a count of 529 from time base counter which sets the flip-flop 1805 in conjunction with the clock signal. NAND gate 1807 decodes a count of 1155 which resets the flip-flop 1805. Depending upon the frequency of the clock from the time base counter, the sweep clock signal is at the proper rate from flip-flop 1805. For Telpak C speed, NAND gate 1803 decodes a count of 588 and sets the flip-flop 1805 while NAND gate 1809 decodes a count of 1308 and resets the flip-flop 1805. Thus for C speed, and the particular clock frequency therefor, the sweep clock runs from the count of 588 to 1308 from the time base generator.

The coincidence clock for use by the sync detector 1227 in FIG. 12 is generated in conjunction with flip-flop 1819. For Telpak A speed in conjunction with a sweep clock signal from flip-flop 1805, NAND gate 1811 decodes a count of 1152 from the time base generator which sets the flip-flop 1819. NAND gate 1815 decodes a count of 1158 which is used to reset the flip-flop 1819. Thus, the coincidence clock, depending upon the clock rate of the Telpak speed being utilized, runs from a count of 1152 to a count of 1158.

For Telpak C speeds, the NAND gate 1813 decodes a count of 1293 which is utilized to set the flip-flop 1819, as was the case for the Telpak A speed. At a count of 1324, NAND gate 1817 denotes a count of 1324 which resets the flip-flop 1819. Thus, for Telpak C speeds and the particular clock rate at which the adapter is working, the coincidence signal runs from a count of 1293 to a count of 1324. Flip-flop 1821 in conjunction with the 8 and not 8 signals generates the 8 decode and not 8 decode signals.

Figure 19:
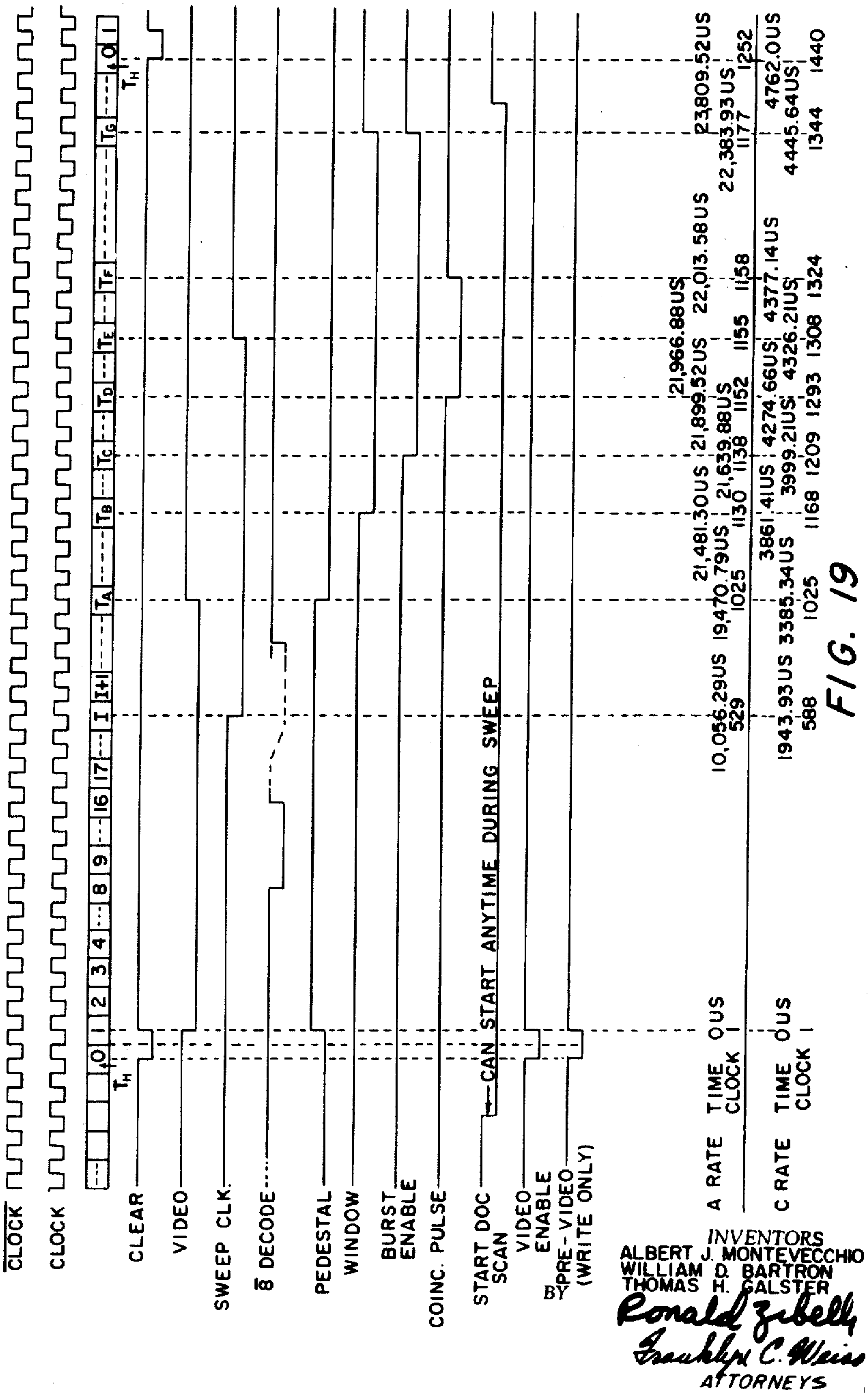
FIG. 19 is the timing sequences for the time base generation circuits.

A timing diagram for the time base generation, i.e., FIG. 12 through FIG. 18, can be seen in conjunction with FIG. 19. The signals generated can be seen to appear at the particular clock times which is seen at the top of the page. At the bottom of the page the A rate and C rate time clocks also appear at the particular sequences as set forth in the foregoing paragraphs.

COMPONENT CIRCUITS

Figure 20:
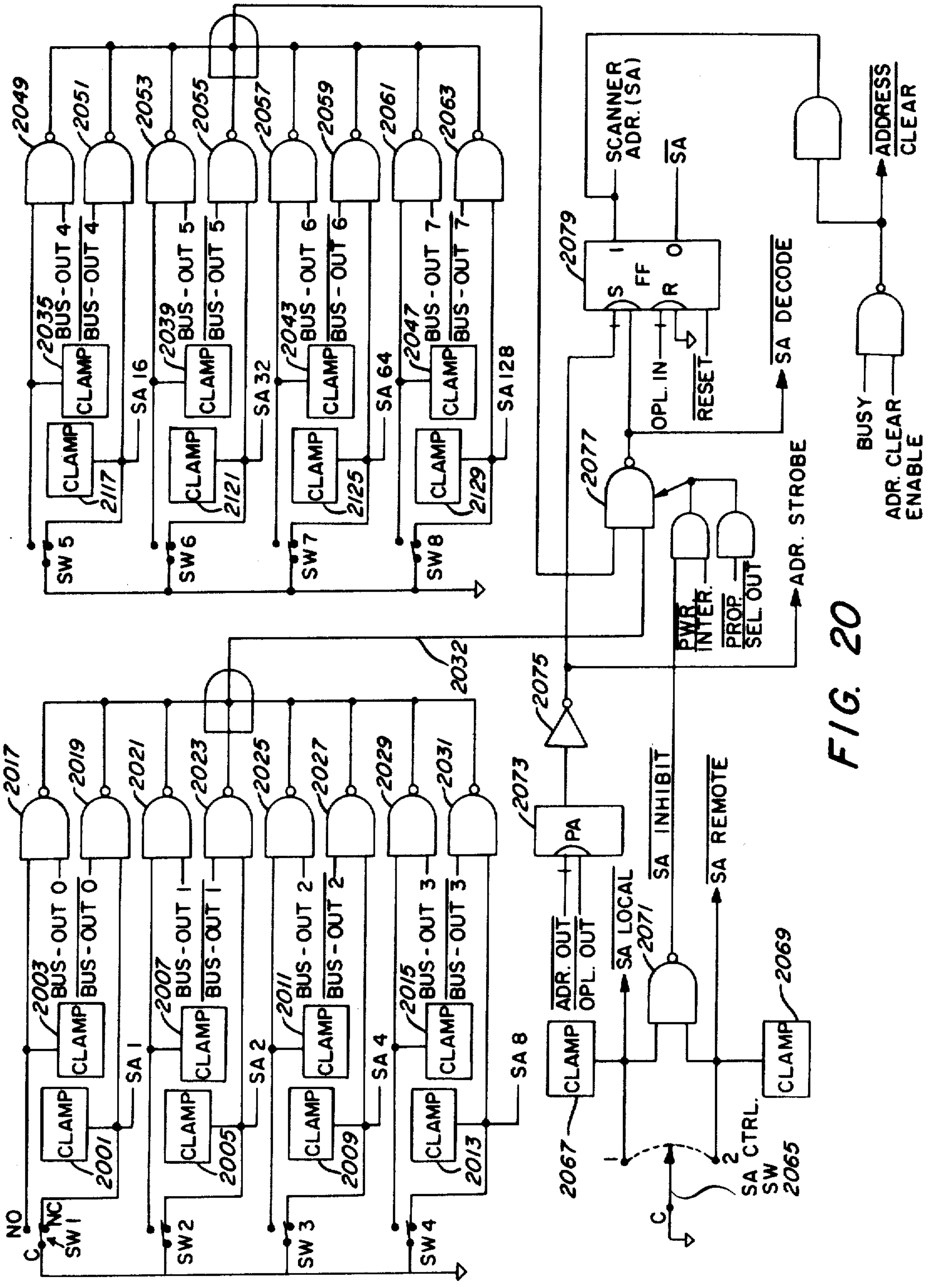
FIG. 20 is the logic circuitry for the scanner address decoder.

In FIG. 20 is shown the scanner address decoder, which, as hereinbefore set forth, decodes the address of the scanner which is transmitted by the computer on the bus out lines. Inasmuch as the adapter and the LDX equipment might be placed on an existing computer-processing system, provisions must be made for different addresses as other equipment on the system would have been provided with other addresses. Eight switches are thus provided for setting the scanner address into the adapter circuitry. With the eight switches, any address from 0 to 255 may be preset by the setting of the switches according to the predetermined address assigned to the scanner.

The address of the scanner is present on the eight bus out lines from the computer. Therefore, eight different comparisons must be made in order to determine whether the address received is actually the address of the scanner. For instance, if the first bit in the scanner address is a binary 0 switch No. 1 would remain in the normally closed position. Since the circuits and the adapter utilize negative logic, the line coupled to the switch position and the input to NAND gate 2019 would be clamped by clamp network 2001 to a ground potential. The input on the not bus out line to the other input of NAND gate 2019 would be at a −3 voltage as the binary 0 had been defined as a ground potential, as seen at the NAND gate 2017. As the two inputs to NAND gate 2019 are not both true, that is at −3 v., the output of the inverted input would be at a −3 level indicating that both inputs to the gate are not alike.

If, for example, the second digit in the scanner address is a binary 1, switch 2 would be thrown to the normally open position. Thus, if a binary 1 signal appears on the bus out 1 input to NAND gate 2021, with the other input clamped to ground by means of clamp circuit 2007, the output from the gate would be at a −3 voltage level, indicating that the input signals are not alike. It can be seen, therefore, that a logical 1, i.e. −3 voltage, appears at the output of each of the comparing gates when the comparison has been made and determined to be the actual scanner address. Since all the comparisons have been true, the signal appearing on line 2032 is held at a −3 voltage, which enables the input to NAND gate 2077. If, on the other hand, the address received at the scanner address decoder was not that of the scanner, one or more comparisons would not be indicated as true and by means of the clamp circuits 2001 to 2015 would be clamped at ground potential, thereby disabling the input to NAND gate 2077. The other input to the NAND gate 2077 is from the other comparison networks for the last four bits in the scanner address word on the bus out lines. As for the first four digits, clamp networks 2033 to 2047 clamp the outputs of gates 2049 to 2063 at ground when at least one noncomparison is detected. If all the comparisons made, however, are true indications, the other input to NAND gate 2077 is enabled.

Another input to gate 2077 is the scanner address inhibit signal, which is generated by the scanner control switch 2065 through operation of either clamp network 2067 or 2069 through NAND gate 2071. With the proper power interlock enabling signal and the propagated select out signal as the other inputs to NAND gate 2077, the gate is enabled, thereby enabling the set input to flip-flop 2079. During the scanner address decoding operation, the operational out line must be up, thereby denoting that the units are ready and on line. Before the scanner address can be detected as a true address signal for the scanner, the address out line from the computer must be up, thereby designating that the information appearing on the bus out lines is, in fact, a true address signal. With both address out and operational out lines up, pulse amplifier 2073 is enabled and the output signal therefrom is inverted by inverter 2075 to the other set input to flip-flop 2079. As both inputs to the set side of the flip-flop 2079 are now enabled, the flip-flop is set, and the output appearing from the set output of the flip-flop is an indication that the true scanner address has been received by the adapter. When operational in is received at the reset side of flip-flop 2079, the indication of the correct scanner address being received is reset. When a system reset signal is received at the DC reset terminal, further, flip-flop 2079 may be reset by a busy signal and address clear enable signal to NAND gate 2081. The not address clear signal is generated which by gate 2083 resets the flip-flop by clamping its set output.

Figure 21:
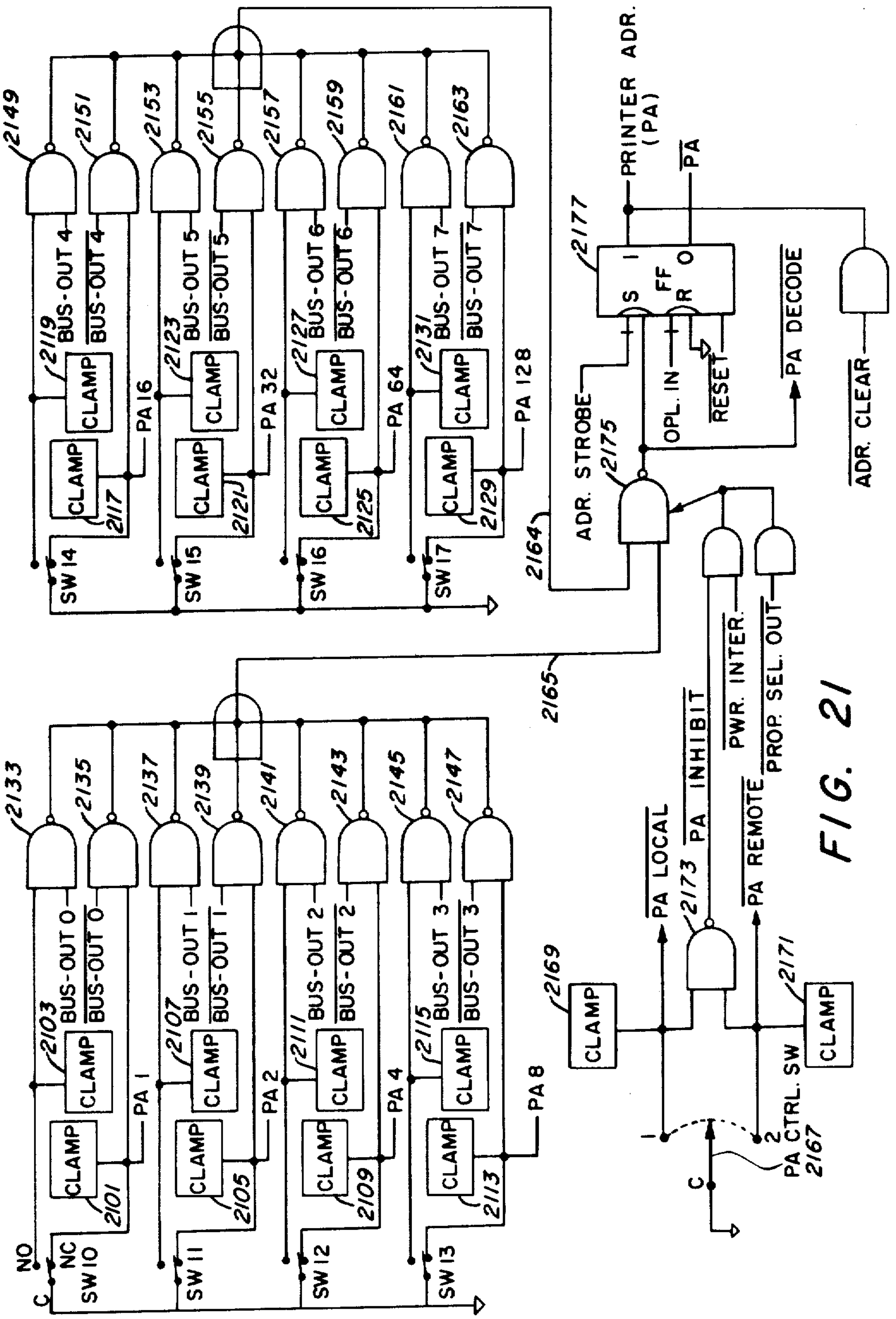
FIG. 21 is the logic circuitry for the printer address decoder.

Referring now to FIG. 21, there is shown the printer address decoder which decodes the printer address upon presentation thereof on the bus out lines from the computer. The decoder in this figure operates in a similar manner as the scanner address decoder as shown and described above in conjunction with FIG. 20. That is, switches 10 to 17 are preset, depending upon the predetermined printer address to be utilized in a particular installation. NAND gates 2133 to 2163 compare the address set by the predetermined switch positions with the binary digits appearing on each of the eight bus out lines from the computer. If a true comparison is made at all the comparing NAND gates, gate 2175 is enabled. If, however, one or more of the comparing gates determine that the address on the bus out lines is not that of the printer address, the output lines 2164 and/or 2165 will be clamped to ground potential by the clamping networks 2101 to 2131, thereby disabling the input to NAND gate 2175. In a similar manner as the scanner address decoder in FIG. 20, a printer address control switch 2167 determines whether the printer address local signal or printer address remote signal is to be generated. Through clamping networks 2169 and 2171 through NAND gate 2173, the printer address inhibit signal is generated. With a not printer address inhibit signal and the proper power interlock and propagated select out signals to the other inputs to NAND gate 2175, the gate is enabled. With the address strobe signal generated in FIG. 20, in conjunction with the output signal from gate 2175, flip-flop 2177 is set, thereby generating a true printer address signal, indicating that the correct printer address has been decoded. When operational in is received or a system reset signal, flip-flop 2177 is reset, thereby canceling the printer address decoded signal. Also, the not address clear signal may reset flip-flop 2177 in a similar manner as shown in conjunction with FIG. 20.

Figure 22:
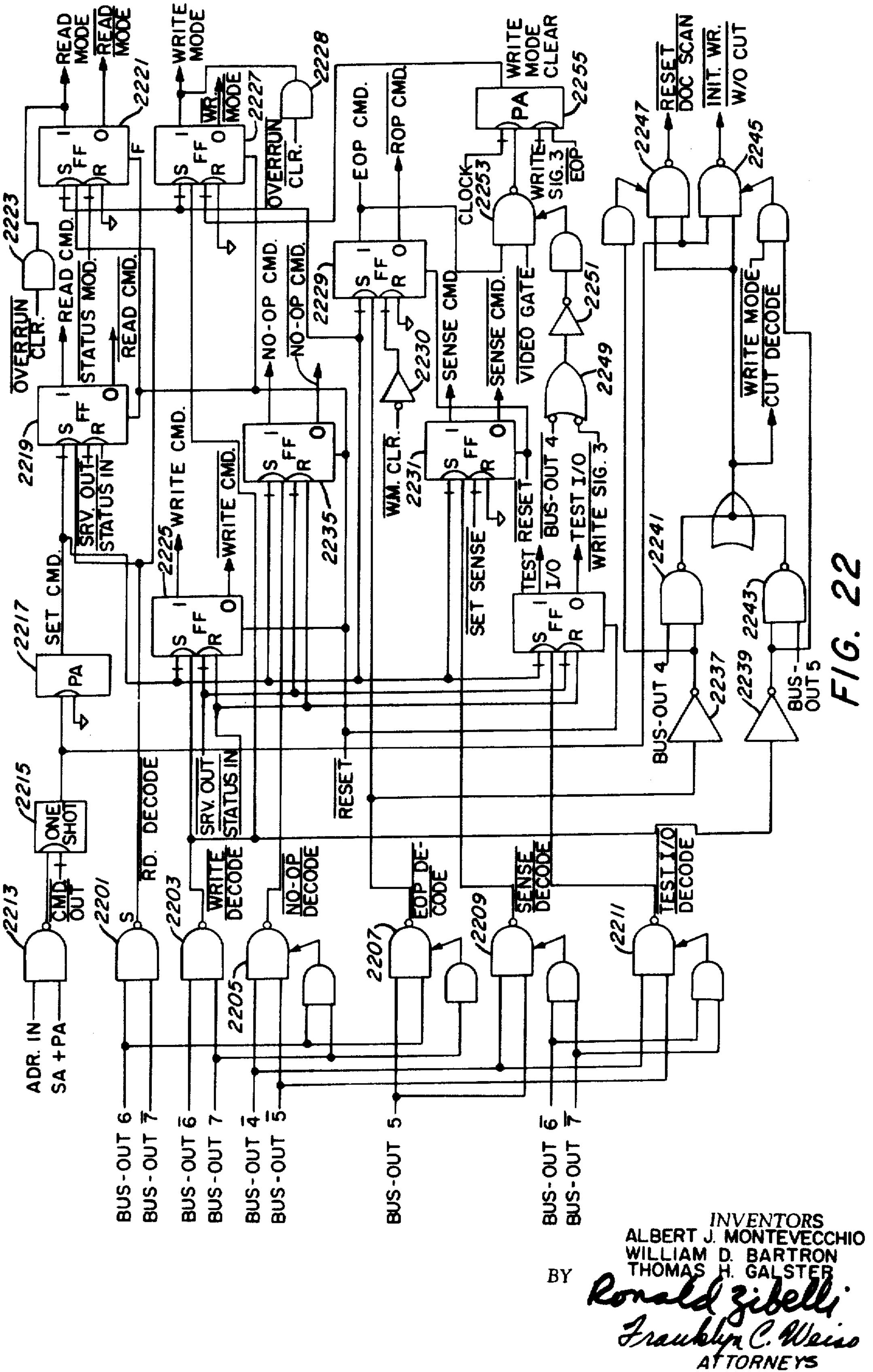
FIG. 22 is the logic circuitry for the command decoder.

In FIG. 22 is shown the command decoder 335, shown in FIG. *3b*. As hereinbefore set forth, the command decoder decodes all the commands sent to the adapter from the channel on the bus out lines at the rise of the command out signal. The commands recognized are Test I/O, Sense, Write, Read, and No-Op Control. While the command signal appears on the eight bus out lines, the adapter does not use the first four bits in recognizing the command transmitted from the computer. Therefore, only the last four bits on bus out lines 4, 5, 6, and 7, are monitored to decode the command signals.

For the Read command signal NAND gate 2201 monitors the bus out 6 and the not but out 7 lines to determine the signals thereon. For the Read command the first six digits on the bus out lines are of no consequence, thus, as long as digit No. 6 is a binary 1 while digit No. 7 is a binary 0, the Read command will be decoded. For the Write command NAND gate 2203 monitors the not bus out 6 line and the bus out 7 line. Thus, for the Read command the first six digits are, again, of no consequence, and as long as the sixth digit is a binary 0 and the seventh digit is a binary 1, the Write command will have been decoded. For the no op command, NAND gate 2205 monitors the not bus out 4 line, the not bus out 5 line, the bus out 6 line, and the bus out 7 line. Thus, for the no op command a binary 0 must appear on the bus out 4 and 5 lines, while a binary 1 must appear on the bus out 6 and 7 lines for the no op command to be decoded. For the end of page command, NAND gate 2207 monitors the bus out 5 line, the bus out 6 line, and the bus out 7 line. In this instance the digit on the first five bus out lines are of no consequence, while a binary 1 must appear on the bus out 5, 6 and 7 lines for the end of page command to be decoded. The sense command is decoded at NAND gate 2209. Lines not bus out 4, bus out 5, not bus out 6 and not bus out 7 lines are monitored. Thus, for the sense command to be decoded, a binary 0 must appear on bus out 4, 6, and 7 lines, while a binary 1 must appear on the bus out 5 line. The test I/O command is decoded by NAND gate 2211. Not bus out lines 4, 5, 6, and 7 are monitored and a binary 0 must appear on all of these lines in order for the test I/O command to be decoded. The table below is a compilation of all of the commands to be decoded by the adapter, with the letter X signifying that the binary digit appearing in this position is of no consequence in decoding the specific command.

TABLE 2

| | Bit positions | | | | | | | |
|---|---|---|---|---|---|---|---|---|
| | 0 | 1 | 2 | 3 | 4 | 5 | 6 | 7 |
| Command: | | | | | | | | |
| Read | X | X | X | X | X | X | 1 | 0 |
| Write | X | X | X | X | X | X | 0 | 1 |
| No-Op | X | X | X | X | 0 | 0 | 1 | 1 |
| End Of Page | X | X | X | X | X | 1 | 1 | 1 |
| Sense | X | X | X | X | 0 | 1 | 0 | 0 |
| Test I/O | X | X | X | X | 0 | 0 | 0 | 0 |

The other functions of the command decoder as set forth in FIG. 22 are for the internal working of the other circuitry in the computer adapter. Thus, when the address in line is up and the scanner address or printer address signal is received at NAND gate 2213, one shot 2215 emits a signal of 0.4 μsec. to pulse amplifier 2217. With the Read signal decoded from NAND gate 2201 and the output set command signal from flip-flop 2217, flip-flop 2219 is set, thereby generating the Read command signal. When service out and status in signals are received, the flip-flop 2219 is reset, thereby canceling the Read command signal. When flip-flop 2221 receives the Read decode signal from NAND gate 2201 and the set command signal from flip-flop 2217, the flip-flop 2221 is set, thereby generating the Read mode signal. If, in the instance of an overrun, the overrun clear signal is received, signifying the overrun condition has been cleared, gate 2223 generates the Read mode signal at the same output from flip-flop 2221.

When the set input to flip-flop 2225 receives the set command signal and the Write decode signal, the Write command signal is generated. When flip-flop 2227 receives the same set command signal and the same Write decode signal, the Write mode signal is generated. And similarly, as in the Read mode, when gate 2229 receives the overrun clear signal, the same Write mode signal is generated at the output of flip-flop 2227. When service out and status in signals are received at flip-flop 2225, the Write command signal is canceled In, a similar manner, when flip-flop 2227 receives the Write mode clear signal from pulse amplifier 2255, the flip-flop 2227 is reset, thereby canceling the Write mode signal.

When the end of page decode signal in conjunction with the set command signal is received, flip-flop 2229 is set, thereby generating the end of page command signal for internal operation. When the Write mode clear signal is received at inverter 2230, flip-flop 2229 is reset, thereby canceling the end of page command signal. If the sense command signal from the computer has been decoded, in conjunction with the set command signal, flip-flop 2231 is set, thereby generating the sense command signal. This command is canceled by the input of the not set sense signal to flip-flop 2231. When the test I/O command has been received, in conjunction with the set command signal, flip-flop 2233 is set, thereby generating the test I/O command. This flip-flop is reset thereby canceling the test I/O command signal by the input of the service out and status in signals to the reset side of the flip-flop. The no-op command signal is generated by the receiving of the set command signal and the no-op decode signal at the set input to the flip-flop 2235. Similarly, the flip-flop is reset by the receiving of the service out and status in signals at the reset side of the flip-flop.

Two other commands received by the adapter from the computer are the mark for cut and end of page commands. These signals are multiplexed in with the Write and no-op control commands respectively. Thus, via inverters 2237 and 2239, the Write decode signal and the end of page decode signal are monitored and presented two NAND gates 2241 and 2243. If a binary 1 appears on bus out 4 or 5 lines, the cut decode signal is generated. If the NAND gate 2247 receives the cut decode signal, the output from one shot 2215, and the inverted end of page command decode signal, the reset documents scan signal is generated. If the NAND gate 2245 receives the output from one shot 2215, the cut decode signal, and the inverted Write decode signal, in conjunction with the Write mode signal, not initial write without cut signal is generated. It can also be seen that the input of a system reset signal, would reset all the flip-flops in the command decoder to the idle state.

Figure 23:
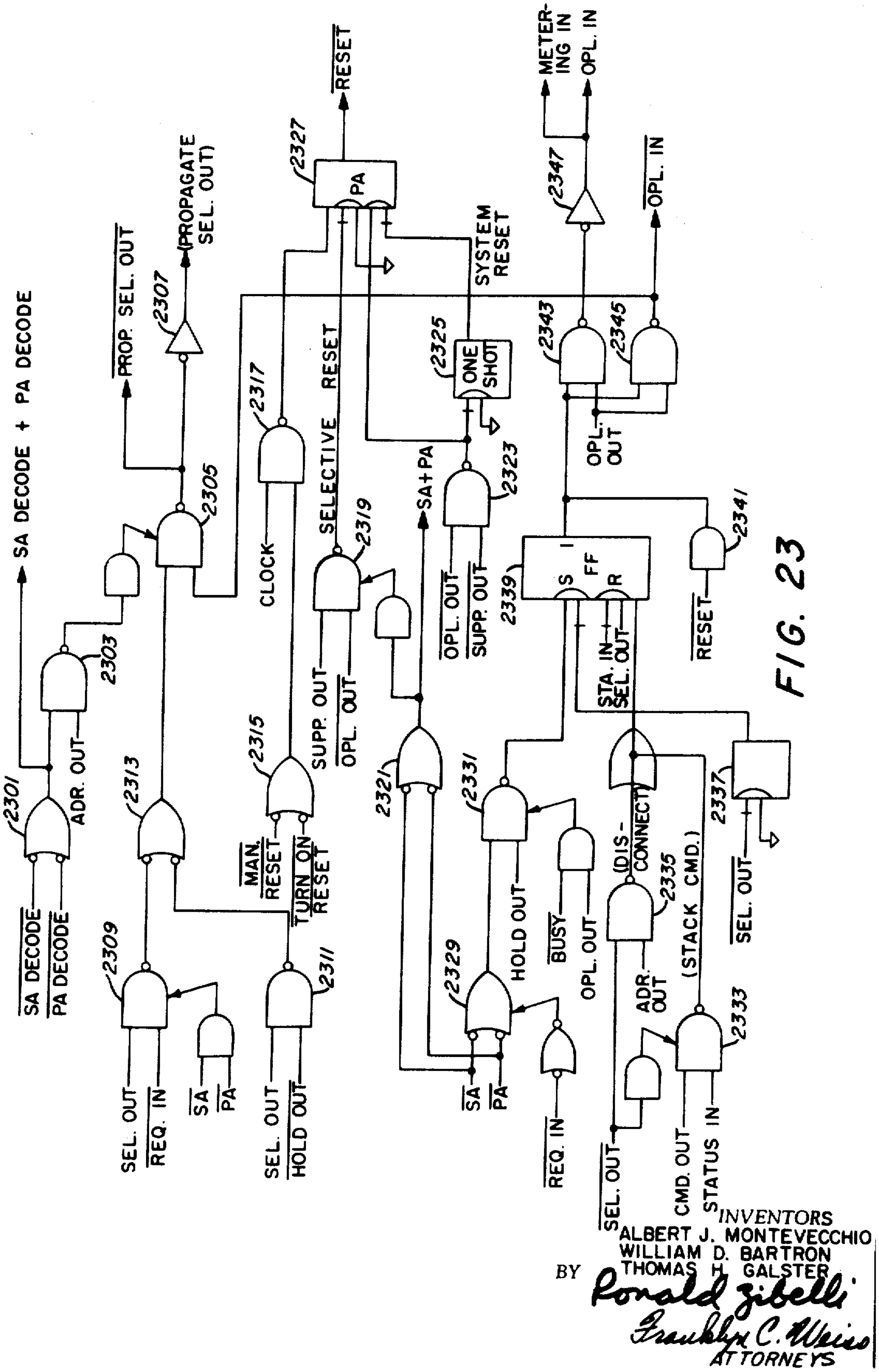
FIG. 23 is the logic circuitry for the selection control logic.

Referring now to FIG. 23, there is shown the selection control logic circuitry for generating the propagate select out signal, the system reset signal, metering in and operational in signal. With the input of not scanner address decode or not printer address decode signals are generated. With this signal and address out signal to the input of NAND gate 2303, the input to NAND gate 2305 is enabled. With select out up but request in, scanner address and printer address signals in a not function, the input to NAND gate 2309 is enabled, and through NOR gate 2313 enabled another input to NAND gate 2305. This input to NAND gate 2305 can also be enabled through NOR gate 2313 by the receiving of select out and not hold out to NAND gate 2311. The other input to gate 2305 is not operational in generated at NAND gate 2345. With all the inputs to NAND gate 2305 enabled, the not propagate select out is generated and through inverter 2307 the propagate select out signal is generated which propagates the address that is not recognized by the adapter to the other units on the computer processing system. With the not scanner address and not printer address signals received by NOR gate 2321, one input to NAND gate 2319 is enabled. With suppress out and not operational out received by NAND gate 2319, the selective reset signal is generated and presented to pulse amplifier 2327. The pulse amplifier can be enabled also by the inputs of not manual reset and not turn on reset to NOR gate 2315 which enabled gate 2317. With the input of the clock signal from the time base generator, NAND gate 2317 is enabled, thereby also enabling pulse amplifier 2327. In order to generate the reset signal for resetting all the flip-flops in the adapter to the idle condition, the not operational out or not suppress out signal must be received by NAND gate 2323, which enables the one shot 2325. Thus, the system reset signal is generated, by the enabling of the pulse amplifier 2327 for 4 $\mu$sec.

In order to generate the metering in and operational in signals the following sequences must occur. The not scanner address and not printer address signal must be received with not request in to NOR gate 2329. The output therefrom, together with the holdout signal, the not busy signal and operational out enables NAND gate 2331, thereby enabling flip-flop 2339. When the not select out signal is received at one-shot 2337, the other set input to flip-flop 2339 is set for 0.5 $\mu$sec. The output therefrom with operational out enables NAND gates 2343 and 2345 to generate the not operational in signal and through inverter 2347 generates the metering in and operational in signals. In order to reset flip-flop 2339, the status in and select out signals must be received at the reset side of the flip-flop. Two DC reset the flip-flop, whether or not the reset side of the flip-flop is energized, not select out, command out and status in must be received at NAND gate 2333, thereby generating the stack command signal. This signal or the not select out or address out signals enabling NAND gate 2335 resets the flip-flop until the next set operation.

Figure 24:
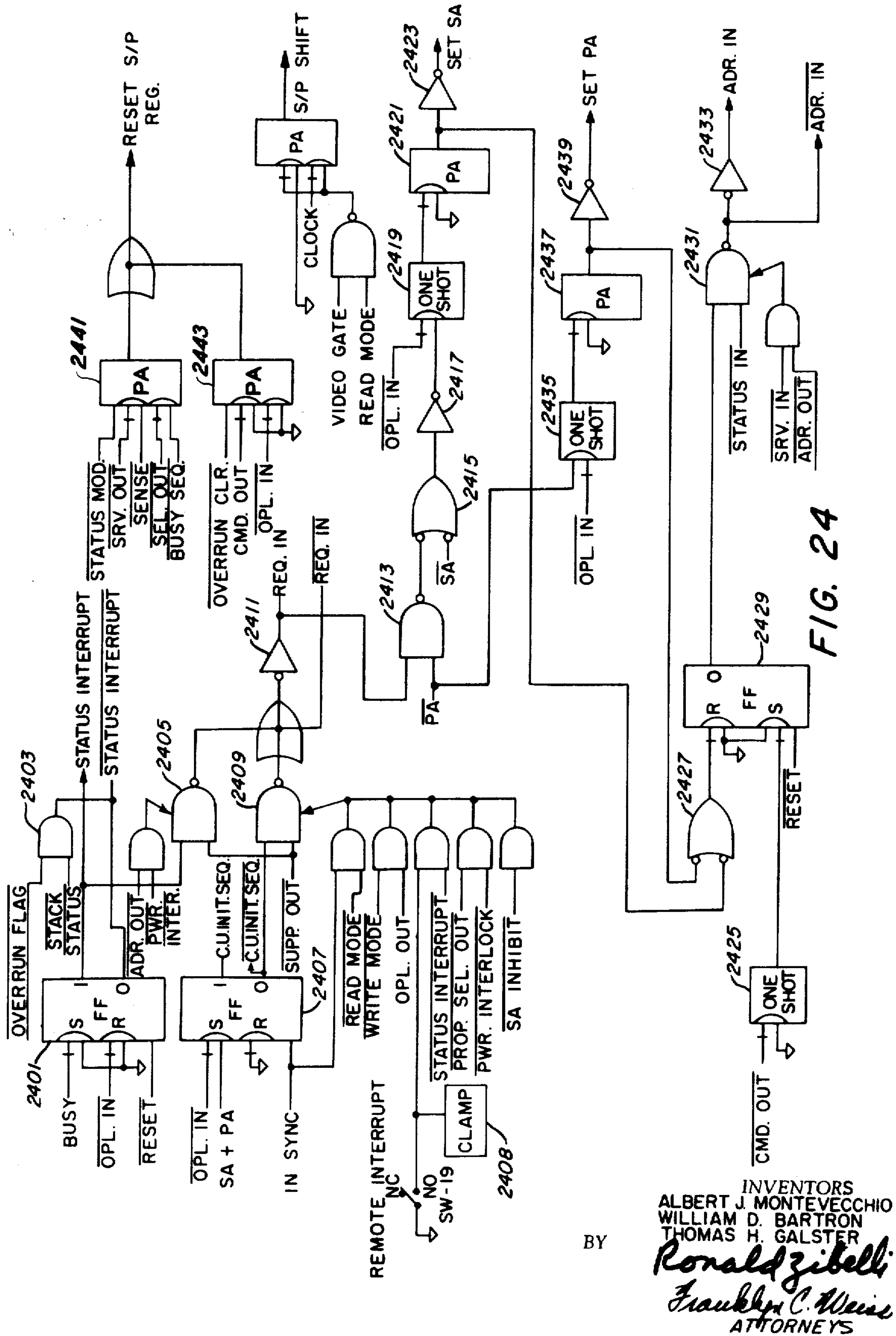
FIG. 24 is the logic circuitry for the request in and address in generation circuits.

As hereinbefore set forth, when an LDX scanner wishes to communicate with the computer channel, the request in line must be raised to the computer in order that the channel knows that a unit on the line requests to communicate with it. The channel comes back with select out to the adapter, with the adapter bringing up its operational in line to let the channel know that an I/O device has been selected. The propagation of select out to the next control unit is stopped, whereby the adapter has "captured" the channel with the operational in. Now, however, the adapter must let the channel know which unit is on the line and this is accomplished by placing the scanner address on the bus in lines and raising the address in tag line to the channel. These functions are accomplished in accordance with FIG. 24, which shows the request in and address in generators.

In order to generate the request in signal to the channel, the transmit button is depressed at the LDX scanner, which immediately begins the transmission of sync bursts to the adapter. After the synchronization procedure has ended, as was hereinbefore described, and the adapter is now in synchronization with the scanner, the in sync signal is received at the DC reset side of flip-flop 2407 to hold the flip-flop in the reset condition as long as synchronization is maintained. The output from the reset side of the flip-flop is at a logic 1, i.e. −3 v., enabling the first input to NAND gate 2409. If a logic 1 appears on the other inputs to NAND gate 2409 indicating a not suppress out signal, not Read mode, not Write mode, but operational out is up, not status interrupt, not propagate select out, not power interlock, and not scanner address inhibit, all of the inputs to the NAND gate 2409 will be enabled, thereby generating a logic 0 or ground potential at the output of the NAND gate. This signal represents the not request in signal, but after inversion by the inverter 2411, the request in signal is generated for transmission to the channel. If at any time switch 19, remote interrupt, is thrown to the closed position, the input to NAND gate 2409 is clamped by clamp 2408 to a ground potential, thereby disabling the gate and disabling or inhibiting the generation of a request in signal. If at any time the operational in signal is received in conjunction with the scanner address or printer address signal, flip-flop 2407 is set, thereby canceling the request in signal and signalling the start of a control unit initiated sequence.

If the adapter is busy, however, with a timing out sequence for the LDX printer and the mark for cut signals, the request in signal to the channel must be delayed until the busy condition has ceased. Flip-flop 2401 is responsive to the busy signal and inhibits NAND gate 2405 in conjunction with the suppress out signal, power interlock signal and address out signal, from generating the request in signal through inverter 2411.

The request in signal from the inverter 2411 enables NAND gate 2413. With the not printer address signal from the other input to NAND gate 2413, NOR gate 2415 in conjunction with the not scanner address signal through inverter 2417 enables one shot 2419. Upon receiving operational in, the one shot 2419 generates a 0.5 μsec. signal for enabling pulse amplifier 2421. The inverted output therefrom is the set scanner address signal. If the printer is the unit to which communication is to be received from the channel, the not printer address signal in conjunction with the operational in signal to one shot 2435 generates a 0.5 μsec. signal to enable pulse amplifier 2437. The inverted output therefrom through inverter 2439 is the set printer address signal. With either of the set scanner address or set printer address signals appearing at the input to NOR gate 2427, flip-flop 2429 is set, thereby enabling the input to NAND gate 2431. With not status in, not service in, and not address out at the other inputs thereof, the address in signal is generated through inverter 2433. With the bringing up of the address in line to the channel, the scanner or printer address on the bus out lines is now transferred to the computer which now for the first time knows which unit is communicating with it. When the command out signal is received at one shot 2425, a 1 μsec. pulse is generated to rest flip-flop 2429. Upon resetting of the flip-flop, NAND gate 2431 is disabled, thereby canceling the address in signal. The reset serial to parallel register signal is generated by the proper presentation to pulse amplifiers 2441 and 2443. Thus, not status modifier or service out and not sense, or select out and not busy sequence, or not overrun clear, or command out, or not operational in generates the said signal.

Figure 25:
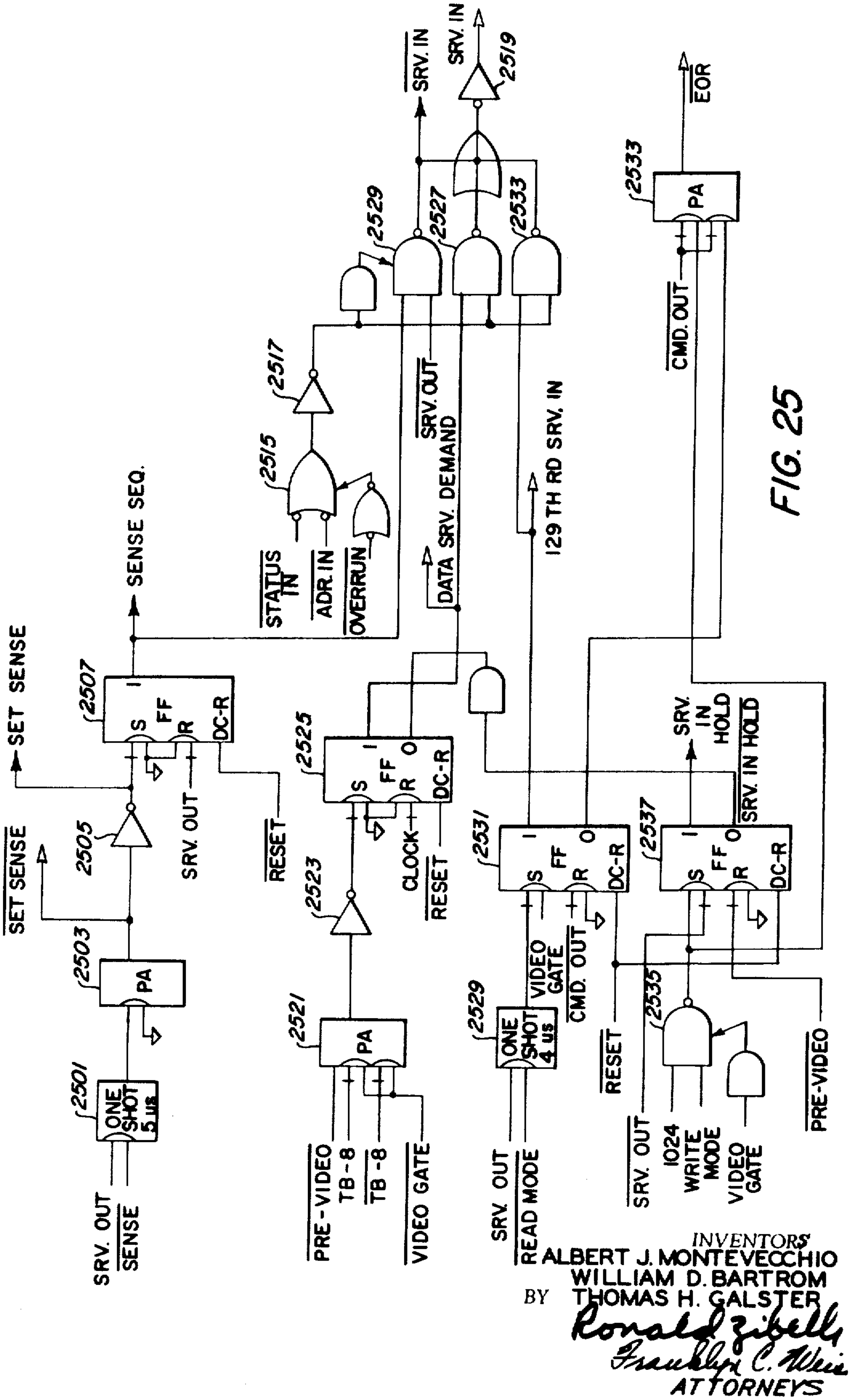
FIG. 25 is the logic circuitry for the service in generator.

Referring now to FIG. 25, there is shown the circuitry for the generation of service in to the computer. As hereinbefore set forth, service in is used to signal to the channel when the selected I/O device wants to transmit or receive a byte of information. The channel must respond to service in with service out, command out or in the disconnect sequence by address out. The initial data transfer, as hereinbefore set forth, begins after the handshaking and status investigation when the computer channel brings up the service out line. At this point, eight bits in a byte of data are transferred to the bus in lines and in order to transfer such information to the computer, the service in line is raised at the adapter. Thus one shot 2501 recognizes the service out signal and the sense signal and generates a 0.5 μsec. signal to enable pulse amplifier 2503. The output therefrom is the not set sense signal and through inverter 2505 sets flip-flop 2507. The output from the flip-flop 2507 is the sense sequence signal.

After the eight bits of data have been shifted in by a service in signal and when the next eight bits of data are ready for presentation to the computer, pulse amplifier 2521 is enabled upon the coincidence of the eighth clock pulse from the time base and the video gate signal. The output from pulse amplifier 2521, after inversion by inverter 2523, sets flip-flop 2525. The output from this flip-flop being the data service demand signal enables NAND gate 2527, which in conjunction with the signal from inverter 2517 generates the service in signal for transferring the present eight bits of data to the computer. NAND gate 2529 monitors the output of flip-flop 2507 together with the not service out signal and the output from the inverter 2517 in order that service in be raised before service out is dropped. This process continues for 128 bytes of information being transferred to the computer. Thus, one shot 2529 monitors service out and the Read mode signal for generating the 0.4 μsec. pulse to set flip-flop 2531 in conjunction with the video gate signal. The output therefrom is the 129th read service in signal, which through NAND gate 2533 is transmitted back to the channel.

As the computer channel has counted the 128 bytes of information, which is the end of a complete information record, the computer now comes back with command out signal instead of service out. This command out signal resets flip-flop 2531, which inhibits the generation of service in again. Pulse amplifier 2533 monitors the output of NAND gate 2535, which operates in the Write mode. Thus, if after 1024 bits in the Write mode with the video gate, thus enabling pulse amplifier 2533 and a command out signal is received at that flip-flop an error signal is generated, signifying that the command out signal was received at the wrong time. The output from NAND gate 2535 is also transferred to the input of flip-flop 2537, which is set thereby holding the output of flip-flop 2537 to the output of 2525. A prevideo signal to the reset side of flip-flop 2537 resets the flip-flop and generates the service in hold signal.

Figure 26:
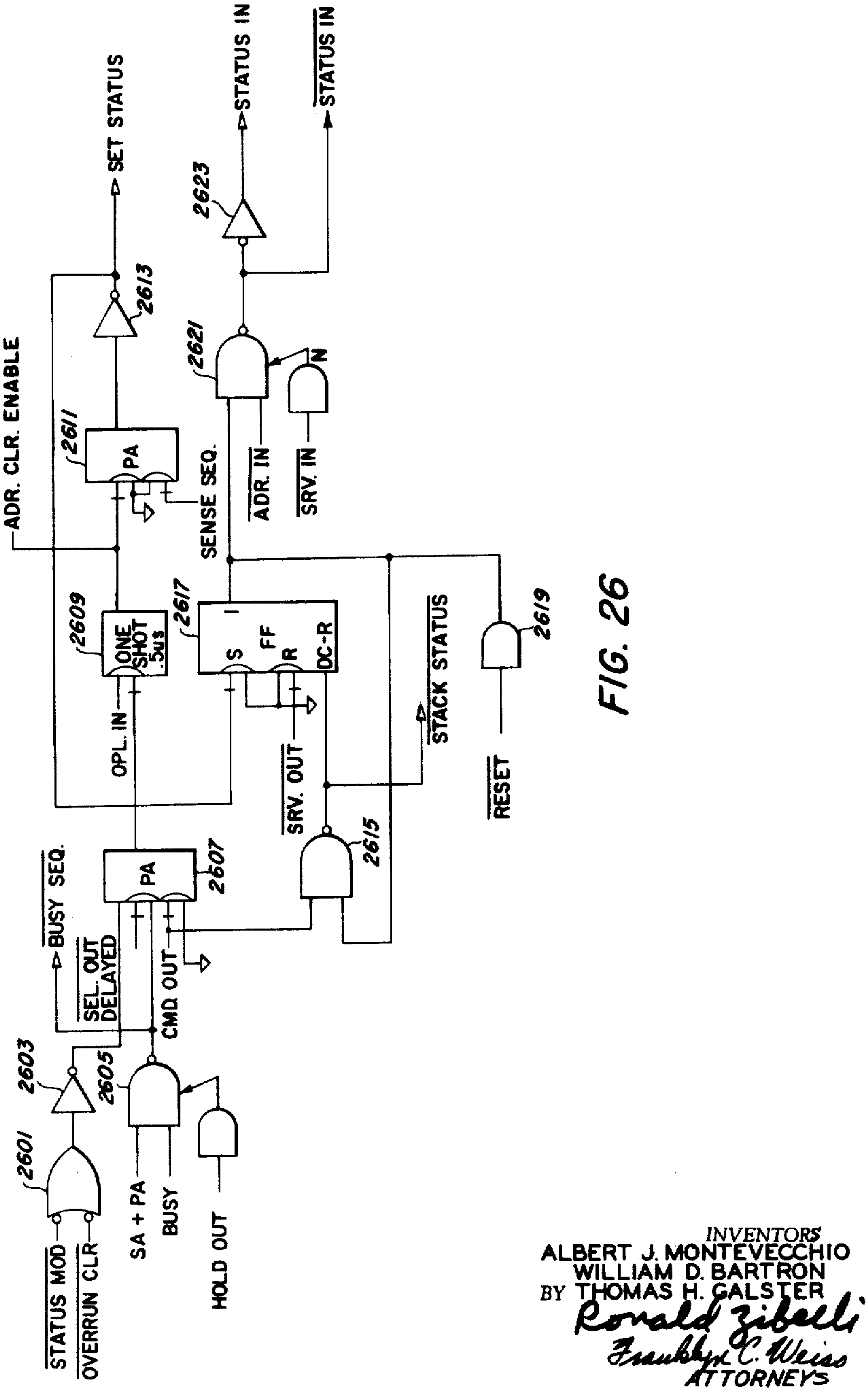
FIG. 26 is the logic circuitry for the status in generator.

Referring now to FIG. 26, there is shown the status in generator which is used, as was hereinbefore set forth, to signal the channel when the selected I/O device has placed status information on the bus in lines. In the initial selection sequence, after the handshaking procedure has terminated, before the transfer of information to or from the channel, the status of the input/output device, i.e. adapter, must be transmitted to the channel in order that the channel will know that the adapter is operational. Thus, after the channel has transmitted to the adapter the command out signal meaning "-proceed," the status byte is placed on the bus in lines to the channel and shortly thereafter the status in line is raised to transfer such information to the channel.

When the not status modifier and not overrun clear signals are received at NOR gate 2601, the pulse amplifier 2607 is enabled through inverter 2603. The output therefrom enables one shot 2609 in conjunction with not operational in. When either scanner address or printer address signals, busy signal, and hold out signal, are received at NAND gate 2605, the pulse amplifier 2607 can also be enabled. When the select out delayed signal is received at the other input to the pulse amplifier, one shot 2609 is enabled inasmuch as the status condition cannot be set during the propagation of the select out signals. Also, when the command out signal is received for the first time from the channel, indicating "proceed," pulse amplifier 2607 is enabled thereby energizing one shot 2609. A signal of 0.5 μsec., as the address clear enable signal, is transmitted to the input pulse amplifier 2611 and through inverter 2613 is the set status signal. The pulse amplifier may also be enabled by the receipt of the sense sequence signal as generated in FIG. 25. The signal from the pulse amplifier 2611 is an indication to other circuitry to set the status byte on the bus in lines to the channel. This signal is returned to the set input of flip-flop 2617 which enables the input to NAND gate 2621. With not address in and not service in enabling the other inputs to NAND gate 2621, the status in signal to the channel is generated through inverter 2623. Inasmuch as there was a 0.5 μsec. signal delay to the enabling of pulse amplifier 2611, the command out signal through NAND gate 2615 had DC reset flip-flop 2617 prior to the setting of the flip-flop by the set status signal. The sequence is to allow the assurance that the set status signal will appear before the generation of the status in signal. With the rise of service out, the flip-flop 2617 will be reset thereby disabling the generation again of the status in signal before the next proper time period.

Still referring to FIG. 26, the receipt of a busy signal at the NAND gate 2605 initiates a special sequence in order to generate the status signals whenever the busy signal occurs. The normal sequence, as set forth above, with the initiation of a command out signal at the pulse amplifier 2607, occurs in the initial selection sequence. However, the status byte must be transmitted to the channel whenever the adapter generates a busy signal. Thus, through NAND gate 2605, the busy signal pulses the pulse amplifier 2607 and generates the 0.5 μsec., signal through one shot 2609 to generate the set status signal and the status in signals.

Figure 27:
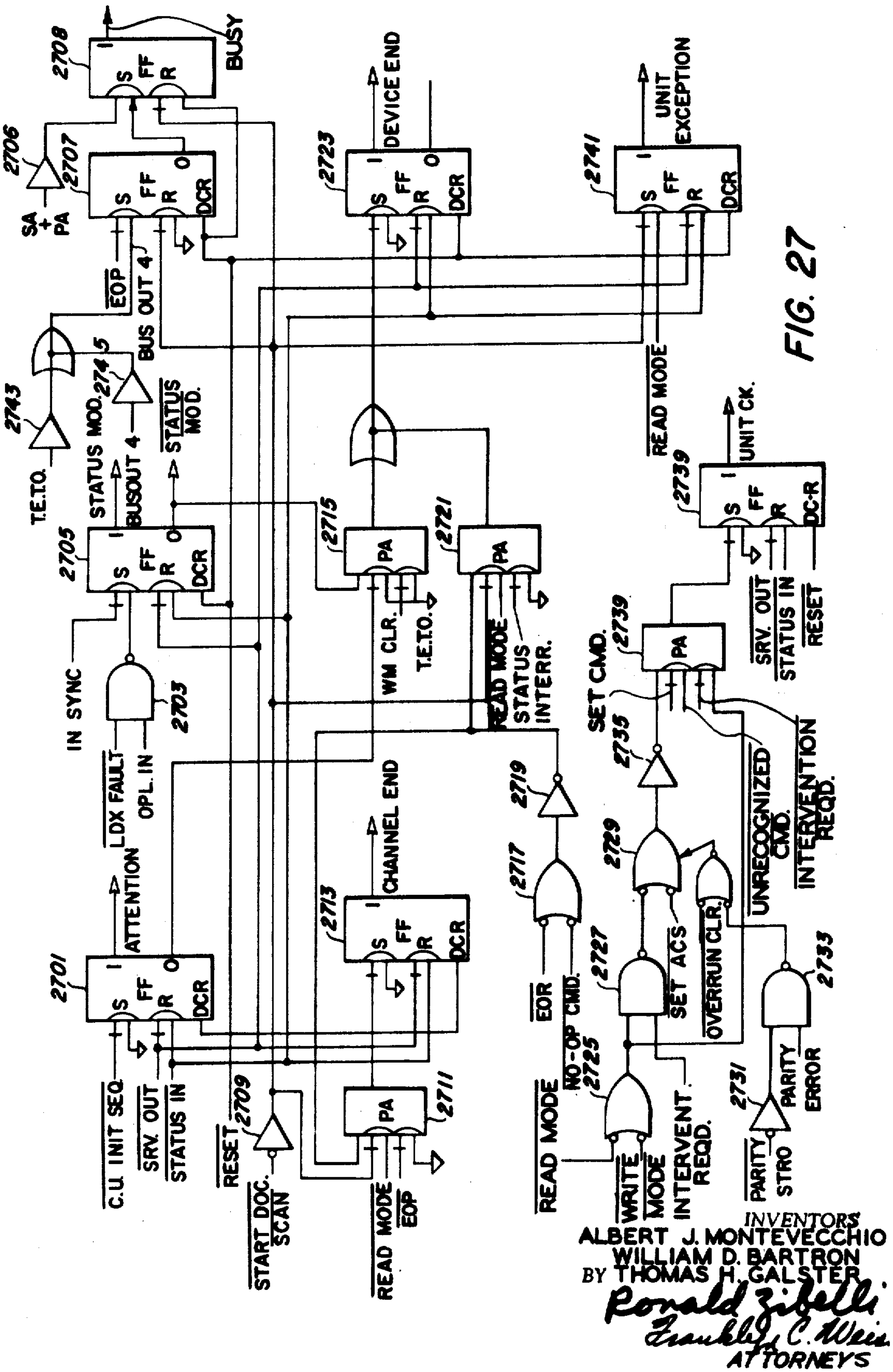
FIG. 27 is the logic circuitry for the status byte buffer.

Referring now to FIG. 27, there is shown the status byte buffer in which the status bits in the byte are generated for presentation to the bus in lines to the computer channel. As hereinbefore set forth, the status byte consists of eight bits plus a parity bit. To reiterate, the status bits as they appear in the status byte are attention, status modifier, control unit end, busy, channel end, device end, unit check, and unit exception. In order to generate the attention bit, flip-flop 2701 must recognize a control unit initiated sequence signal at the set input to the flip-flop. The status modifier bit is generated at flip-flop 2705 by the receipt of not LDX Read fault signal and operational in signal at NAND gate 2703, which enables the set input to flip-flop 2705. When the in sync signal is received, the status modifier bit is generated. The control unit end bit is not utilized by the adapter and thus is not generated.

The busy signal is generated in conjunction with flip-flops 2707 and 2708. The trailing edge timeout signal through the inverter 2743, or the bus out 4 signal through inverter 2745 in conjunction with the not end of page signal sets flip-flop 2707. The output therefrom with the scanner address or printer address signal through inverter 2706 sets flip-flop 2708, thereby generating the busy signal. Flip-flops 2707 and 2708 can be DC reset by the not manual reset signal.

The channel end signal, as was hereinbefore set forth, is caused by the completion of the portion of an I/O operation involving transfer of data or control information between the I/O device and the channel. The adapter will generate the channel end bit at the end of each input record and at the end of each output record. To reiterate, an input record would be at least at the end of each scan line, while each output record might be at the end of each N scan lines. Thus, to generate the channel end signal at flip-flop 2713, several sequences can take place. The receipt of a not end of Read signal or not no-op command signal at NOR gate 2717 and after inversion by inverter 2719 through pulse amplifier 2711 will set the flip-flop 2713. In addition, the receipt of a not Read mode signal and by inverter 2709, the start document scan signal, the flip-flop 2713 will be set, thereby generating the channel end signal. Further, the receipt of a not end of page signal at the pulse amplifier 2711 will also generate the channel end signal. The not set sense and not status modifier signals to NOR gate 2718 through inverter 2720 will also enable pulse amplifier 2711 in addition to pulse amplifier 2721.

The device end signal is generated by flip-flop 2713. This signal may also be generated by any of several sequences. The signal from the reset side of flip-flop 2701 which was reset by the receipt of the not service out and not status in signal to the input of pulse amplifier 2715 will generate the device end signal. The Write mode clear signal to the input to pulse amplifier 2715 also generates the signal. The output of inverters 2719 and 2720, the coincidence of the output from inverter 2709 and the not Read mode signal; or the receipt of the status interrupt signal at pulse amplifier 2721 will generate the device end signal. The device end condition indicates that the I/O device has completed the operation. The adapter uses the device end with channel end since each record, whether input or output, is considered as an input/output operation in itself. It can be seen, therefore, that the output of inverter 2709 through pulse amplifier 2711 together with the same signal from inverter 2709 to the input of pulse amplifier 2721 generates both the channel end and device end bits.

The unit check signal is generated by flip-flop 2739. This bit indicates that the I/O device or control unit, i.e. adapter, has detected an unusual condition that is detailed by the information available to a sense command, as will hereinafter be more fully gate The adapter uses the unit check bit to indicate to the channel that some error condition exists, whether in the adapter, scanner, printer, communications link, or the channel itself. The receipt of a not Read mode signal or a not Write mode signal to NOR gate 2725 enables the input to NAND gate 2727. The other input to the NAND gate is intervention required which through NOR gate 2729 and inverter 2735 enables the pulse amplifier 2737 to generate the unit check signal through the flip-flop 2739. Another input to NOR gate 2729, the not set abnormal command sequence will also generate the unit check bit. A parity error through inverter 2731 and NAND gate 2733 through the NOR gate 2729 additionally generates the unit check bit through pulse amplifier 2737 and flip-flop 2739. In the same manner the not overrun clear signal to NOR gate 2729 will initiate the function of the pulse amplifier 2737. The receipt of the set command and the not unrecognized command signal, will also generate the unit check command as will the receipt of the output of NOR gate 2725 together with the not intervention required signal to the input of pulse amplifier 2737.

The unit exception bit in the status byte, indicates that a condition is detected which usually does not occur. However, the adapter uses the unit exception bit to indicate to the channel that the end of the document has been detected. Thus with a not Read mode signal and the start document scan signal, the unit exception bit is generated. It is to be noted that all the status bit flip-flop generators will be reset upon the output of the not service out signal and the not status in signal to the reset side of the flip-flops.

Figure 28:
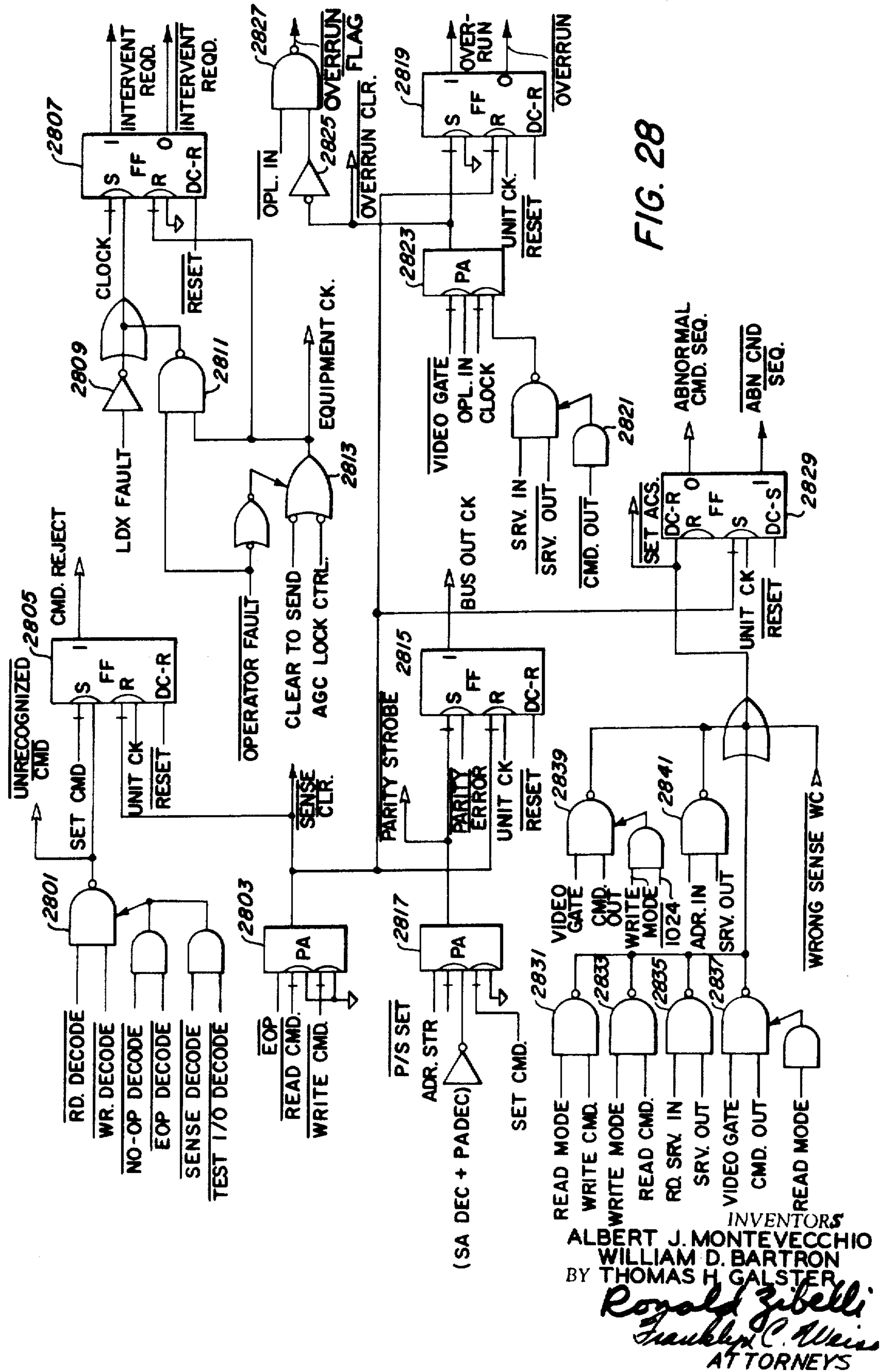
FIG. 28 is the logic circuitry for the sense byte buffer.

Referring now to FIG. 28, there is shown the sense byte buffer which generates the sense command signals to the bus in lines to the computer channel. As was hereinbefore set forth, the sense byte comprises eight bits to tell the channel the condition of the adapter and the I/O device when the unit check bit in the status byte has been generated. The command reject bit is utilized to indicate that an invalid command has been decoded by the adapter. NAND gate 2801 has as its inputs a not Read decode, not Write decode, not no-op decode, not end of page decode, not sense decode, and not test I/O decode. As these are all the command decode signals which are recognized by the adapter, if none of these signals are recognized by the command decoder, all of the inputs to the NAND gate 2801 will be enabled, thereby enabling the input to flip-flop 2805. With the set command input, the command reject signal will be generated indicating that none of the commands decoded are recognized by the adapter. This flip-flop is reset by the incidence to pulse amplifier 2803 of the not end of page, not Read command, or the not Write command signals in conjunction with the unit check bit from the status byte. In other words, when the unit check bit is generated and dropped in the status byte, there is no longer any need for the command reject signal. The other flip-flops utilized in generating the sense bits in the byte are reset in the same manner.

The intervention required bit in the sense byte is generated by flip-flop 2807. This bit is utilized to indicate to the channel that manual intervention by an operator is needed before further data transfer can be accomplished. This signal may be generated by several sequences. If an LDX fault signal is received by inverter 3809, in conjunction with the clock signal, the flip-flop will be set thereby generating the intervention required signal. If both inputs to NAND gate 2811 are enabled, the signal will also be generated by flip-flop 2807. Thus, when any of the inputs to NOR gate 2813, that is, not operator fault, clear to send, and AGC lock control, do not appear, that is, they are at ground level, the output from NOR gate 2813 will be at a −3 volt level and together with the not operator fault signal at the same level, will enable the set input to the flip-flop 2807. When the condition has been rectified, the output of NOR gate 2813 will enable the reset input to the flip-flop thereby canceling the intervention required signal.

The equipment check signal is generated by the NOR gate 2813 as in the paragraph above. This bit in the sense byte indicates that the adapter detects an equipment malfunction. Thus, if any one of the inputs to NOR gate 2813 are at ground potential indicating an operator fault, or the lack of a clear to send or AGC lock control signal, an equipment check is necessary and the equipment check bit in the sense byte will be set.

The bus out check bit is generated by flip-flop 2815. This bit indicates that the adapter detects a parity error on the bus out lines thereby indicating that the information on the bus out lines may not be the correct information. In order to generate the bus out check bit, pulse amplifier 2817 must be enabled. The not parallel-serial set signal; the coincidence of the address strobe and the inverted scanner address decode or printer address decode signal; or the set command signal will enable the pulse amplifier 2817. The output therefrom is the not Parity Strobe signal and together with the not parity error control signal will set the flip-flop 2815 to generate the bus out check bit.

The overrun bit in the sense byte is generated at flip-flop 2819 and is used to indicate that the adapter detects timing overruns, indicating that certain time sequences took too long and the timing sequences no longer are in the proper order. To generate the overrun signal, pulse amplifier 2823 must be enabled. With operational in and the not video gate signal appearing at one input to the pulse amplifier 2823, the overrun signal will be generated. The other input to enable the pulse amplifier 2823 is from the NAND gate 2821. Whenever any input, i.e. service in, not service out, and not command out, are in the ground level the output from the NAND gate will be at a −3 v. level thereby enabling the input to the pulse amplifier 2823 at the next clock pulse. In other words, if any input to NAND gate 2821 does not arrive before the next clock pulse, an overrun condition has occurred and flip-flop 2819 will be set. The output from pulse amplifier 2823 is also the not overrun clear signal which through inverter 2825 is presented to the NAND gate 2827. With the not operational in signal at the other input to NAND gate 2827, the not overrun flag signal is generated.

The last sense bit is the abnormal command sequence which indicates that the wrong commands have been received in a particular time sequence. Flip-flop 2829 generates the abnormal command sequence upon proper input. The enabling signal for flip-flop 2829 is the DC reset signal which may come from NAND gates 2831 to 2841. In order to get an enabling pulse from any of the AND gates, all the inputs to any one AND gates must be in true or −3 v. state. Thus, at NAND gate 2831 if both Read mode and Write command signals are received the abnormal command sequence will be generated. Also, of a Write mode and Read command signal appear at NAND gate 2833; the 129th read service in and the service out are received at NAND gate 2835; the video gate, the command out and the Read mode signals are received at NAND gate 2837; video gate, command out, Write mode, and not 1024 signals are received at NAND gate 2839; or address in and service out are received at NAND gate 2841; or the not wrong sense word command signal from elsewhere in the circuits are received, the abnormal command signal will be generated and the flip-flop will generate the abnormal command sequence signal.

Figure 29:
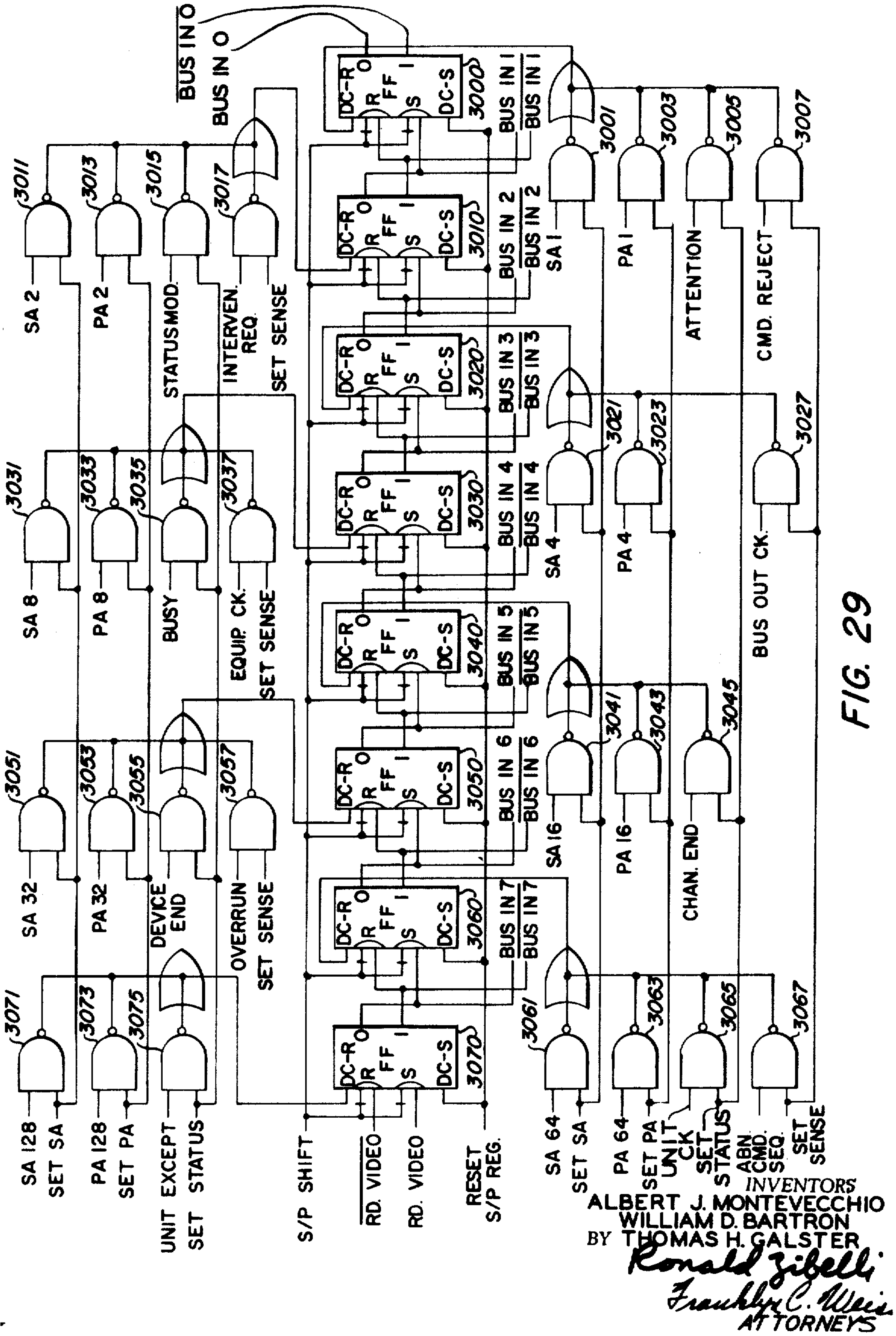
FIG. 29 is the logic circuitry for the serial to parallel register.

In FIG. 29 is shown the serial to parallel register which is utilized to time quantize and convert a serial data stream to eight bit parallel bytes for input to the channel from a scanner. The output of this register is applied directly to the bus in lines to the computer channel. In addition to converting the serial video data to parallel information, the serial to parallel register is utilized to transmit to the channel the scanner address, the printer address, the status byte and the sense byte. This information is entered into the stages of the register upon the different commands from the computer.

It can be seen that the video information enters the flip-flop network at the left of the array into flip-flop 3070. At the next clock time, a serial to parallel register shift signal enters each stage of the flip-flop network and propagates the video information along the flip-flops until the eight bits in one byte are stored in the flip-flops. The outputs from the separate flip-flops are entered directly onto the bus in lines and when the proper tag signal is raised, the computer channel will accept the information appearing on these output lines. The action continues with eight bits of information being shifted in for every byte transmitted to the computer channel.

During the handshaking procedure, the adapter must enter on the bus in lines the scanner or printer address depending upon which unit is in communication with the channel. As hereinbefore set forth with the scanner address decoder and printer address decoder of FIGS. 20 and 21, respectively, the address is entered directly into the flip-flops comprising the serial to parallel register prior to entrance onto the bus in lines at a command signal. Thus, NAND gate 3001 is enabled by the set scanner address signal and depending upon the logical state of the other input to the gate, will set into the flip-flop 3000 the binary level corresponding to the bus in bit 0 with the first binary bit in the address. Similarly, NAND gate 3011 sets into flip-flop 3010 the bus in 1 digit and so on for NAND gate 3021, 3031, 3041, 3051, 3061, and 3071 entering into flip-flops 3020, 3030, 3040, 3050, 3060, and 3070 the scanner address. For the printer address the operation is exactly the same. Thus, NAND gate 3003, 3013, 3023, 3033, 3043, 3053, 3063, and 3073, enter into the eight stages of the register the printer address signal.

In the same manner as in the previous paragraph, the status byte and sense byte are entered into the register upon receipt of the set status and set sense signals, respectively. The status bits attention, status modifier, busy, channel end, device end, unit check, and unit exception are entered into the various stages as shown through NAND gates 3005, 3015, 3035, 3045, 3055, 3065, and 3075, respectively. The sense byte is entered into the same stages of the flip-flops upon receipt of the set sense signal. In a similar manner, the command reject bit, intervention required, bus out check, equipment check, overrun and abnormal command sequence, are entered into the register through NAND gates 3007, 3017, 3027, 3037, 3057, and 3067.

Figure 30:
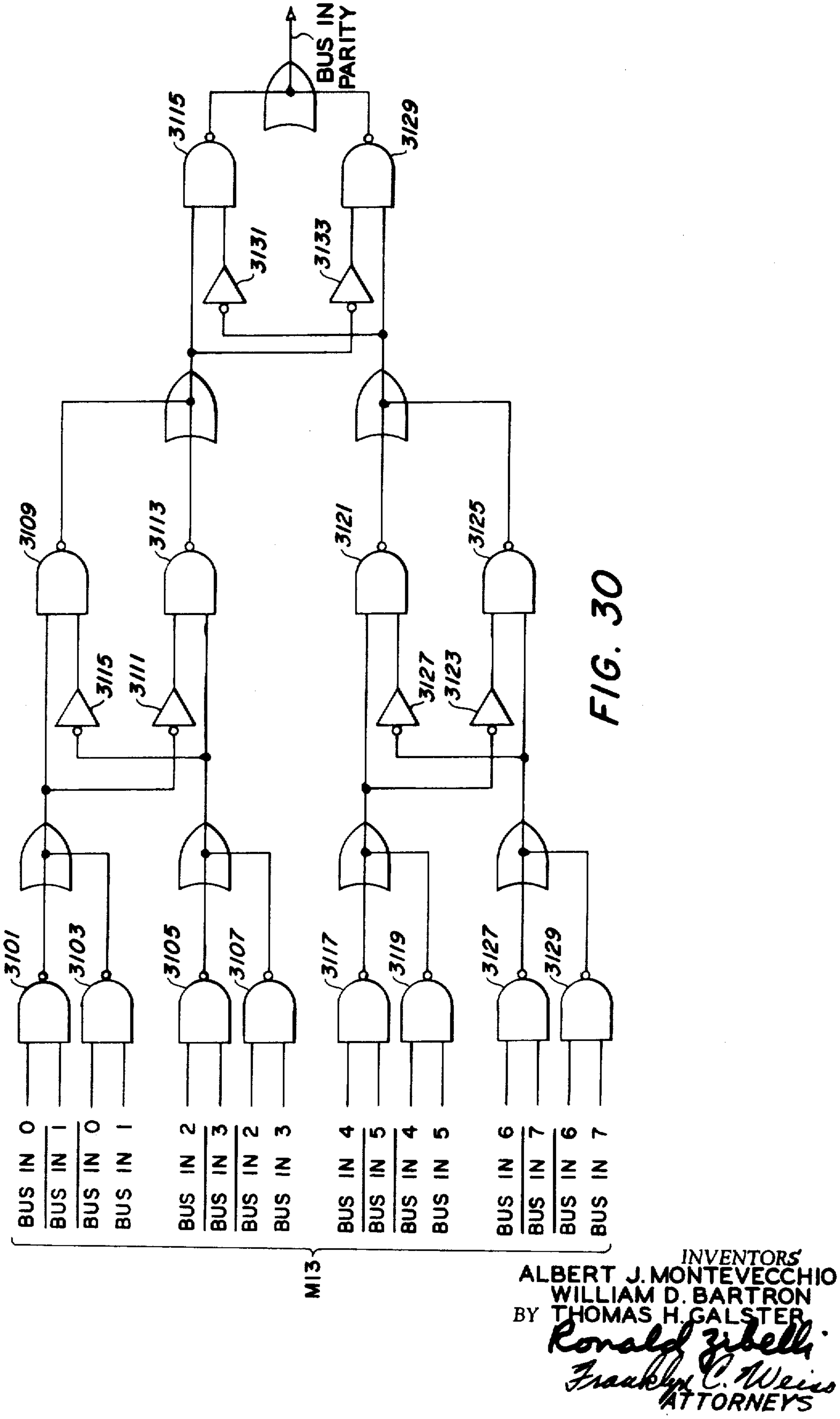
FIG. 30 is the logic circuitry for the odd parity generator.

In FIG. 30 is shown the odd parity generator for generating the parity bit on the bus in lines to the computer. Parity is utilized as an error-checking device in that it is utilized to determine if the eight bits in a byte are correct. In odd parity the circuit detects an odd number of binary 1 signals on the bus in line and generates a binary 1 for an odd count. For an even count of binary 1's a binary 0 is placed on the bus in parity line indicating an even count of binary 0's. If the computer detects a binary 1 on the bus in parity line, but only counts an even number of binary 1's on the bus in line, then an error has occurred in the transmission of the bus in information. NAND gate 3101 monitors the bus in 0 and not bus in 1 lines, while NAND gate 3103 monitors the not bus in 0 and bus in 1 lines. The outputs of these two NAND gates are presented to the input of NAND gate 3109 and by inverter 3111 is presented to the input of NAND gate 3113. NAND gate 3105 monitors the bus in 2 and not bus in 3 line, while NAND gate 3107 monitors the not bus in 2 and bus in 3 lines. The outputs of these NAND gates are presented to NAND gate 3113 and through inverter 3115 is presented to the other input of NAND gate 3109. Gates 3109 and 3113 and inverters 3111 and 3115 operate as an exclusive OR circuit. NAND gate 3117 monitors the bus in 4 and not bus in 5 lines, while NAND gate 3119 monitors the not bus in 4 and the bus in 5 lines. The outputs of these gates are presented to one input to NAND gate 3121 and to inverter 3123 to one input of NAND gate 3125. NAND gate 3127 monitors the bus in 6 and not bus in 7 lines, while NAND gate 3129 monitors the not bus in 6 and the bus in 7 lines. The output of these gates are presented to the other input to NAND gate 3125 and through inverter 3127 to the other input to NAND gate 3121. Gates 3121 and 3125 together with inverters 3123 and 3127 operate as a second exclusive OR circuit. The outputs of NAND gates 3121 and 3125 are presented to one input of NAND gate 3129 and through inverter 3131 presented to the other input to NAND gate 3115. The first input to gate 3115 through inverter 3133 is also presented to the other input to gate 3129. Thus, depending upon the voltage level which is indicative of the binary state of the bus in lines, the bus in parity line will either be a binary 1 or a binary 0 indicative of the odd or even logic detected on the bus in lines.

Figure 31:
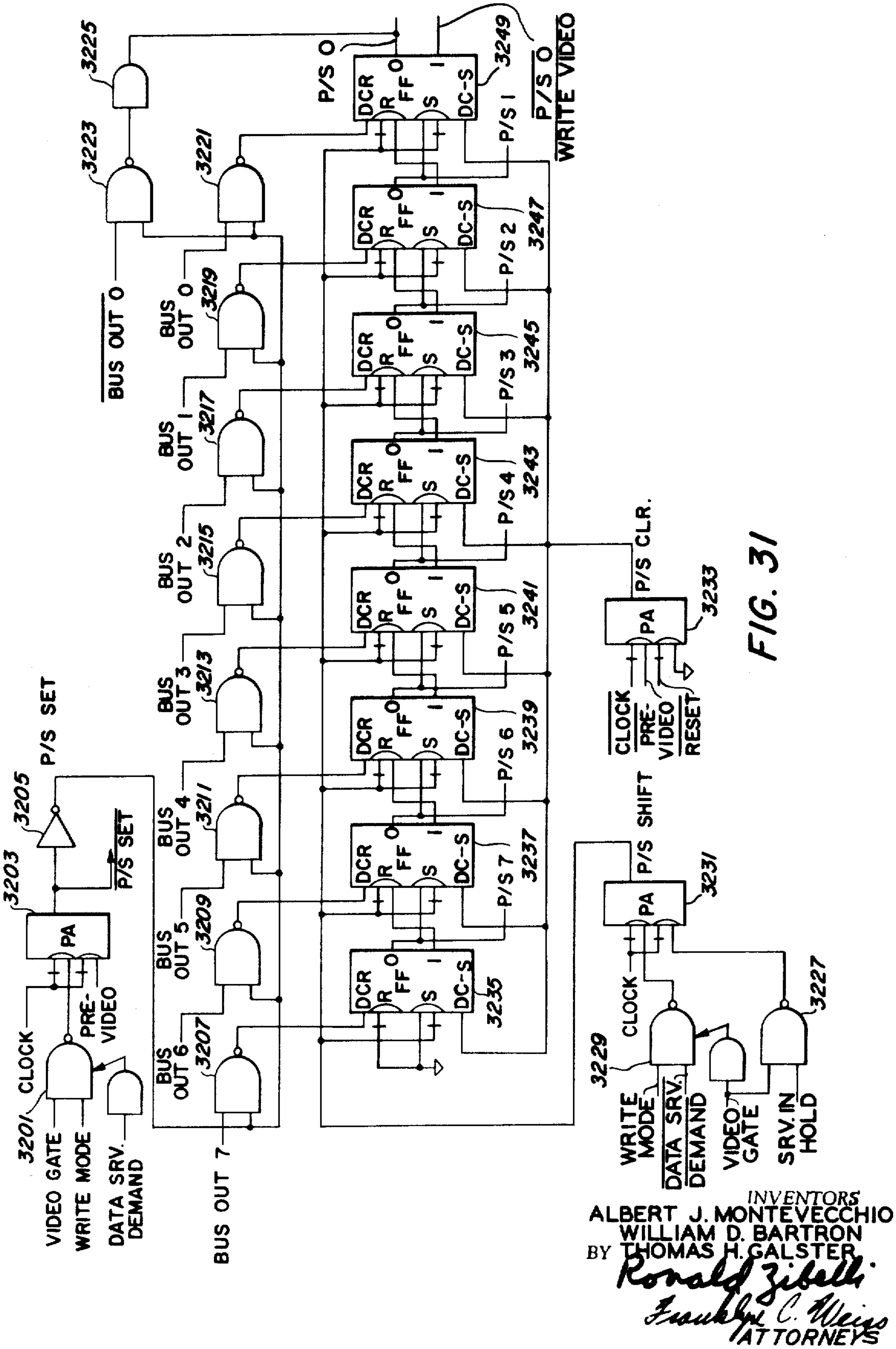
FIG. 31 is the logic circuitry for the parallel to serial register.

FIG. 31 shows the parallel to serial register for receiving the information on the eight bus out lines from the computer and converting it into serial data for application by the LDX equipment. The video information from the computer is presented to the flip-flop array and is read out serially for application by the adapter and the LDX equipment. However, provisions are also made for reading out the information on the flip-flop array in the instance where addresses, commands, etc., are placed on the bus out lines for use by the adapter. The information on the bus out lines is placed on the inputs to NAND gates 3207 to 3221. The other inputs to the NAND gates are provided from the enabling network 3201 to 3205. Thus, NAND gate 3201 receives the video gate, Write mode, and data service demand signals. When these signals are present, pulse amplifier 3203 is enabled and by the clock signal applied thereto, and generates the not parallel to serial set signal. Through the inverter 3205, the parallel to serial set signal is generated for application to the inputs of NAND gates 3207 to 3223. At the presentation of a not prevideo signal at the other input to the pulse amplifier 3203, in conjunction with the clock signal, the enabling signal is also generated.

The information out from the computer is present at the inputs to the aforementioned NAND gates 3207 to 3221. At the enabling signal presented at the other inputs to the NAND gates, the information is transferred into the flip-flop array 3235 to 3249. The information is shifted out at each clock time through pulse amplifier 3231. Thus, when the Write mode, not data service demand, and video gate signals are presented to NAND gate 3239 the pulse amplifier is enabled and at each clock time, parallel to serial shift signal is applied to the flip-flop array for transferring the data out in a serial fashion. An alternative method for generating the shift signal is the video gate and service in hold signal to NAND gate 3227 which in conjunction with the clock signal generates the shift pulse. Parallel readout from the flip-flop array is also provided at the parallel to serial 1 through 7 outputs for receiving address and command signals, for example, for decoding by other circuitry. The register is cleared when a not clock and not prevideo signal are received at pulse amplifier 3233 in addition to the possibility of a not reset signal in conjunction with ground to the pulse amplifier 3233. The parallel to serial 0 signal can also be generated by the not bus out 0 signal applied to NAND gates 3223 through 3225.

Figure 32:
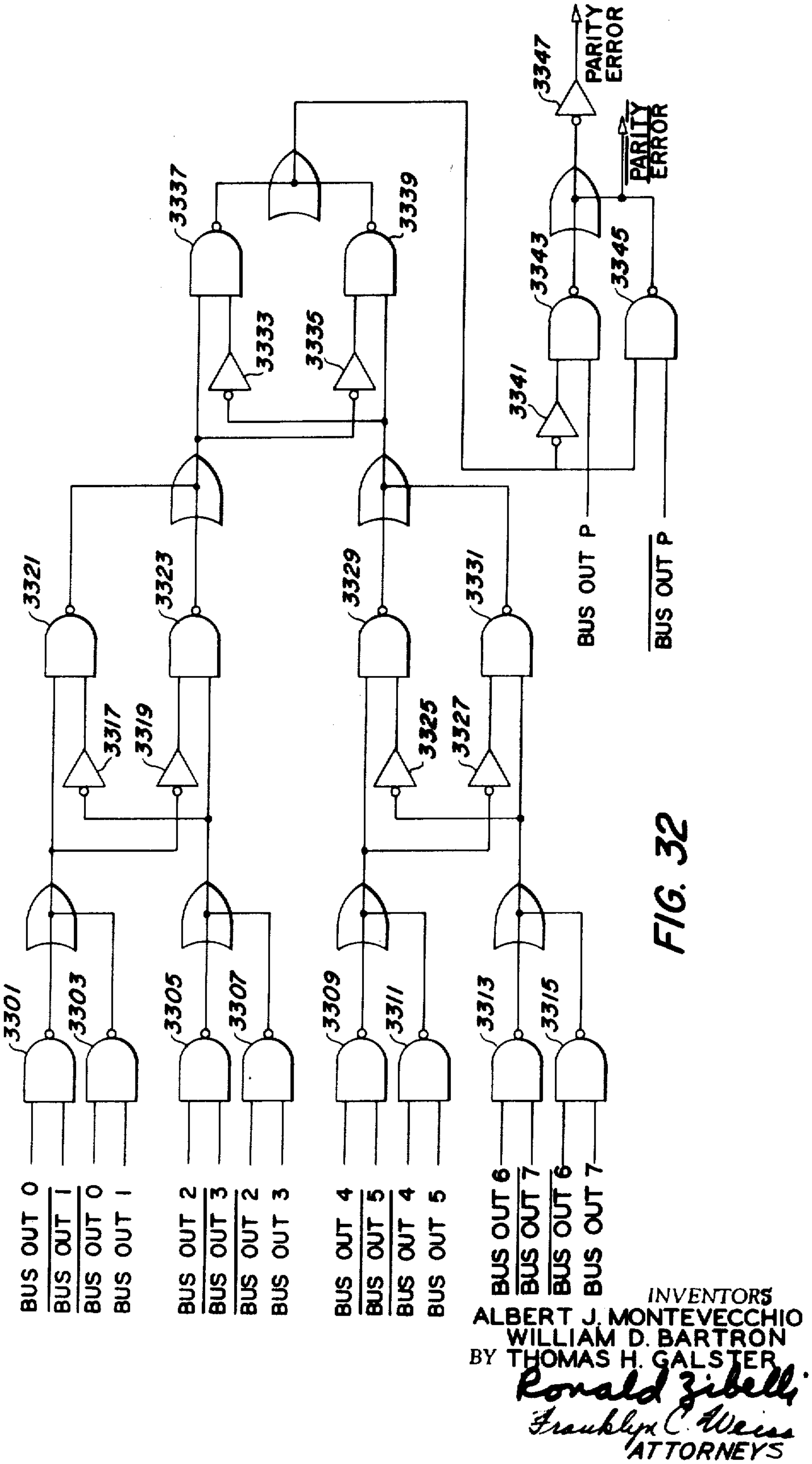
FIG. 32 is the logic circuitry for the parity error detector.

In FIG. 32 is shown the circuitry for the parity error detector. The action of this circuitry is similar to that of the odd parity generator as shown and described in conjunction with FIG. 31. In this circuit, however, parity as generated by the computer is detected and determined whether the parity is correct or in error. The operation of the circuit is similar in that NAND gate 3301 monitors the bus out 0 and not bus out 1 lines. NAND gate 3303 monitors the not bus out 0 and the bus out 1 lines. The outputs of these NAND gates are presented to the input of NAND gate 3321 and through inverter 3319 to the input of NAND gate 3323. NAND gate 3305 monitors the bus out 2 and not bus out 3 lines; while NAND gate 3307 monitors the not bus out 2 and the bus out 3 lines. The outputs of these NAND gates are presented to the other inputs of NAND gate 3323 and through inverter 3317 to NAND gate 3321. NAND gate 3309 monitors the bus out 4 and not bus out 5 lines; while NAND gate 3311 monitors the not bus out 4 and the bus out 5 lines. The outputs of these NAND gates are presented to NAND gate 3329 and through inverter 3327 to NAND gate 3311. NAND gate 3313 monitors the bus out 6 and the not bus out 7 lines; while NAND gate 3315 monitors the not bus out 6 and the bus out 7 lines. The outputs of these NAND gates are applied to the other input of NAND gate 3331 and through inverter 3325 to the other input of NAND gate 3329. The outputs of NAND gates 3321 and 3323 are presented to the input of NAND gate 3337 and through inverter 3335 to NAND gate 3339. The outputs of NAND gate 3329 and 3331 are presented to gate 3339 and through inverter 3333 through gate 3337. These three pairs of NAND gates with their associated inverters operate as exclusive OR functions and, in a manner similar to that of the odd parity generator in FIG. 31, transfers the parity determination of the inputs on the bus out lines. In this circuit, however, the parity of the transmitted information must be determined to be correct. Thus, the outputs of NAND gates 3337 and 3339 are presented to NAND gate 3345 and through inverter 3341 to NAND gate 3343. The inputs to NAND gate 3343 and 3345 are bus out P and not bus out P, respectively. The parity on the line of bus out P is compared at these NAND gates with the outputs of the NAND gate 3337 and 3339. If parity is correct, a signal will appear on the not parity error line, while if a parity error has been detected, this signal will appear on the output of inverter 3347.

Figure 33:
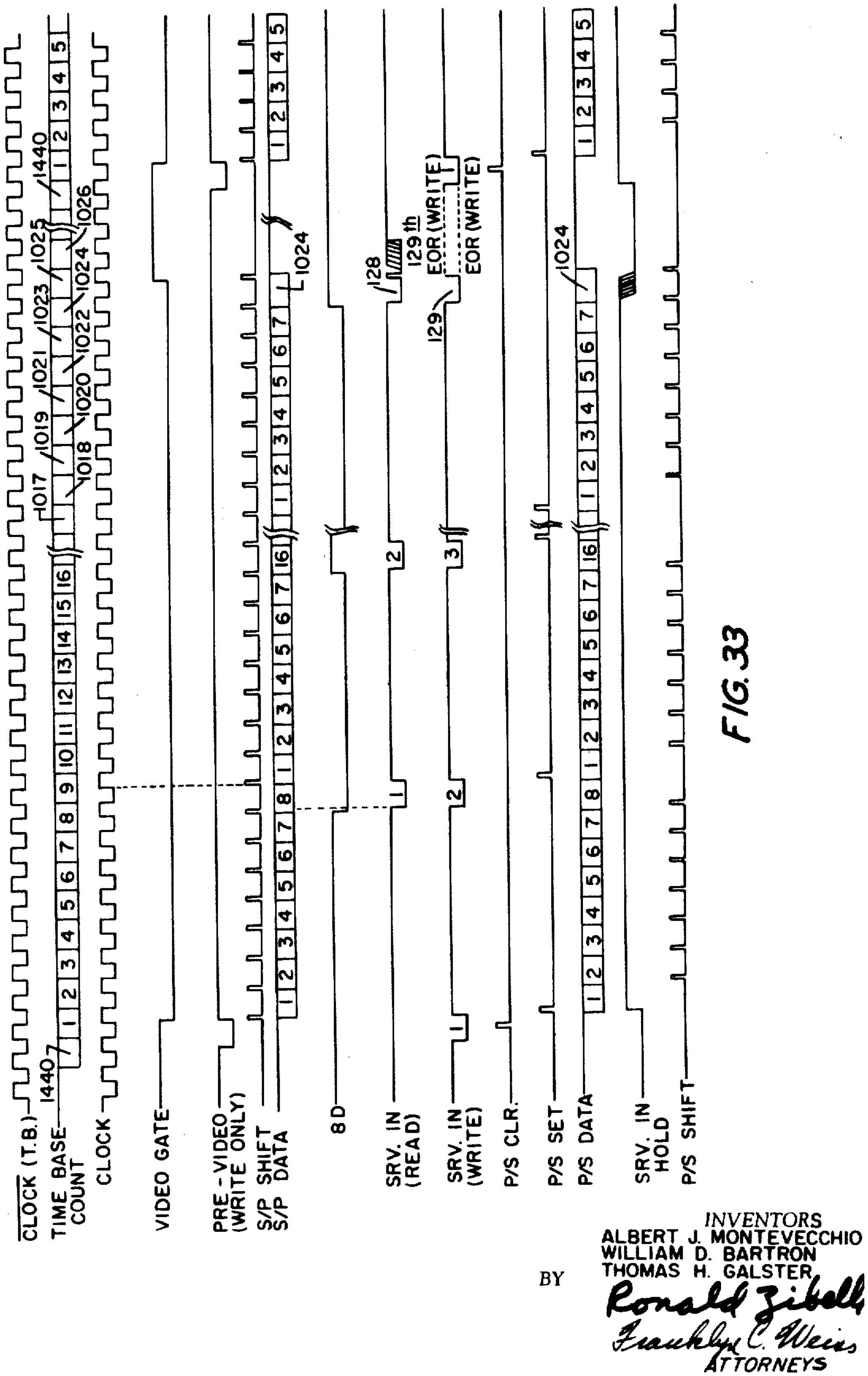
FIG. 33 is the timing sequences for the serial to parallel and parallel to serial register timing.

Referring now to FIG. 33, there is shown the serial to parallel and parallel to serial register timing. The input and output pulses in conjunction with these register circuits, are shown in this figure. As the functions of these particular circuits have been fully described in conjunction with FIGS. 29 and 31, no further explanation is needed apart from that given above.

Figure 34:
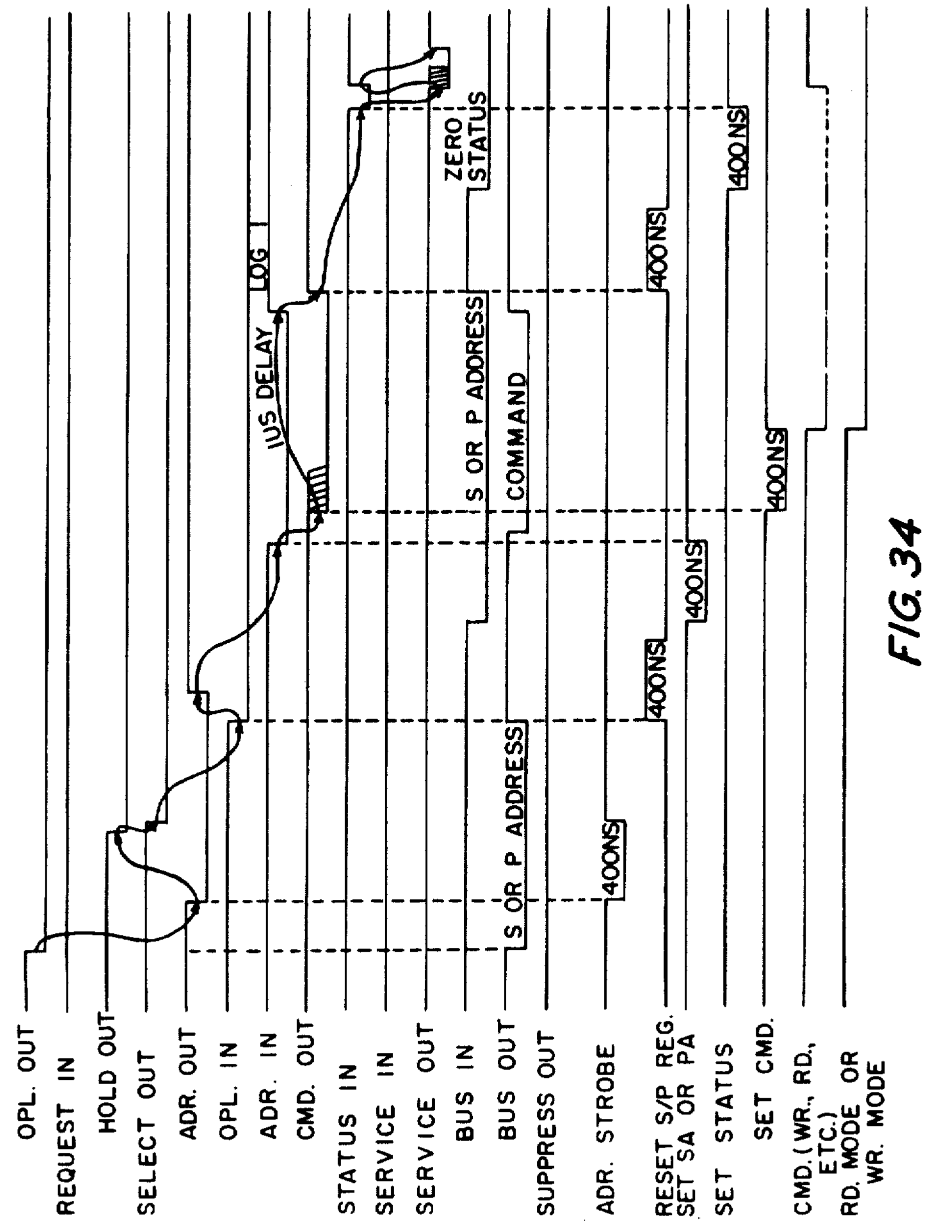
FIG. 34 is the flow diagram for the initial selection sequence.

In FIG. 34 is shown the initial selection sequence for the operation of the adapter. As was fully hereinbefore described, the steps to be followed are as follows. Operational out is raised with address out following shortly thereafter. Holdout follows with select out following immediately thereafter with a 400 nano-second delay after address out. Operational in is raised to the computer with the computer then placing the address of the input-output device on the address out lines. The address of the I/O device is placed on address in and the computer follows with a command signal on the command out line shortly thereafter. With the handshaking procedure terminated, the address in line is dropped as is the command out line shortly thereafter also. Before data transfer can occur, the status in line is raised in order that the status information of the adapter and associated printer-scanner can be transmitted to the channel. Service out is raised momentarily to allow for the dropping of the status in line and is dropped thereafter.

In the foregoing, there has been disclosed methods and apparatus for interfacing the signals to and from a computer system with that of a facsimile graphic communication system. While the disclosed circuits have been described in conjunction with specific logic circuitry, such circuitry is exemplary only as other circuits and apparatus could be utilized to perform the disclosed functions. For instance, negative logic is utilized herein, but it is obvious that positive logic could also be utilized without deviating from the principles of the present invention. Certain gating functions have been shown apart from the normal method of showing such a circuit. For instance, some logic gates have been shown as comprising the output from another gate associated therewith with an arrow pointed toward the center of the gate. This indicates that the gate as provided did not have the requisite amount of inputs and a further gate must be utilized in conjunction with the number of inputs provided thereto. Further, an OR function has been shown as two or more lines coming together with an OR function drawn around it. This type of gate is not an actual circuit component, but is merely a wire connection with an OR function.

In addition, the foregoing system has been shown and described in conjunction with an LDX scanner and printer facsimile system in conjunction with an IBM system 360 computer network. It is apparent, however, that other facsimile or graphic communication systems could be utilized with other computer or data processing systems without deviating from the principles of the disclosed and described invention. Thus, while the present invention, as to its objects and advantages, as described herein, has been set forth in specific embodiments thereof, they are to be understood as illustrative only and not limiting.

We claim:

1. A graphic communication system comprising:

facsimile system means for transmitting and receiving graphic information representative of information on a document or the like, said facsimile system means comprising:

scanner means for generating said graphic information to be transmitted representative of information on said document or the like; and printer means for creating a facsimile record in accordance with said received graphic information, wherein said graphic information includes data, synchronizing and supervisory control signals;

computer means for receiving and generating said graphic information, said computer means being an electronic data processing system capable of internal electrical operations according to a predetermined program; and electrical interface means coupled between said facsimile system means and said computer means for converting said graphic information into interface signal formats compatible with the operation of said computer means and said facsimile system means, said electrical interface means comprising:

time base generation circuit means to determine timing relationships in said electrical interface means;

sync circuit means for establishing synchronization in response to said synchronizing signals from said scanner means in the transmit mode and for generating said synchronizing signals for application to said printer means in the receive mode;

forward control generator circuit means for generating said supervisory signals to said printer means in the receive mode;

reverse control generator circuit means for generating said supervisory signals to said scanner means in the transmit mode;

register circuit means for intermediately storing said transmitted and received data signals in the transmit and receive modes respectively; and interface control circuit means for generating and decoding said supervisory signals between said electrical interface means and said computer means.

2. The system as defined in claim 1 wherein said time base generation circuit means comprises:

voltage-controlled oscillator means for generating first clock signals of a predetermined frequency range in the transmit mode, said oscillator means changing its output frequency in accordance with received synchronizing information in the transmit mode;

crystal clock means for generating second clock signals of predetermined frequency in the receive mode;

gate means coupled to said voltage controlled oscillator means and said crystal clock means for gating said first clock pulses and said second clock pulses in the transmit and receive modes respectively;

counter means responsive to said gated clock pulses for recyclically counting the gated clock pulses;

decoder means coupled to said counter means for decoding certain predetermined count signals for internal operation of said electrical interface means, and wherein said sync circuit means comprises:

sync generator means coupled to said crystal clock means and said decoder means for generating a sync burst in the receive mode in response to an enabling signal from said decoder means; and sync detector means responsive to enabling signals from said decoder means for detecting and establishing synchronization with received information signals in the transmit mode; and said voltage-controlled oscillator means coupled to said sync detector means and responsive to enabling signals from said decoder means for generating said clock signals in said predetermined frequency range.

3. The system as set forth in claim 2 further including second gate means coupled to said first mentioned gate means for selecting one of a plurality of system operating speed rates, and a plurality of divider circuit means coupled to said second gate means for dividing said gated clock pulses into the predetermined system operating speed rate for application to said counter means.

4. The system as set forth in claim 2 wherein said register circuit means comprises:

serial to parallel register means for converting serial data information from said scanner means to parallel data information for application to said computer means in the transmit mode, said serial to parallel register means time quantizing said serial data information into binary information in accordance with said clock signals; and parallel to serial register means for converting parallel binary data information from said computer means to serial binary data information for application to said printer means in the receive mode.

5. The system as set forth in claim 4 further including time multiplexor means for time multiplexing said sync burst and said binary data information for application to said printer means in the receive mode.

6. The system as set forth in claim 5 wherein said interface control circuit means comprises:

address decoder means for decoding the predetermined addresses of said scanner means and said printer means from said computer means;

command decoder means for decoding the predetermined system commands from said computer means and generating internal operating signals;

selection control means coupled to said address decoder means and responsive to selection and supervisory signals from said computer means for generating selected and supervisory signals to said computer means when said computer means is in communication with said electrical interface means;

data transfer control means for controlling the data to and from said computer means and said scanner and printer means;

error detector means for signalling said computer means and said scanner and printer means of a fault condition detected by said electrical interface means to exist in said computer means and said printer and scanner means;

status and sense control means coupled to said command decoder means and said data transfer control means for controlling the generation of status and sense information from said electrical interface means to said computer means;

status generator means coupled to said status and sense control means and said error detector means for generating status information to said computer means, said status information being the operational status of said electrical interface means and said scanner and printer means;

sense generator means coupled to said status and sense control means for generating sense information after said status information has been transferred to said computer means, said sense information being the fault conditions detected by said error detector means and transferred to said computer means by said status information;

address encoding means for generating the addresses of said scanner and printer means for application to said computer means; and interrupt generator means for generating a signal to said computer means indicative of said scanner means attempting to communicate with said computer means.

7. The system as set forth in claim 6 wherein said data transfer control means comprises:

byte strobe generator means for detecting that said electrical interface means is ready to receive date information from said computer means in the receive mode and is ready to transmit date information to said computer means in the transmit mode, said data information being in binary bytes of predetermined number of bits;

byte strobe gate means responsive to said byte strobe generator means for generating a data-in strobe signal for application to said parallel to serial register means in the receive mode;

byte counter means responsive to said byte strobe generator means for counting the numbered bytes of information transferred to and from said computer means in the transmit and receive modes respectively; and line counter means responsive to said byte counter means for counting the number of scan lines of transferred information determined by said byte counter means.

8. In a graphic communication system comprising a facsimile system capable of scanning and reproducing graphic information on a document or the like and a computer system operable according to a predetermined program, an electrical interface adapter comprising:

time base generator circuit means for determining time relationships in said electrical interface adapter;

sync circuit means for establishing synchronization in response to synchronizing signals from said facsimile system in the read mode and for generating synchronizing signals for application to said facsimile system in the write mode;

forward control generator circuit means for generating supervisory control signals to said facsimile system in the write mode;

reverse control circuit generator means for generating supervisory signals to said facsimile system in the read mode;

register circuit means for intermediately storing transmitted and received data signals in the read and write modes respectively; and interface control circuit means for generating and decoding said supervisory signals between said electrical interface adapter and said computer system.

9. The system as defined in claim 8 wherein said time base generator circuit means comprises:

voltage-controlled oscillator means for generating first clock signals of a predetermined frequency range in the read mode, said oscillator means changing its output frequency in accordance with received synchronizing information in the read mode;

crystal clock means for generating second clock signals of predetermined frequency in the write mode;

gate means coupled to said voltage controlled oscillator means and said crystal clock means for gating said first clock pulses and said second clock pulses in the read and write modes respectively;

counter means responsive to said gated clock pulses for recyclically counting the gated clock pulses;

decoder means coupled to said counter means for decoding certain predetermined count signals for internal operation of said electrical interface adapter, and wherein said sync circuit means comprises:

sync generator means coupled to said crystal clock means and said decoder means for generating a sync burst signal in the write mode in response to an enabling signal from said decoder means; and sync detector means responsive to enabling signals from said decoder means for detecting and establishing synchronization with received data information signals in the read mode; and said voltage-controlled oscillator means coupled to said sync detector means and responsive to enabling signals from said decoder means for generating said clock signals in said predetermined frequency range.

10. The system as set forth in claim 9 further including;

second gate means coupled to said first mentioned gate means for selecting one of a plurality of system operating speed rates; and a plurality of divider circuit means coupled to said second gate means for dividing said gated clock pulses into the predetermined system operating speed rate for application to said counter means.

11. The system as set forth in claim 9 wherein said register circuit means comprises:

serial to parallel register means for converting serial data information from said facsimile system to parallel data information for application to said computer means in the read mode, said serial to parallel register means time quantizing said serial data information into binary information in accordance with said clock signals; and parallel to serial register means for converting parallel binary data information from said computer means to serial binary data information for application to said facsimile system in the write mode.

12. The system as set forth in claim 11 further including time multiplexor means for time multiplexing said sync burst signal and said binary data information for application to said facsimile system in the write mode.

13. The system as defined in claim 12 wherein said facsimile system comprises:

scanner means for generating said graphic information to be transmitted representative of information on said document or the like; and printer means for generating a facsimile record in accordance with said received graphic information.

14. The system as set forth in claim 13 wherein said interface control circuit means comprises:

address decoder means for decoding the predetermined addresses of said scanner means and said printer means from said computer means;

command decoder means for decoding the predetermined system commands from said computer means and generating internal operating signals;

selection control means coupled to said address decoder means and responsive to selection and supervisory signals from said computer means for generating selected and supervisory signals to said computer means when said computer means is in communication with said electrical interface adapter;

data transfer control means for controlling the data to and from said computer means and said scanner and printer means;

error detector means for signalling said computer means and said scanner and printer means of a fault condition detected by said electrical interface means to exist in said computer means and said printer and scanner means;

status and sense control means coupled to said command decoder means and said data transfer control means for controlling the generation of status and sense information from said electrical interface adapter to said computer means;

status generator means coupled to said status and sense control means and said error detector means for generating status information to said computer means, said status information being the operational status of said electrical interface adapter and said scanner and printer means;

sense generator means coupled to said status and sense control means for generating sense information after said status information has been transferred to said computer means, said sense information being the fault conditions detected by said error detector means and transferred to said computer means by said status information;

address-encoding means for generating the addresses of said scanner and printer means for application to said computer means; and interrupt generator means for generating a signal to said computer means indicative of said scanner means attempting to communicate with said computer means.

15. The system as set forth in claim 14 wherein said scanner and printer means are at a remote location from said electrical interface adapter, and further including:

data channel means for transmitting said data, synchronizing, and supervisory signals between said scanner and printer means and said electrical interface adapter; and signal converter means coupled to said data channel means at each end thereof for converting said data, synchronizing and supervisory signals into a signal format compatible with the information handling capability of said data channel means and reconverting said signals back to the original signal format for application to said computer means in the read mode and said printer means in the write mode.

16. The system as set forth in claim 14 wherein said scanner and printer means are at the same location as said electrical interface adapter, and further including electrical connecting means coupled to said scanner and printer means and said electrical interface adapter for directly coupling said data, synchronizing, and supervisory signals between said scanner and printer means and said electrical interface adapter.

17. In a graphic communication system wherein a synchronization signal is transmitted by a burst of W pulses of predetermined frequency and width, a sync detector comprising;

clock pulse source means for generating clock pulses at a rate substantially higher than said predetermined frequency of said burst pulses;

first counter means for counting said clock pulses upon enabling by the lower frequency burst pulses;

first gate means for decoding at least X clock pulse counts from said first counter means for each pulse of said W burst pulses, said first counter being reset to 0 after each burst pulse;

latch means coupled to said first gate means for generating a signal indicative of a clock pulse count of at least X but less than Y detected at said first counter means;

second counter means for counting to a count of Z signals from said latch means, said count of Z indicating that at least Z pulses of said W burst pulses have been consecutively detected indicative of a true sync burst having been received; and second gate means coupled to said second counter means for decoding said count of Z for generating a sync burst detected signal.

18. The detector as set forth in claim 17 further including:

third gate means coupled to said first counter means for resetting said first counter to 0 when said burst pulse widths are too narrow and too wide respectively to allow a clock pulse count in said first counter between the counts of at least X and less than Y, thereby indicating that a false synchronization burst signal has been received; and fourth gate means coupled to said latch means for resetting said second counter means to 0 whenever said clock pulse count ends at below X and above Y respectively before said second counter has consecutively counted to Z, thereby indicating other than the Z consecutive burst pulses necessary for a true indication of the transmitted sync burst being received.

19. The detector as set forth in claim 18 further including:

coincidence pulse source means for generating a coincidence pulse at the time said burst detected signal is to appear;

third counter means for counting the noncoincidence of said coincidence pulses and said burst detected signals;

fifth gate means responsive to said coincidence pulses and said burst detected pulses for generating a reset pulse to said third counter means, thereby resetting said third counter means at the coincidence of said coincidence and burst detected pulses;

fourth counter means coupled to said fifth gate means for counting said coincidences of the coincidence pulses and burst detected pulses;

sixth gate means for decoding at least A counts from said third counter means thereby disabling said third counter means from further counting and resetting said fourth counter means to 0, thereby indicating that A successive noncoincidences have occurred; and seventh gate means for decoding at least B counts from said fourth counter for generating an in-sync signal.

20. The detector as set forth in claim 19 further including:

switch means responsive to said reset pulse from said fifth gate means for generating a first enable signal;

eighth gate means responsive to said enable pulse and the inverted in-sync to generate a second enable signal; and pulse amplifier means coupled to said eighth gate means for generating a reset signal to said fourth counter means to reset said fourth counter to 0 after the in-sync signal is generated.

21. The detector as set forth in claim 18 further including second pulse amplifier means responsive to said burst pulses and inverted burst pulses to generate reset pulses to said first counter means, whereby said first counter means is reset to 0 after each burst pulse to allow the counting of said clock pulses to begin again at the next succeeding burst pulse.

22. A time base generation circuit comprising:

voltage-controlled oscillator means for generating first clock signals of a predetermined frequency range in a first mode, said oscillator means changing its output frequency in accordance with received synchronizing information in said first mode;

crystal clock means for generating second clock signals of predetermined frequency in a second mode;

gate means coupled to said voltage-controlled oscillator means and said crystal clock means for gating said first clock pulses and said second clock pulses in the first and second modes respectively;

counter means responsive to said gated clock pulses for recyclically counting the gated clock pulses; and decoder means coupled to said counter means for decoding certain predetermined count signals.

23. The apparatus as set forth in claim 22 further including second gate means coupled to said first mentioned gate means for selecting one of a plurality of operating speed rates, and a plurality of divider circuit means coupled to said second gate means for dividing said gated clock pulses into the predetermined operating speed rate for application to said counter means.

24. A graphic communication system comprising:

facsimile means for transmitting and receiving graphic information representative of information on a document or the like, said facsimile system means comprising:

scanner means for generating said graphic information to be transmitted representative of information on said document or the like; and printer means for creating a facsimile record in accordance with said received graphic information, wherein said graphic information includes data, synchronizing and supervisory control signals;

computer means for receiving and generating said graphic information, said computer means being an electronic data processing system capable of internal electrical operations according to a predetermined program; and electrical interface means coupled between said facsimile system means and said computer means for converting said graphic information into interface signal formats compatible with the operation of said computer means and said facsimile system means, said electrical interface means comprising sync circuit means for establishing synchronization in response to said synchronizing signals from said scanner means in the transmit mode and for generating said synchronizing signals for application to said printer means in the receive mode.

25. The system as set forth in claim 24 wherein said electrical interface means further comprises forward control generator circuit means for generating said supervisory signals to said printer means in the receive mode, and reverse control generator circuit means for generating said supervisory signals to said scanner means in the transmit mode.

26. The system as set forth in claim 25 wherein said electrical interface means further comprises time base generation circuit means to determine timing relationships in said electrical interface means, and interface control circuit means for generating and decoding said supervisory signals between said electrical interface means and said computer means.

27. The system as defined in claim 26 wherein said electrical interface means further comprises register circuit means for intermediately storing said transmitted and received data signals in the transmit and receive modes respectively.

PO-1050
(5/69)

UNITED STATES PATENT OFFICE
CERTIFICATE OF CORRECTION

Patent No. 3,558,811 Dated January 26, 1971

Inventor(s) Albert J. Montevecchio et al

It is certified that error appears in the above-identified patent and that said Letters Patent are hereby corrected as shown below:

Column 40, lines 67 and 69, "date" should be--data--.

Column 43, last line, after "in-sync" insert--signal--.

Signed and sealed this 18th day of May 1971.

(SEAL)
Attest:

EDWARD M.FLETCHER,JR.
Attesting Officer

WILLIAM E. SCHUYLER, JR.
Commissioner of Patents